(12) United States Patent
Carresjö et al.

(10) Patent No.: US 8,744,692 B2
(45) Date of Patent: Jun. 3, 2014

(54) METHOD OF IDENTIFYING POSITIONS OF WHEEL MODULES

(75) Inventors: Erik Carresjö, Käma (SE); Per Hasselberg, Torslanda (SE)

(73) Assignee: Volvo Lastvagnar AB, Göteborg (SE)

(*) Notice: Subject to any disclaimer, the term of this patent is extended or adjusted under 35 U.S.C. 154(b) by 747 days.

(21) Appl. No.: 12/742,409

(22) PCT Filed: Nov. 30, 2007

(86) PCT No.: PCT/SE2007/001070
§ 371 (c)(1), (2), (4) Date: May 11, 2010

(87) PCT Pub. No.: WO2009/070067
PCT Pub. Date: Jun. 4, 2009

(65) Prior Publication Data
US 2010/0256874 A1 Oct. 7, 2010

(51) Int. Cl.
*B60R 22/00* (2006.01)
*E05F 15/00* (2006.01)
*G05D 1/00* (2006.01)
*G05D 3/00* (2006.01)
*G06F 7/00* (2006.01)

(52) U.S. Cl.
USPC .......................................................... 701/48

(58) Field of Classification Search
USPC .......................................................... 701/48
See application file for complete search history.

(56) References Cited

U.S. PATENT DOCUMENTS

| 6,278,363 B1 | 8/2001 | Bezek et al. |
| 2002/0092345 A1 | 7/2002 | Van Niekerk et al. |

(Continued)

FOREIGN PATENT DOCUMENTS

| DE | 10144360 A1 | 4/2003 |
| EP | 1110764 A1 | 6/2001 |
| EP | 1526467 A1 | 4/2005 |
| GB | 2385931 A | 9/2003 |
| JP | 2003211924 A | 7/2003 |

OTHER PUBLICATIONS

International Search Report for corresponding International Application PCT/SE2007/001070.

(Continued)

*Primary Examiner* — Maceeh Anwari
(74) *Attorney, Agent, or Firm* — WRB-IP LLP

(57) ABSTRACT

A method for identifying locations of one or more modules of an apparatus implemented in a vehicle for monitoring operation of at least one wheel of the vehicle includes steps of (a) communicating with one or more modules of the apparatus for receiving their identification codes at a processing arrangement of the apparatus, the one or more modules being mounted on at least one wheel of the vehicle; (b) driving the vehicle around a curved trajectory as sensed by the steering sensing arrangement and recording a direction of steering of the vehicle together with a temporal record of the physical parameter measured by the one or more modules together with their corresponding identification codes, the physical parameter pertaining to one or more tires of the at least one wheel; and (c) applying an analysis to the steering direction and the temporal record in respect of time to identify where the one or more modules are located on the at least one wheel of the vehicle, the analysis utilizing a characteristic that tires on an outside of the curved trajectory will experience a different peak values in the temporal record of the physical parameter than tires on an inside of the curved trajectory, and tires towards a front region of the vehicle experience a change in the temporal record of the physical parameter before and/or at a higher rate than tires towards a rear region of the vehicle for a forward direction of travel of vehicle.

26 Claims, 22 Drawing Sheets

(56) References Cited

U.S. PATENT DOCUMENTS

2003/0043031 A1 3/2003 Nowottnick et al.
2003/0076222 A1 4/2003 Fischer et al.
2005/0178193 A1 8/2005 Kuchler
2006/0212193 A1 9/2006 Breed

OTHER PUBLICATIONS

International Preliminary Report on Patentability for corresponding International Application PCT/SE2007/001070.

Supplementary European Search Report (Apr. 9, 2013) for corresponding European App. EP 07 85 2076.

METHOD OF IDENTIFYING POSITIONS OF WHEEL MODULES

BACKGROUND AND SUMMARY

The present invention relates to methods of identifying positions of wheel modules included in wheels and/or their associated tires; for example, to a method of identifying positions of wheel modules operable to monitor characteristics of wheels and/or their associated tires and conveying information indicative of these aforementioned characteristics via a communication link to an electronic control unit (ECU) and/or control system, for example for user-display. Moreover, the present invention also concerns wheel modules for use in implementing aforementioned methods. Additionally, the invention relates to methods of servicing vehicles including such wheel modules. Furthermore, the present invention also relates to software and software products executable on computing hardware for executing these aforesaid methods. Tyres, also known as "tires" in American-English, are critical components in road vehicles. Contemporary tires not only ensure adhesion of their associated road vehicles to road surfaces in widely varying weather conditions, but also perform vibration and shock isolation functions. Moreover, during their operating lifetime, tires are required to survive potentially up to several thousand or even millions of deformation cycles without exhibiting work-hardening failure, and yet exhibit a relatively modest degree of energy dissipation therein as a result of viscous dampening effects. As an additional operating requirement, contemporary tires need to be robust against scuffing and objects impacting thereonto. Yet further, tubeless tires are required to robustly grip onto their associated wheel hubs even when subject to considerable stresses, for example during emergency braking. In response to these aforementioned requirements for contemporary tires, the tires are constructed from elastic synthetic rubber, natural rubber and/or plastics material reinforced by meshes of metal wire, carbon fibre and similar. Modern tires are therefore to be respected as highly optimized and advanced products.

Tire failure during operation can potentially result in immobilization of an associated vehicle or even accident. Moreover, tires operated at unsuitable pressures can adversely influence associated vehicle fuel economy; fuel economy is becoming increasingly pertinent in view of increases in fuel costs as well as in view of carbon dioxide generation and its perceived impact on World climate change.

It is known to mount sensors onto automobiles to monitor characteristics such as tire pressure and acceleration in one or more orthogonal axes, and to convey information representative of these characteristics via wireless communication links to electronic control units (ECU) forming parts of data management systems of the vehicles. By employing such arrangements, it is possible to warn drivers of a need to inflate one or more tires of their vehicles in order to improve driving quality and safety.

In a published Japanese patent no. JP 2003211924 (Mazda Motor), there is a disclosed a pneumatic sensor device suitable for use with a tire of a vehicle for detecting tire pressure and generating corresponding tire pressure information. The device includes a transmitter for transmitting the pressure information together with an identification code for distinguishing the sensor device from other such sensor devices simultaneously included on other wheels of the vehicle. A control unit of the vehicle is operable to receive the transmitted pressure information and its associated identification code. The received pressure information is stored in a memory of the control unit. The control unit is operable to raise an alarm in an event that tire pressure is not correct pursuant to predefined criteria.

In a published United Kingdom patent application no. GB 2385931 A, tire monitors are described which are mounted adjacent to tires near their tire inflation valve stems. The tire monitors include sensors to measure pressure, temperature and rotation direction of their respective tires. Moreover, the monitors are operable to communicate measured sensor signals via transmitters to their respective receiver for subsequent processing and eventual presentation on a display unit. A vehicle mounted controller in communication with the receiver is operable to determine whether pressure information is associated with a front tire or a rear tire based on the strength of the wireless signal received at the receiver, and whether pressure data is associated with a right tire or left tire based on associated rotation direction data.

On account of tire condition being an important factor influencing vehicle operating economy and safety, a technical problem is therefore how to provide more advanced wheel and tire monitoring. When a fleet operator has many vehicles in its fleet, ensuring quality of wheel and tire maintenance for all the vehicles in the fleet is paramount. Such quality can at least partially be ensured by following rigorous manual maintenance routines, for example by performing regular vehicle inspections and systematically changing tires after a predefined number of travelled kilometers. However, it is still feasible that tires and wheels undergo events which escape the attention of such rigorous maintenance routines and can therefore represent a potential hazard. For example, wheels are potentially exchanged between vehicles either without authorization of respective vehicles owners which can thereby circumvent such rigorous maintenance routines or by way of theft. Moreover, wheel hubs are susceptible over their operating lifetime to being provided with numerous replacement tires.

As elucidated in the foregoing, tire monitors are known. In order to measure tire condition and detect unauthorized tampering with tires, for example when wheels are temporarily removed from their associated vehicles, for example when exchange from winter tires to summer tires in Northern Europe and Canada, more advanced tire and wheel monitors are required. However, there then arises a technical problem regarding how to manage complex configurations of tire and wheel monitors, especially when tires are replaced at mutually different times and wheels and their tires are susceptible to being retained in storage over periods when exchanging between summer and winder tires.

The present invention seeks to address the aforementioned technical problems.

It is desirable to provide an improved method of identifying locations of wheel and/or tire monitors included in apparatus of vehicles which is capable of enhancing safety and reliability of such vehicles.

A method according to the first aspect of the invention there is provided a method of identifying locations of one or more modules of an apparatus implemented in a vehicle for monitoring operation of at least one wheel of the vehicle, said apparatus including one or more sensor modules operatively mounted to revolve with said at least one wheel, said one or more modules being operatively coupled in communication with a processing arrangement of said vehicle, said one or more modules being operable to determine at least one physical parameter of said wheel and to generate at least one corresponding sensor signal for said processing arrangement, said processing arrangement being operable to process said at least one sensor signal to compute information indicative of operation of said at least one wheel, characterized in that said method includes steps of (a) communicating with one or more modules of said apparatus for receiving their identification codes at a processing arrangement of said apparatus, said one or more modules being mounted on at least one wheel of said vehicle;

(b) driving said vehicle around a curved trajectory as sensed by said steering sensing arrangement and recording a direction of steering of said vehicle together with a temporal record of said physical parameter determined by said one or more modules together with their corresponding identification codes, said physical parameter pertaining to one or more tires of said at least one wheel; and (c) applying an analysis to said steering direction and said temporal record in respect of time to identify where said one or more modules are located on said at least one wheel of said vehicle, said analysis utilizing a characteristic that tires on an outside of said curved trajectory will experience different values in said temporal record of said physical parameter than tires on an inside of said curved trajectory, and that tires towards a front region of said vehicle experience a change in the temporal record of said physical parameter before and/or at a higher rate than tires towards a rear region of said vehicle for a forward direction of travel of vehicle.

The invention is of advantage in that it provides a simple practical method of identifying the locations whereat the one or more modules of the apparatus are located on wheels of the vehicle.

Optionally, there is provided a method of identifying locations of one or more sensor modules of an apparatus implemented in a vehicle for monitoring operation of at least one wheel of the vehicle, the sensor modules operatively mounted to revolve with the at least one wheel, the one or more modules being operatively coupled in communication with a processing arrangement (ECU) of the vehicle, the one or more modules being operable to sense at least one physical parameter of the wheel and to generate at least one corresponding sensor signal for the processing arrangement, the processing arrangement (ECU) being operable to process the at least one sensor signal to compute information indicative of operation of the at least one wheel, characterized in that the method includes steps of:

(a) driving the vehicle around a curved trajectory as sensed by a steering sensing arrangement and recording an angle of steering of the vehicle together with a temporal record of lateral accelerations ($A_z$) measured by the one or more modules together with their corresponding identification codes (ID); and (b) applying an analysis to the steering angle and the temporal record in respect of time (t) to identify locations whereat the one or more modules are located on the at least one wheel of the vehicle, the analysis utilizing a characteristic that accelerometers located on an outside of the curved trajectory will experience greater lateral accelerations during the curved trajectory in comparison to a straight trajectory than accelerometers located on an inside of the curved trajectory, and that accelerometers located towards a front region of the vehicle experience an increase in lateral acceleration temporally before accelerometers located towards a rear region of the vehicle for a forward direction of travel of vehicle during execution of the curved trajectory.

In this method the physical parameter is constituted by a lateral acceleration measured directly by a sensor arranged in the module.

Optionally, when implementing the method of identifying an apparatus in a vehicle including a steering sensing arrangement for sensing a direction in which the vehicle is being steered, the method including steps of:

(a) communicating with one or more modules of the apparatus for receiving their identification codes (ID) at a processing arrangement of the apparatus, the one or more modules being mounted on at least one wheel of the vehicle;

(b) driving the vehicle around a curved trajectory as sensed by the steering sensing arrangement and recording an angle of steering of the vehicle together with a temporal record of pressures measured by the one or more modules together with their corresponding identification codes (ID), the pressure pertaining to one or more tires of the at least one wheel; and (c) applying an analysis to the steering angle and the temporal record in respect of time to identify locations whereat the one or more modules are located on the at least one wheel of the vehicle, the analysis utilizing a characteristic that tires on an outside of the curved trajectory will experience greater pressure increases than tires on an inside of the curved trajectory, and that tires towards a front region of the vehicle experience an increase in pressure before tires towards a rear region of the vehicle for a forward direction of travel of vehicle.

In this method the physical parameter is constituted by the pressure which is measured directly by a sensor in the module Optionally, there is provided a method of identifying locations of one or more sensor modules of an apparatus implemented in a vehicle for monitoring operation of at least one wheel of the vehicle, the sensor modules operatively mounted to revolve with the at least one wheel, the one or more modules being operatively coupled in communication with a processing arrangement (ECU) of the vehicle, the one or more modules being operable to determine at least one physical parameter of the wheel and to generate at least one corresponding sensor signal for the processing arrangement, the processing arrangement (ECU) being operable to process the at least one sensor signal to compute information indicative of operation of the at least one wheel, characterized in that the method includes steps of:

(a) communicating with one or more modules (400) of said apparatus (680, 690, 2200) for receiving their identification codes (ID) at a processing arrangement (950) of said apparatus (680, 690, 2200), said one or more modules (400) being mounted on at least one wheel (10) of said vehicle (900);

(b) driving said vehicle (900) around a curved trajectory as sensed by a steering sensing arrangement and recording direction of steering of said vehicle (900) together with a temporal record of said angular velocity determined from a signal generated by said one or more modules (400) together with their corresponding identification codes (ID); and (c) applying an analysis to said direction of steering and said temporal record in respect of time (t) to identify locations whereat said one or more modules (400) are located on said at least one wheel (10) of said vehicle (900), said analysis utilizing a characteristic that the angular velocity of a wheel located on an outside of said curved trajectory will experience greater magnitude during the curved trajectory in comparison to a the magnitude of the angular velocity of a wheel located on an inside of said curved trajectory, and that the angular velocity of a wheel located towards a front region of said vehicle (900) experience an increase in magnitude temporally before and/or at a higher rate than a wheel located towards a rear region of said vehicle (900) for a forward direction of travel of vehicle (900) during execution of said curved trajectory.

In this method the physical parameter is derived from a sensor signal generated by a sensor in the module. Preferably the sensor may be an accelerometer arranged in each respective module, which accelerometer generates acceleration signal components in the tangential and/or radial direction ($A_x$, $A_y$)

In this method the step of identifying those one or more modules (400) mounted to a wall (230) or onto an inside rim of a tire (30) of the at least one wheel (10) is performed by identifying periodic pulses (500) in acceleration signal components ($A_y$, $A_z$) derived from the one or more modules (400) corresponding to rotation of the at least one wheel (10)

Optionally, when implementing the method, the apparatus includes a sensor arrangement for sensing an angular orientation (□) of the at least one wheel.

Optionally, when implementing the method, the signals are indicative of at least one of:

(e) one or more components of acceleration ($A_y$, $A_y$) sensed at the at least one wheel; and (f) a pressure sensed in a tire of the at least one wheel.

Optionally, when implementing the method to provide pseudo-continuous monitoring or continuous monitoring of the at least one wheel, the method is implemented repetitively whilst the vehicle is being driven in normal use.

Optionally, when implementing the method, there is included an additional step after step (a) of identifying those one or more modules mounted to a wall or onto an inside rim of a tire of the at least one wheel by identifying periodic pulses in acceleration signal components ($A_y$, $A_z$) derived from the one or more modules corresponding to rotation of the at least one wheel.

Optionally, when implementing the aforesaid methods of the invention, the one or more modules include a temperature sensor for sensing a temperature ($T_{mod}$) thereat, the one or more modules being operable to communicate a signal indicative of the temperature ($T_{mod}$) to the processing arrangement (ECU) for use in computing the information indicative of operation of the at least one wheel. Monitoring the temperature ($T_{mod}$) enables a pressure (P) measured within a tire of the at least one wheel to be at least partially corrected for temperature effects when executing computations regarding wheel operation. Moreover, in an event that an excessive temperature rise is detected, a warning can be optionally issued by the apparatus.

Optionally, when the aforesaid methods of the invention, the one or more modules include at least one of:

(a) a pressure sensor operable to sense a pressure (P) existing within a tire of the at least one wheel, the one or more modules being operable to communicate a signal indicative of the pressure (P) to the processing arrangement (ECU) for use in computing the information indicative of operation of the at least one wheel;

(b) a strain gauge sensor for measuring flexure of the tire of the at least one wheel, the module being operable to communicate a signal indicative of the flexure to the processing arrangement (ECU) for use in computing the information indicative of operation of the at least one wheel;

(c) an accelerometer for measuring acceleration ($A_x$, $A_y$, $A_z$) in at least one axis at a mounting location (L1, L2, L3, L4) of the one or more modules on the at least one wheel, the one or more modules being operable to communicate a signal indicative of the acceleration ($A_x$, $A_y$, $A_z$) to the processing arrangement (ECU) for use in computing the information indicative of operation of the at least one wheel; and (d) a magnetic sensor for measuring a magnetic field applied to the one or more modules, the one or more modules being operable to communicate a signal indicative of the applied magnetic field to the processing arrangement (ECU) for use in controlling operation of the apparatus.

Such physical parameters have been found to be beneficial to monitor when assessing operation of the at least one wheel. It will be appreciated that the one or more modules can be equipped with a subset of the options (a) to (d); for example, a module can be provided with only a pressure sensor, or only an accelerometer, or a combination of a pressure sensor and an accelerometer depending upon which method of aforesaid aspects of the invention are to be employed. Moreover, certain modules are optionally provided with only a single-axis accelerometer, whereas other such modules are provided with triple-axis accelerometers. Other combinations of sensors included within the modules are possible pursuant to the present invention.

More optionally, when implementing the method, the accelerometer is a multi-axis accelerometer operable to measure components of acceleration ($A_x$, $A_y$, $A_z$) in at least one of radial, tangential and transverse axes in respect of rotations of the at least one wheel. Yet more optionally, the accelerometer is a silicon micromachined device. Such silicon devices are extremely robust, cost effective and are capable of providing precise and accurate measurement of acceleration.

Optionally, when implementing the method when accelerometers are employed, the processing arrangement (ECU) is operable to apply auto-alignment to one or more sensing axes of the accelerometer to effectively align them to at least one of radial, tangential and transverse axes in respect of rotations of the at least one wheel. Such auto-alignment is capable of simplifying installation of the one or more modules by rendering placement of the one or more modules on the at least one wheel less angularly critical.

More optionally, when implementing the method, the processing arrangement (ECU) includes an angular resolver for implementing the auto-alignment which is operable to seek during its calibration to null lateral acceleration components and to seek to null tangential acceleration components integrated over one or more complete revolutions of the at least one wheel. By applying such auto-alignment, more representative signals describing operation of the at least one wheel are derivable for the processing arrangement to analyse. Optionally, acceleration measurements can be implemented for a part of a revolution, for example a half-revolution, of the at least one wheel and the measurements for a remaining half-revolution of the at least one wheel synthesized therefrom for integration purposes; such an implementation is to be construed to mean integration for a complete revolution of the wheel.

Yet more optionally when implementing the method, the processing arrangement (ECU) is operable to calibrate its auto-alignment during at least one of:

(a) a calibration procedure when configuring the processing arrangement (ECU) in relation to its one or more modules; and (b) in a dynamic manner during driving of the vehicle.

Optionally, when implementing aforementioned methods of the invention, the one or more modules are mounted at one or more locations (L1, L2, L3, L4) on the at least one wheel, the one or more locations including:
- (a) on a hub of the at least one wheel substantially at an axis (B-B) of rotation of the at least one wheel;
- (b) on a hub of the at least one wheel at a radial distance from the axis of rotation (B-B) of the at least one wheel;
- (c) within a tire of the at least one wheel for sensing a pressure (P) within the tire, the at least one module being mounted to a peripheral surface of a hub of the at least one wheel;
- (d) within a tire of the wheel for sensing a pressure (P) within the tire, the one or more modules being mounted to an inside side-wall surface of the tire for measuring flexural characteristics of the side-wall; and
- (e) on an inside surface of a peripheral rim of the at least one wheel for measuring acceleration thereat.

Mounting the one or more modules at these different locations is of benefit in that certain types of defect in the at least one wheel are more reliably sensed when the one or more modules are mounted at specific favourable locations. For example, wheel imbalance is better sensed with a module mounted on the wheel near its hub, whereas flexural characteristics of the tire or inflatable cavity are better sensed with a module attached to a side wall of the tire or flexible inflatable cavity. More optionally, a module is mounted to an inside rim of a tire, adjacent to its treads (L4).

Optionally, when implementing aforementioned methods of the invention, the one or more modules include at least one wireless interface for communicating between the one or more modules and the processing arrangement (ECU), the one or more modules forming a wireless network wherein certain of the one or more modules are operable to function as one or more relay nodes for conveying signal exchange between the processing arrangement (ECU) and other of the one or more modules. By establishing such a communication network, modules mounted in wireless shadows where they are occluded by conductive elements are operable, via the network, to provide their measured signals to the processing arrangement.

Optionally, when implementing aforesaid methods of the invention, the one or more modules include at least one wireless interface for communicating between the one or more modules and the processing arrangement (ECU), the one or more modules forming a wireless network which is dynamically reconfigurable for conveying signals between the one or more modules and the processing arrangement (ECU). An ability exhibited by the network to dynamically reconfigure itself is of advantage in that the apparatus is able to continue operating with reduced monitoring functionality in an event of one or more of the modules ceasing to provide their respective signals to the processing arrangement (ECU). Such a reconfigurable property of the network not only renders the apparatus more robust, but also allows the apparatus to adapt when additional modules are added to the apparatus, for example in response to changing one or more of the wheels.

Optionally, when implementing aforementioned methods of the invention, the one or more modules include at least one wireless interface for communicating between the one or more modules and the processing arrangement (ECU), the one or more modules forming a wireless network which is dynamically reconfigurable in response to the one or more modules changing between functional and non-functional states in operation, for enabling the apparatus to continue functioning with modified functionality in respecting of monitoring operation of the at least one wheel. Such an operating characteristic circumvents the apparatus becoming non-function merely on account of one of its modules developing a problem in operation, for example its battery becomes fully discharged in operation.

Optionally, when implementing the aforesaid methods of the invention, the one or more modules are each provided with a corresponding identification code (ID) for communicating to the processing arrangement (ECU) so that the processing arrangement (ECU) is able to recognize from which module corresponding signal data has been sent. Use of such identification codes (ID) enables one or more wheels which have developed problems, or have been found to have potential problems, to be clearly identified and a corresponding unambiguous informative warning sent to the driver of the vehicle and/or to a service facility responsible for addressing such problems or potential problems.

Optionally, when implementing the aforementioned methods of the invention, the one or more modules include one or more sources of electrical power for energizing the one or more modules, the one or more sources of electrical power including at least one rechargeable battery and one or more generators for recharging the one or more sources, the one or more generators deriving energy from rotations of the at least one wheel. More optionally, the one or more generators are at least one of:
- (a) an electromagnetic generator based upon movement of a mass operable to move in response to rotations of the at least one wheel; and
- (b) a piezo-electric generator based upon force generated by a mass operable to apply a varying force to a piezo-electric device in response to rotations of the at least one wheel.

On account of the one or more modules rotating with their respective wheels, providing electrical slip rings or inductive electrical couplings represents a considerable practical complication, especially in view of regions around wheels of contemporary wheels already being heavily populated with other components such as ABS rotation sensors, disc brakes, suspension components and so forth. However, after prolonged use, local sources of power can become exhausted unless recharged or replaced; inclusion of the one or more generators are capable of addressing such problems.

In order to gather more representative measurements indicative of operation of the at least one wheel, the wheel-monitoring apparatus is optionally implemented such that the one or more modules are radially distributed around the at least one wheel for sensing operation of the at least one wheel at a plurality of angular locations therearound.

Certain conductive components in and around the at least one wheel are susceptible to creating radio shadows and causing Faraday screening. In order to address problems arising from such radio shadows and Faraday screening, in the wheel-monitoring apparatus, at least one of the one or more modules optionally includes a wireless interface coupled to an electrically conducting mesh of a tire of the at least one wheel, the conducting mesh being operable to function as a wireless patch antenna for the at least one module for supporting wireless communication between the at least module and the processing arrangement (ECU).

Optionally, aforesaid methods of the invention include a step of presenting information to a driver of the vehicle on a display coupled in communication with the processing arrangement (ECU), the information indicating at least one of:
- (a) an operating status of the one or more modules;
- (b) a condition of the at least one wheel;
- (c) one or more faults or potential faults associated with the at least one wheel;

(d) information regarding one or more actions to be taken by a driver of the vehicle in an event of one or more faults or potential faults associated with the at least one wheel being identified; and (e) an indication of whether or not at the at least one wheel of the vehicle has been modified, for example tampered with.

The display is however not limited to displaying such information as in (a) to (e) and is optionally capable of presenting other analysis information provided from the processing arrangement, for example a time record of changes in one or more wheel parameters as sensed by the one or more modules; for example, the display can beneficially present a graph representing tire pressure as a function of time, a list describing a configuration of modules presently coupled in communication with the processing arrangement, and so forth.

Optionally, the aforesaid methods of the invention include a step of providing the processing arrangement (ECU) with a wireless interface for communicating with a service facility remote from the vehicle, the processing arrangement (ECU) being operable to communicate information indicative of functionality of the at least one wheel, the information being indicative of one or more faults or potential faults associated with the at least one wheel as computed from signals provided from the one or more modules, and for receiving instructions from the service facility regarding actions for addressing the one or more faults or potential faults.

More optionally, the aforesaid methods of the invention include a step of providing the vehicle with a global positioning unit for generating a signal indicative of a spatial position of the vehicle, and for conveying information via the processing arrangement (ECU) to the wireless interface to the service facility indicative of the spatial position of the vehicle.

Optionally, when implementing the aforesaid methods of the invention, the one or more modules include a processor coupled to an associated data memory, the one or more modules via their pressure sensors being operable to record a pressure (P) within a tire of the at least one wheel in relation to time (t) as determined by a clock arrangement (CLK) included within the one or more modules, and the processor is operable to monitor changes in the pressure (P) with time (t) to identify one or more of:

(a) a gradual leak of air or gas from the tire indicative of a need to recharge the tire with air or gas; and (b) any abrupt depressurization of the tire indicative of a puncturing or rapid deflation event having occurred, or the tire having been exchanged.

More optionally, the one or more modules are operable to communicate to the processing arrangement a message that sensed data pertaining to the tire of the at least one wheel being potentially unreliable due to the abrupt depressurization, for example due to a tampering event. Such processing is useful for detecting events, for example unauthorized swapping of tires, occurring when an associated wheel is temporarily dismantled from the vehicle and outside a wireless communication range of the processing arrangement (ECU). Generation of such a message is useful for enhancing safety; unauthorized or unintentional swapping of a tire or wheel of the vehicle can potentially contribute to safety risks or degraded reliability about which the driver of the vehicle is beneficially informed.

Optionally, when implementing the aforesaid methods of the invention, the one or more modules are operable to monitor the pressure (P) irrespective of whether or not the one or more modules are in their hibernating energy-saving state. Such operation renders tampering executed on the vehicle when in a parked state detectable.

Optionally, when implementing the aforesaid methods, the one or more modules are operable to switch between an active state and an energy-saving hibernating state. The hibernating state is of benefit in that it prolongs a period of use of the batteries associated with the one or more modules and renders frequent recharging of the batteries less necessary thereby prolonging their operating lifetime. Rechargeable batteries are only capable of withstanding a finite number of discharge cycles before their electrical storage capacity deteriorates.

More optionally, when implementing the methods, the one or more modules are operable to switch between the active state and the hibernating state in response to one or more instructions communicated by wireless to the one or more modules. By using such wireless instructions, it is feasible to force all the one or more modules into their hibernating state promptly after, for example, parking the vehicle and switching-off its combustion engine; the hibernating state conserves energy in batteries of the one or more modules when the vehicle is not in use. Likewise, a single wireless instruction is capable of waking up the one or more modules from their hibernating state when the vehicle is started again.

Yet more optionally, when implementing the methods, the one or more modules are operable to switch from the active state to the energy-saving hibernating state in response to a period of time (t) in which the one or more modules detect one or more of:

(a) a cessation of changes in pressure (P) of a tire of the at least one wheel during a predetermined period of time (t); and (b) a cessation of changes in acceleration ($A_x$, $A_y$, $A_z$) sensed on the at least one wheel during a predetermined period of time (t).

More optionally, the one or more modules are operable to switch from the energy-saving hibernating state to the active state in response to the one or more modules detecting one or more of:

(a) a resumption of changes in pressure (P) of a tire of the at least one wheel associated with rotations of the at least one wheel; and (b) a resumption of changes in acceleration ($A_x$, $A_y$, $A_z$) sensed on the at least one wheel.

Similarly, the one or modules are beneficially capable of automatically and autonomously returning to their active state without the processing arrangement needing to send any explicit instructions.

Optionally, when implementing aforesaid methods of the invention, the at least one physical parameter includes at least one of:

(a) a pressure (P) within a tire of the at least one wheel as measured at the one or more modules;

(b) an acceleration ($A_x$, $A_y$, $A_z$) as measured substantially at the one or more modules; wherein the processing arrangement (ECU) is operable to apply an harmonic analysis to signals corresponding to the pressure (P) and/or the acceleration ($A_x$, $A_y$, $A_z$), the harmonic analysis being operable to identify harmonic components in respect of angular frequency ($\square$) corresponding to a temporal rate of change of the angular orientation ($\square$) of the at least one wheel. Certain problems or potential problems are susceptible to being identified merely by processing magnitudes of the harmonic components, whereas detection of flexural problems beneficially requires analysis of both harmonic magnetic and relative harmonic phase data in the processing arrangement; see FIG. 10 for example regarding skewing of presented peaks on account of changes in relative phase in harmonic components identified by the processing arrangement.

More optionally, when implementing the present invention, the harmonic analysis applies computation to at least one of:
(a) magnitudes of the harmonic components; and
(b) relative phase relationships between the harmonic components.

More optionally, when implementing the present invention, the processing arrangement (ECU) is operable to employ the harmonic analysis for identifying an occurrence of at least one of:
(a) the at least one wheel is imbalanced;
(b) a specific type of imbalance is present in the at least one wheel;
(c) the at least one wheel is skewed in relation to its axle;
(d) the at least one wheel is loose and wobbling about on its fasteners;
(e) a tire of the at least one wheel has defects in its flexural characteristics;
(f) a tire of the at least one wheel is insufficiently inflated;
(g) a tire of the at least one wheel is over inflated;
(h) a tire of the at least one wheel is oval or has a higher-order lobed distortion;
(i) the at least one wheel has a mass imbalance therein; and
(j) wheel bearings associated with an axle rotationally supporting the at least one wheel in operation are vibrating or rattling in an unexpected manner indicative of a fault, or a potentially developing fault.

The processing arrangement is not limited to detecting problems (a) to (j) above and is capable of detecting other problems, for example rattling noises in bearings associated with an axle of the wheel as manifested in acceleration or acoustic sensed signals at the one or more modules.

More optionally, when implementing methods of the invention, the processing arrangement (ECU) is operable to perform the analysis of the harmonic components by applying:
(a) a rule-based algorithm for identifying one or more faults or potential faults from the harmonic components;
(b) a neural network pre-programmed to identify one or more faults or potential faults when presented with data describing the harmonic components; and/or
(c) an harmonic filter for highlighting a specific combination of one or more harmonic components which are indicative of one or more faults or potential faults with the at least one wheel.

Other approaches to harmonic component analysis can optionally also be employed in the apparatus.

Optionally, when implementing aforesaid methods of the present invention, there is included a step of providing the processing arrangement (ECU) with a predetermined list of types of wheel susceptible to being employed with the vehicle and associated expected characteristics, and the one or more modules are operable to communicate information to the processing arrangement (ECU) regarding an identification of a type of wheel onto which the one or more modules are mounted, and the processing arrangement (ECU) is operable to compare measured signals provided from the one or more modules with signals that would be expected from the one or more modules as simulated from the predetermined list, and wherein a disparity between the measured signals and the simulated signals is indicative of one or more faults or potential faults. Such an approach is susceptible to avoiding a need to perform an harmonic analysis and therefore is computationally less intensive for the processing arrangement.

Optionally, when implementing aforesaid methods, the one or more modules include one or more processors therein, and computation effort executed in operation for identifying one or more faults or potential faults in the at least one wheel is shared between the one or more processors and the processing arrangement (ECU). Optionally, computational load within the vehicle is distributed so as to avoid causing data processing overload at the processing arrangement, especially when many of the modules are included on wheels of the vehicle.

Optionally, in the aforementioned methods, the processing arrangement (ECU) is operable to send a message requesting the one or modules to respond back to the processing arrangement (ECU) for declaring their identification codes (ID) to the processing arrangement (ECU) for enabling the processing arrangement to identify its configuration of one or more modules, and for identifying any changes in the configuration of one or more modules occurring. More optionally, the one or more modules are operable to also respond with data indicative of expected characteristics of the at least one wheel to which the one of more modules are mounted in order that the processing arrangement is operable to perform a correct monitoring of wheels of the vehicle, it requires a recent list or record of modules present on the wheels.

Optionally, when implementing the aforesaid methods, the processing arrangement (ECU) is operable to compare rotation measurements from the sensor arrangement for sensing the angular orientation ($\square$) of the at least one wheel against signals supplied from the one or more corresponding modules for checking functional operation of the sensor arrangement and/or the one or more modules. More optionally, the sensor arrangement is an ABS wheel angular orientation sensor associated with brakes of the vehicle. Operational integrity the wheel-monitoring apparatus is desirable so that detection of problems and potential problems is as effective as possible. Optionally, so as to obtain greater functionality from existing components already included on the vehicle, when implementing the wheel-monitoring apparatus, the sensor arrangement is an ABS wheel angular orientation sensor associated with brakes of the vehicle.

According to a second aspect of the invention, there is provided a wheel-monitoring apparatus operable to execute a method pursuant to at least one of the first, second and third aspects of the invention.

According to a third aspect of the invention, there is provided a module operable to function in a vehicle for implementing a method pursuant to at least one of the first, second and third aspects of the invention.

According to a fourth aspect of the invention, there is provided a vehicle including a wheel-monitoring apparatus pursuant to the fourth aspect of the invention, the apparatus being operable to monitor operation of at least one wheel (10) of the vehicle (900) pursuant to a method of at least one of the first, second and third aspects of the invention.

Optionally, the vehicle is at least one of: a heavy commercial vehicle, a construction vehicle, an automobile, a motorcycle, a scooter, an aircraft, a helicopter, a bicycle.

According to a fifth aspect of the invention, there is provided a wheel including one or more modules mounted thereonto, the one or more modules operable to function with a wheel-monitoring apparatus pursuant to the fourth aspect of the invention operable to monitor operation of at least one wheel of the vehicle pursuant to at least one of the first, second and third aspects of the invention.

According to an sixth aspect of the invention, there is provided a tire including a module as pursuant to the fifth aspect of the invention.

Optionally, the module is mounted to a side wall or adjacent a thread-section of the tire.

When the aforementioned apparatus has been "calibrated" pursuant to at least one of the first, second and third aspects of the invention, namely positions of one or more modules identified, the apparatus is operable to provide wheel and tire monitoring. An additional technical problem then pertains how best utilize information provided from the apparatus for maintaining the vehicle operational in service.

This additional technical problem is at least partially addressed by the present invention.

According to a seventh aspect of the present invention, there is provided a system including one or more vehicles, wherein each vehicle includes a wheel-monitoring apparatus operable to execute a method pursuant to at least one of the first, second and third aspects of the invention, the system comprising:

(a) a control centre for coordinating repair or maintenance of the one or more vehicles;
 (b) one or more service facilities operable to perform repair or replacement on the one or more vehicles; wherein the system is operable to:
 (c) enable each wheel-monitoring apparatus to monitor operation of its one or more associated wheels and detect when a problem or potential problem arises therewith;
 (d) enable each wheel-monitoring apparatus to communicate the problem or potential problem to the control centre, for the control centre to identify one or more service facilities capable of addressing the problem or potential problem; and
 (e) enable the control centre to communicate instructions to the one or more vehicles whose wheel-monitoring apparatus has detected a problem or potential problem to the identified one or more service facilities for the problem or potential problem to be addressed.

Optionally, the system in (e) is operable to inform the identified one or more service facilities in advance of arrival of the one or more vehicles for maintenance or repair, so that the identified one or more service facilities are provided with an opportunity to make preparation for arrival of the one or more vehicle for maintenance or repair.

Optionally, when implementing the system, the control centre is operable to organise the maintenance or repair at the identified one or more service facilities automatically without one or more drivers of the one or more vehicles needing to intervene.

Optionally, in the system, the one or more vehicles include global position sensing apparatus thereon coupled in communication with the wheel-monitoring apparatus for enabling the one or more vehicles to communicate their position to the control centre, so that the control centre is operable to identify one or more service facilities most suitably geographically disposed to service the one or more vehicles.

According to a eight aspect of the invention, there is provided a method of operating a system including one or more vehicles, wherein each vehicle includes a wheel-monitoring apparatus operable to implement a method pursuant to the present invention, the system comprising:

(a) a control centre for coordinating repair or maintenance of the one or more vehicles;
 (b) one or more service facilities operable to perform repair or replacement on the one or more vehicles;
 wherein the method includes steps of:
 (c) enabling each wheel-monitoring apparatus to monitor operation of its one or more associated wheels and to detect when a problem or potential problem arises therewith;
 (d) enabling each wheel-monitoring apparatus to communicate the problem or potential problem to the control centre, for the control centre to identify one or more service facilities capable of addressing the problem or potential problem; and
 (e) enabling the control centre to communicate instructions to the one or more vehicles whose wheel-monitoring apparatus has detected a problem or potential problem to the identified one or more service facilities for the problem or potential problem to be addressed.

According to an ninth aspect of the invention, there is provided a software product recorded on a data carrier, the product being executable on computing hardware for executing a method pursuant to the present invention.

Features of the invention are susceptible to being combined together in any combination without departing from the scope of the invention as defined by the appended claims.

DESCRIPTION OF THE DIAGRAMS

Embodiments of the present invention will now be described, by way of example only, with reference to the following diagrams wherein:

FIG. 17b is an illustration of graphs representing lateral acceleration sensed during implementation of the alternative method illustrated in FIG. 17a;

Figure 1:
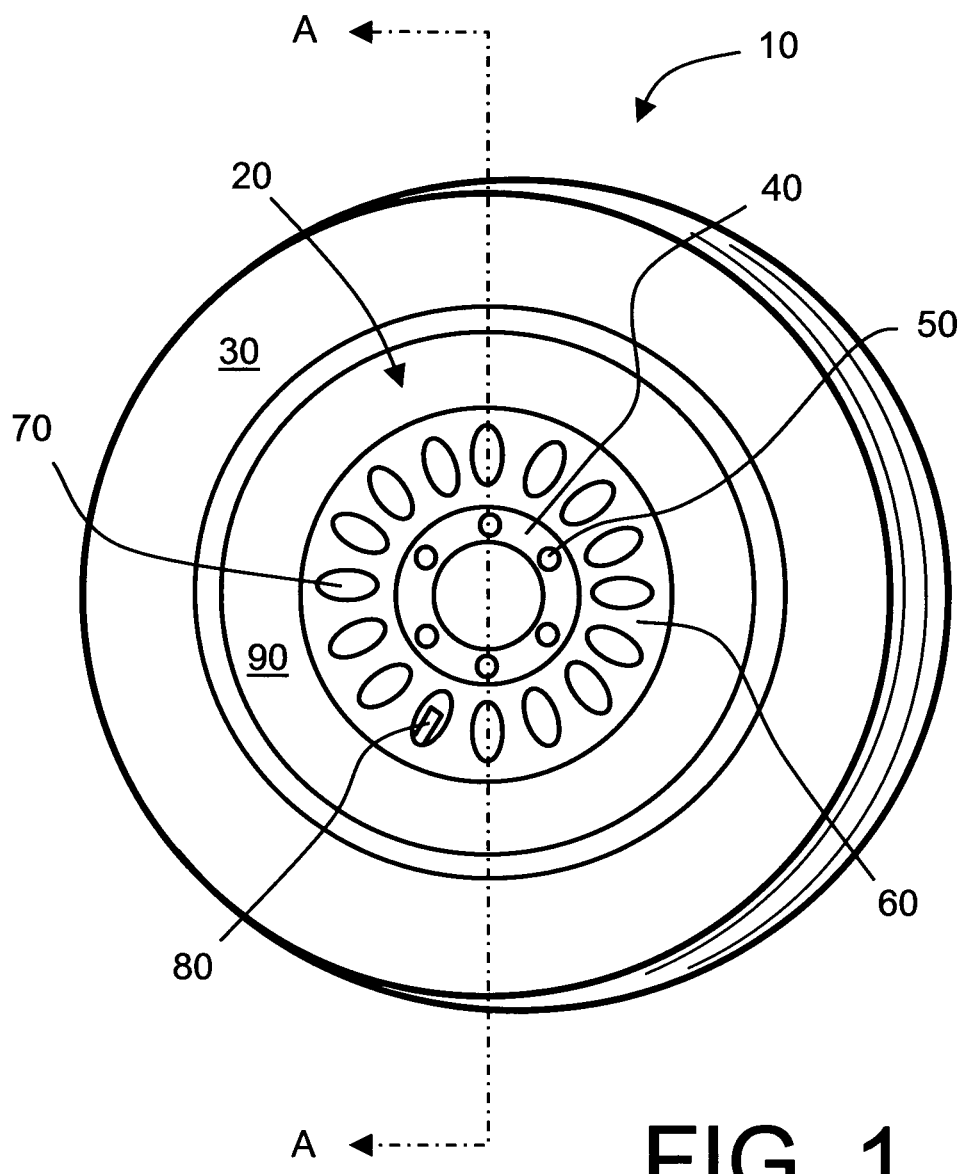
FIG. 1 is an illustration of a wheel of a contemporary heavy commercial vehicle.
Figure 19:
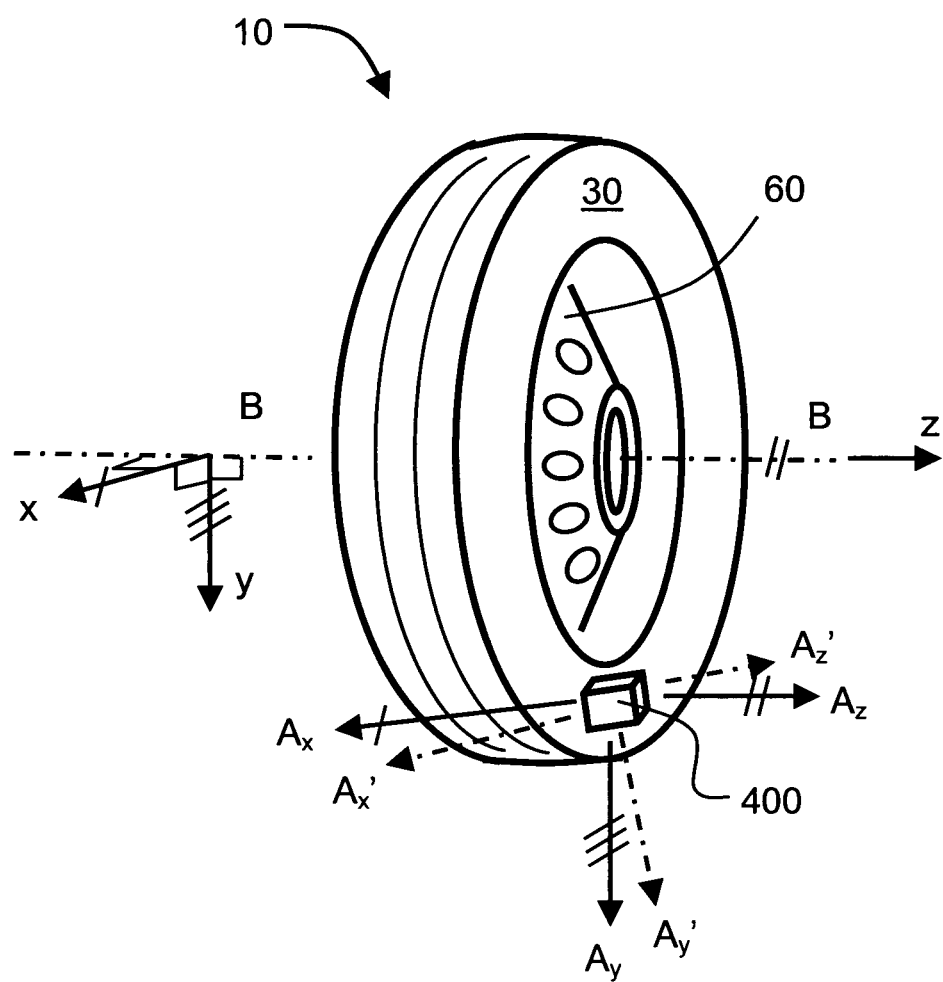
Figure 20:
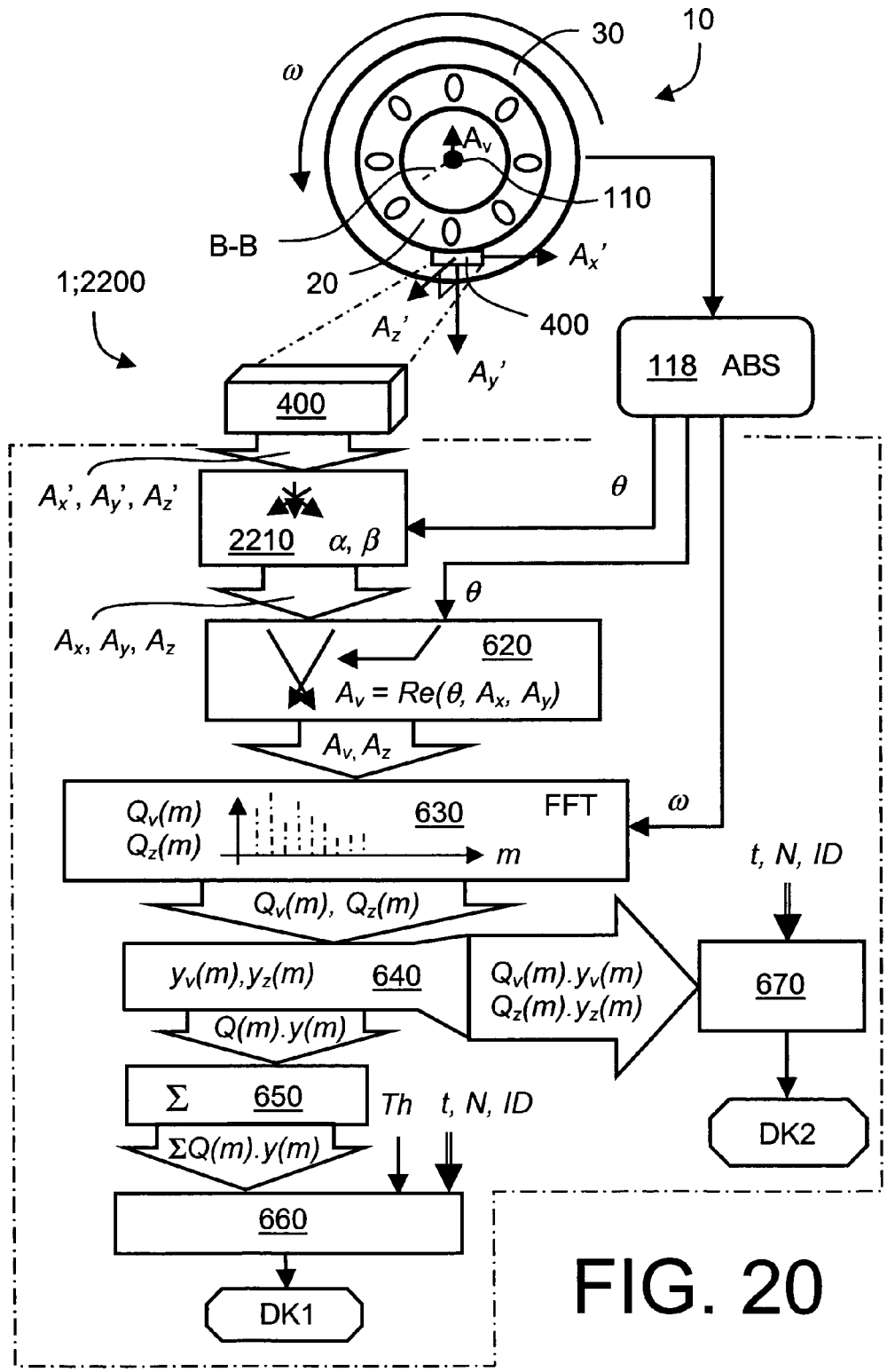

FIG. 19 is an illustration of the wheel of FIG. 1 provided with a module including an accelerometer, the module and its accelerometer being mounted such that its sensing axes are angularly misaligned with true traverse, radial and tangential axes of the wheel; and FIG. 20 is a fourth implementation of a wheel- and tyre-monitoring apparatus for use when implementing the present invention for use with the wheel of FIG. 19, the monitoring apparatus being operable to process acceleration signals.

DETAILED DESCRIPTION

1. Context of the Present Invention

Commercial enterprises which operate fleets of vehicles, for example fleets of heavy commercial vehicles, face different problems with vehicle maintenance and safety in comparison to private automobile owners for which simple contemporary tire monitoring devices have already been developed as elucidated in the foregoing. Reliability and safety for an enterprise operating a fleet of vehicles is extremely important on account of one accident, breakdown or legal incident potentially adversely affecting the enterprise's reputation and relationship with its customers. Vehicle maintenance, and avoidance of vehicle technical problems before they arise and cause disruption, is of considerable importance to enterprises operating fleets of vehicles.

In a fleet of vehicles, for example heavy commercial vehicles, there are multiple vehicles, and a set of wheel hubs for the vehicles which are equipped with new tires at various times. Wheel hubs can potentially be swapped between vehicles and be sporadically furnished with new tires when their existing tires are deemed to have been worn out. Moreover, in certain climates, for example Northern Europe and Canada, there is a legal requirement to switch between winter tires and summer tires; such switch between winter tires and summer tires is achieved by exchanging wheel hubs rather than removing tires from their respective hubs. Wheels are therefore customarily placed in storage when not in use on vehicles. When the wheels and their associated tires are in storage, various abuse events can potentially arise which can adverse effect vehicle safety when the wheels and their tires are reinstalled onto vehicles again. Such abuse events include tampering events for example.

Enterprises operating fleets of vehicles normally achieve greatest commercial efficiency when their vehicles are virtually all in use earning revenue; vehicles undergoing repair or standing idle represent an investment which does not generate profit, and can even represent a depreciation in value. An issue associated therewith is efficient maintenance of vehicles which are intensively in use, especially with regard to their wheels and tires. The present invention is of benefit by enabling improved identification of wheels modules for monitoring and predicting potential problems with wheels and tires; fleet vehicles can, for example, be recalled or rescheduled for maintenance purposes. Increased quality of monitoring is achieved by using more optimal and innovative sensor configurations and associated data processing. Such improved monitoring is achieved by employing complex configurations of wheel monitors which themselves represent a complex management and data gathering problem.

Referring to FIG. 1, there is shown in side view a schematic diagram of a wheel of a heavy commercial vehicle. The wheel is indicated generally by 10. Moreover, the wheel 10 comprises a steel hub indicted by 20 and a tire (tire) denoted by 30. The tire 30 is contemporarily often tubeless, namely does not include any separate inner tube. A circular inner flange 40 of the hub 20 includes a circular arrangement of mounting holes 50 for receiving bolts or similar fasteners for attaching the wheel 10 to an axle (not shown in FIG. 1) of its associated vehicle. Extending radially outwards from the inner flange 40 is a substantially frusto-conical web 60 having a radial series of circular or elliptical ventilation holes 70 formed therein as illustrated, for example one of these ventilation holes 70 enables access to an air valve 80 in fluid (air) communication with a volume enclosed by the tire 30 for purposes of inflating or deflating the tire 30. At its perimeter, the frusto-conical web 60 is coupled to a circular rim 90. The circular rim 90 is operative to receive the tire 30.

Figure 2:
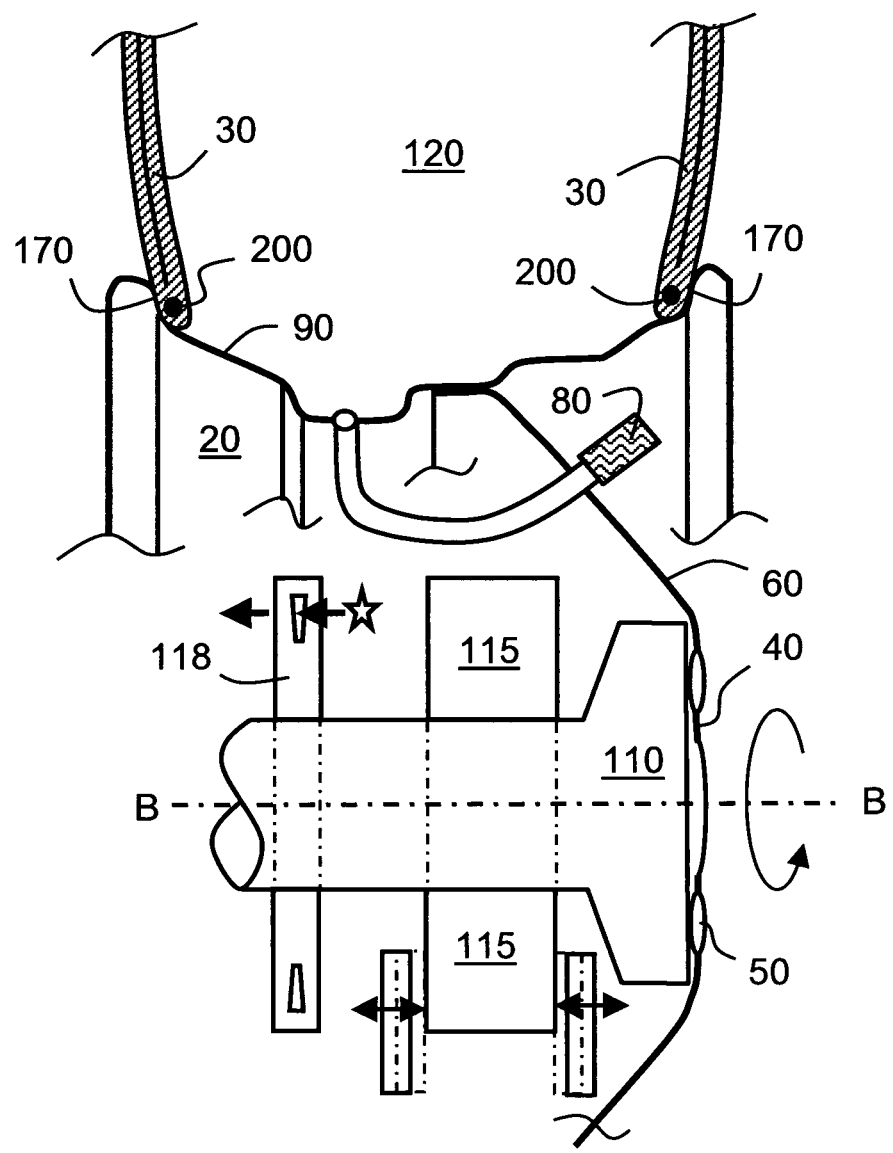
FIG. 2 is a schematic cross-sectional view of a portion of the wheel of FIG. 1.

In FIG. 1, a cross-sectional axis is denoted by A-A and a corresponding cross-sectional view of the wheel 10 is shown in FIG. 2 for substantially an upper portion of the wheel 10. The wheel 10 has a general form which has evolved over many years to substantially an optimal implementation for reasons which will now be elucidated. The inner flange 40 is provided with its regularly spaced configuration of mounting holes 50 for mounting securely the wheel 10 using aforementioned bolts or fasteners to an end of a wheel axle 110 of the corresponding vehicle; the wheel axle 110 is operable to rotate about an axis B-B. An excess of holes 50 is often provided to be more certain of retaining the wheel 10 onto the wheel axle 110. Usually, for heavy commercial vehicles, a disc brake 115 is included near an end of the wheel axle 110 in relative close proximity to the frusto-conical web 60 and its associated ventilation holes 70. Moreover, an ABS angular sensor encoder 118 for implementing an ABS baking system for sensing an angular orientation of the axle 110 and hence that of the wheel 10 is contemporarily included as standard components on heavy commercial vehicles; the angular sensor encoder 118 is operable to generate a signal indicative of an angular orientation □ of the wheel 10. The angular sensor encoder 118 is often implemented as an optical, electrostatic and/or magnetic sensing device.

In operation, when bringing a commercial vehicle weighing 10 tonnes from a speed of 80 km/hour to standstill within a few seconds corresponds to absorbing kinetic energy in an order of 3×10⁶ Joules which can result in an instantaneous rate of energy dissipation in the disc brake 115 associated with the axle 110 in an order of ten's of kilowatts. The holes 70 in the frusto-conical web 60 thus enable air circulation to reach one or more metal discs of the disc brake 115 for cooling purposes. Moreover, the holes 70 in the web 60 also assist to reduce an unsprung weight of the wheel 10 without adversely influencing its mechanical strength, as well as providing access for the valve 80. The rim 90 has various ridges formed therein to enhance its mechanical strength and also has end ridges 170 to provide reliable retention of the tire 30 in operation. The tire 30 encloses a volume denoted by 120 which is maintained at an elevated pressure P during operation.

Figure 3:
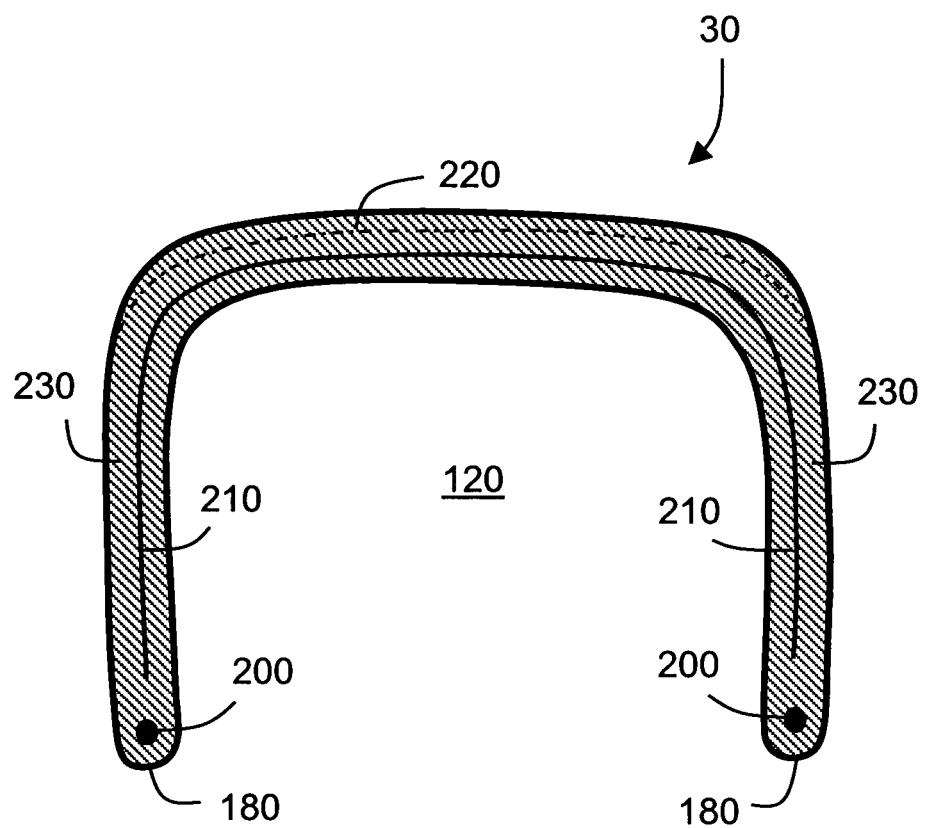
FIG. 3 is a schematic cross-sectional view of a tire (tire) of the wheel of FIG. 1.

Referring next to FIG. 3, an illustrative cross-sectional view of a portion of the tire 30 is shown. The tire 30 includes inner edges 180 for abutment onto the ridges 170 of the circular rim 90. The inner edges 180 are often reinforced using steel rings or bands 200 molded into the tire 30. Moreover, the tire 30 includes one or more reinforced woven metal and/or reinforced fibre meshes 210 embedded by molding into the tire 30. A tread portion 220 of the tire 30 has a greater radial thickness in comparison to a lateral thickness of side walls 230 of the tire 30, the tread portion 220 is thicker for accommodating treads of the tire 30. In operation, the tread portion 220 is operable to provide a firm grip to a road surface (not shown) as well as a water draining function, whereas the walls 230 are designed to periodically elastically flex when the wheel 10 with its associated tire 30 rotate in-operation on the road surface.

Figure 5:
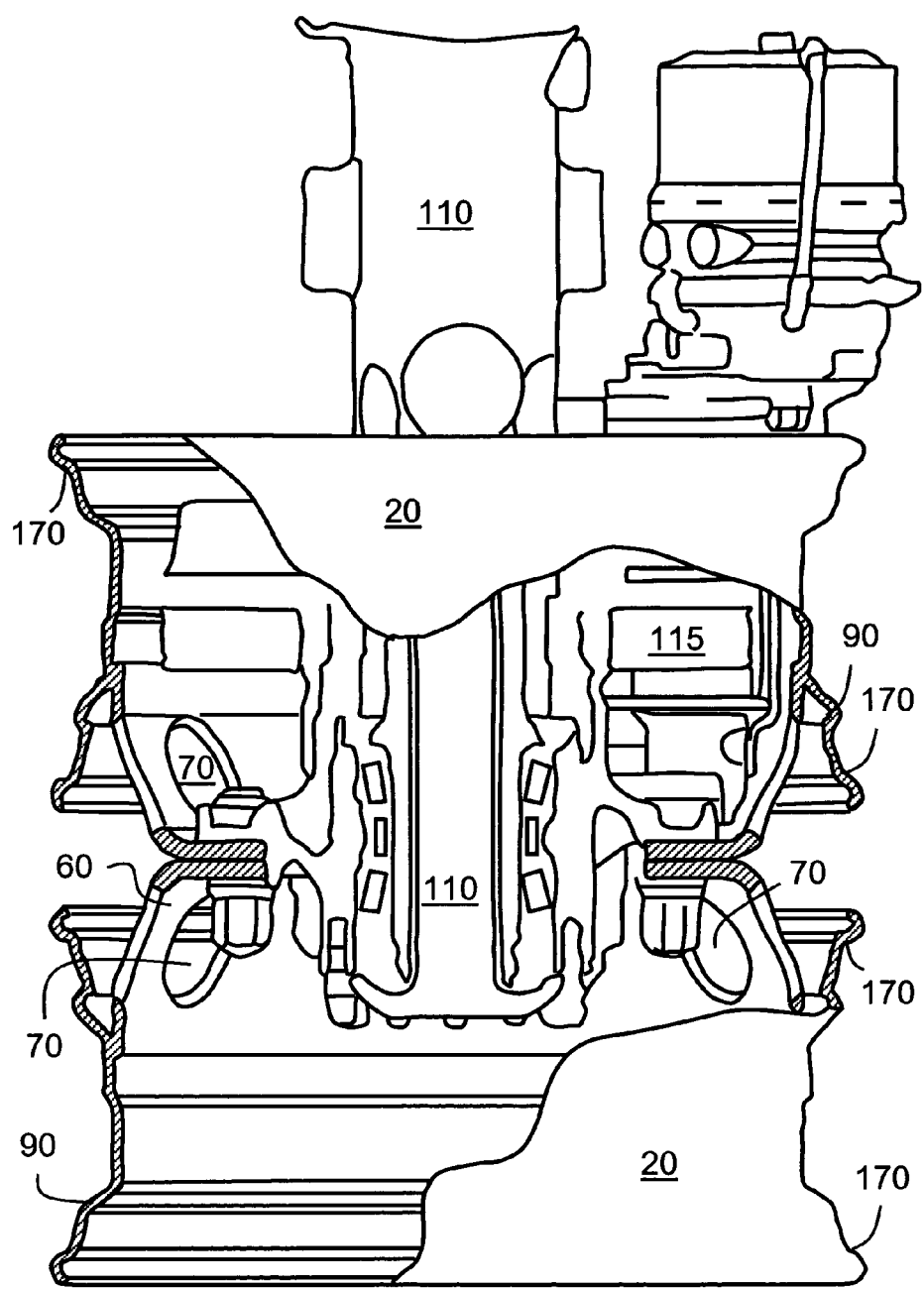
FIG. 5 is a cross-sectional view of a contemporary rear wheel assembly of a heavy commercial vehicle.

There are several potential modes of failure of the tire 30, and even of the wheel 10, which an enterprise operating a fleet of vehicles, for example heavy commercial vehicles, employing such wheels 10 would desire to identify and correct before various modes of failure cause breakdown, accident or delay involving vehicles. Problems that are encountered include:

(a) the air pressure P in the tire 30 is too low causing excessive flexure of the walls 230 and associated one or more meshes 210 with a risk of them work-hardening and prematurely fracturing; when the air pressure P is too low, there arises an excessive contact area between the tire 30 and a road surface interfacing to the tire 30 causing excessive tire wear, and also increased rolling resistance and hence poor vehicle fuel economy; too much contact area between the tire 30 and the road surface can also paradoxically result in inferior grip between the tire 30 and the road surface in icy and snowy conditions because contact force between the tire 30 and the road surface is not as concentrated as ideally desired to force the tire 30 to conform to surface irregularities in the road surface susceptible to providing grip. Excess deformation of the tire 30 when its internal air pressure P is too low potentially causes excess energy dissipation by a degree of non-elastic deformation within the tire 30 with associated temperature rise resulting therefrom which can, in a worst case, exceed a temperature which material from which the tire 30 is fabricated is able to tolerate. Moreover, when the pressure P within the tire 30 is too low, there is also a risk that the inner edges 180 loose their seal with the ridges 170 when subject to severe lateral stress, for example when scuffing along a curb stone, with subsequent sudden loss of air from the tire 30;

(b) one or more of bolts or fasteners applied to the holes 50 for securing the wheel 10 to the wheel axle 110 can potentially be inadequately tightened during attachment of the wheel 10 to the axle 110, or are susceptible to potentially working loose in operation; such loosening and potential loss of one or more of the bolts or fasteners can result in the wheel 10 wobbling or rattling on the axle 110 and, in a worst case, even becoming detached from the axle 110 and rolling off(!);

(c) the tire 30 and/or the valve 80 can develop a leak such that a partial loss of the pressure P within the tire 30 in operation arises; if such loss of pressure P is undetected, problems as outlined in (a) in the foregoing can potentially arise; however, the pressure P is a function of a temperature of the tire $T_{tire}$, and also whether or not the tire 30 is periodically maintained by being recharged with compressed air or other gas through its valve 80;

(d) the tire 30 can develop in use an imbalance, for example a portion of rubber of the tire 30 can become unevenly eroded with use, or a balancing weight earlier added to the wheel 10 can become detached from the wheel 10; in a situation of a double-tire arrangement as illustrated in FIG. 5 often employed at a rear of a heavy commercial vehicle, it is known for a building brick or similar object to occasionally become wedged between the double-tires and represent a dangerous projectile in an event of the object subsequently becoming dislodged by centrifugal force whilst the double wheel is rotating; such ejected objects from tires potentially represents a considerable danger when they smash through an automobile front window resulting in injury or accident; and (e) the tire 30 can become oval or distorted in some other symmetrical manner which does not necessarily cause an asymmetrical imbalance to the wheel 10; moreover, the hub 20 itself can become bent and thereby skewed out-of-plane without necessarily causing an asymmetrical imbalance in the wheel 10.

Figure 4:
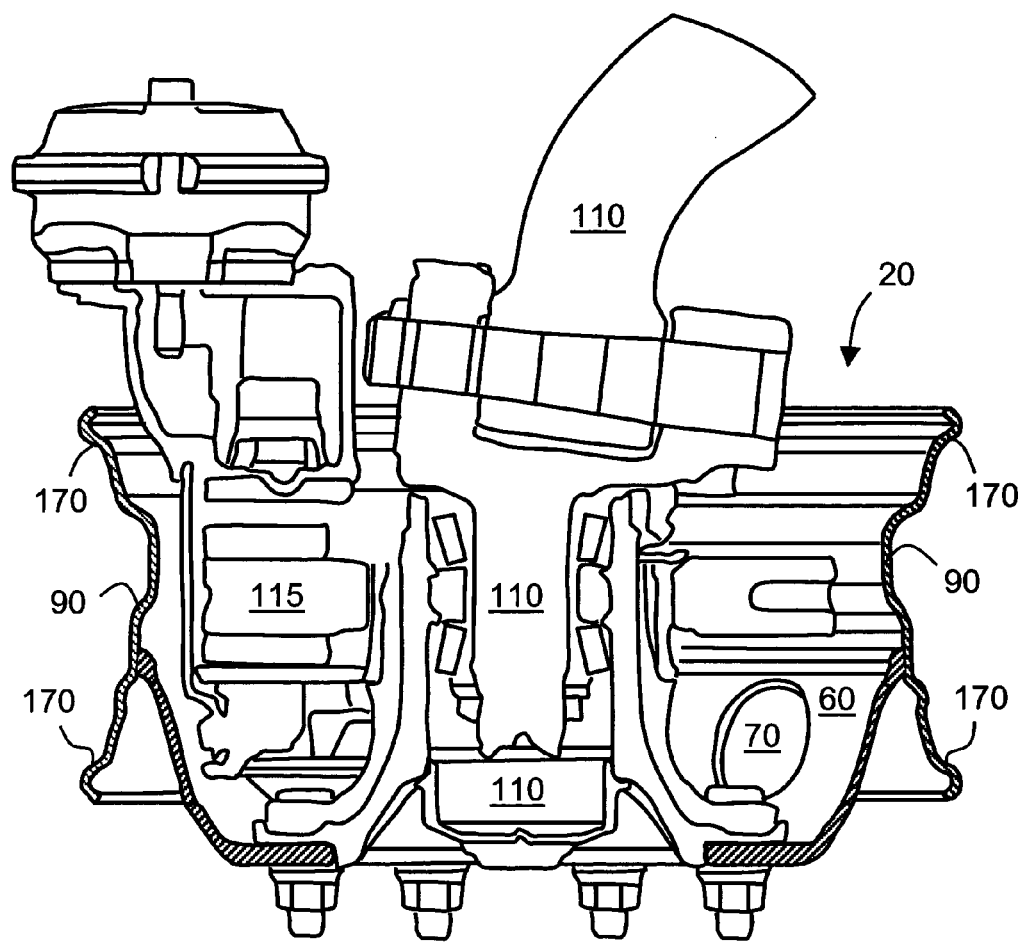
FIG. 4 is a cross-sectional view of a contemporary front wheel assembly of a heavy commercial vehicle.

Referring to FIGS. 4 and 5, there are shown diagrams of example contemporary manufactured front and rear wheel assemblies of a heavy commercial vehicle to illustrate how compact regions around vehicle wheels are in practice. There is little extra volume in the front and wheel assemblies for accommodating additional instrumentation for monitoring wheel operating conditions. Amongst other factors, components associated with the aforesaid brake 115 are included in close proximity to the wheel 10 in operation; the brake 115 has associated therewith other components such as servo actuators for forcing brake pad components against a disk component of the brake 115. However, it is conventional practice to include around the wheel axle 110 and in close proximity to the wheel 10 the aforesaid ABS sensor encoder 118 (not shown in FIGS. 4 and 5) for measuring the angular position □ of the wheel 10 when mounted on its axle 110.

Characteristics which are beneficial to measure in order to monitor wheel 10 and associated tire 30 condition include temperature T, pressure P and instantaneous acceleration A during operation. It is additionally also feasible to include film strain gauges within or bonded onto walls 230 of the tire 30 to measure their wall flexure. Temperature T and acceleration A can be measured at various spatial positions on the wheel 10 with mutually different results, whereas the pressure P developed within the volume denoted by 120 enclosed by the tire 30 in operation is effectively similar because the pressure P equalizes in a relatively short period of time; pressure equalization is estimated to occur within a few milliseconds on account of pressure pulses being able to propagate at a velocity in an order of 250 meters/second within the volume 120. The wheel 10 has a diameter in the order of 1 meter.

Figure 6:
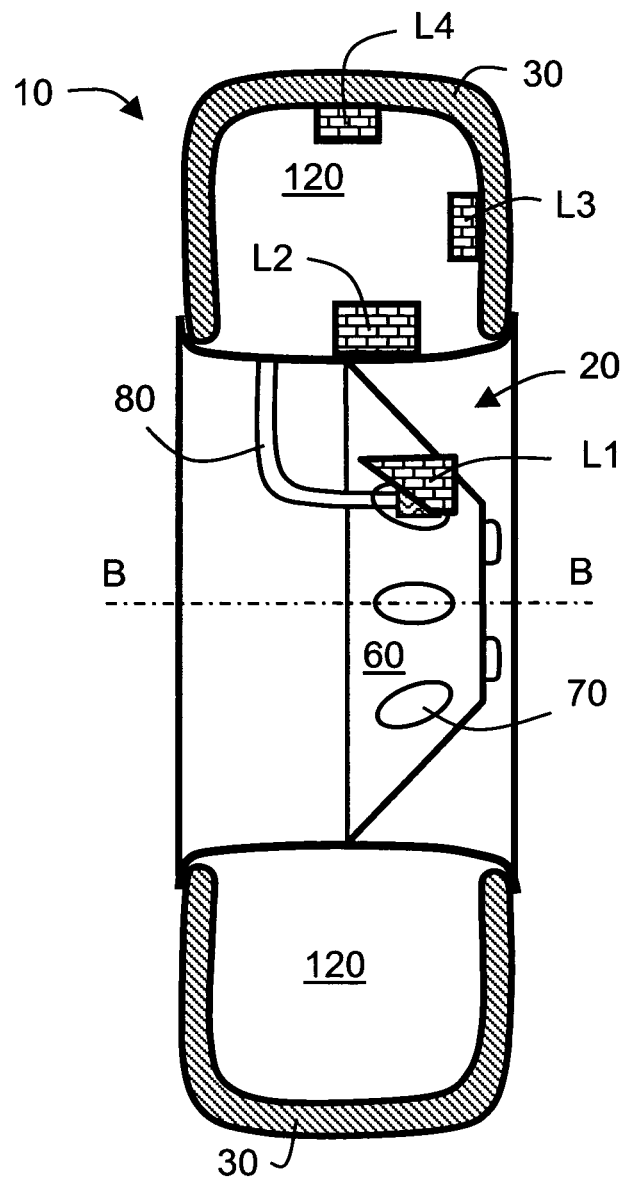
FIG. 6 is a schematic cross-sectional view of the wheel of FIG. 1 illustrating potential locations for mounting monitoring modules for use pursuant to the present invention; the potential locations include hub-mounting at a location L1, hub rim-mounting at a location L2, and in-tire mounting at a sidewall location L3 and a in location L4.

FIG. 6 illustrates schematically categories of locations whereat sensors are beneficially mounted to the wheel 10. When several sensors are included at each category of location, the several sensors are beneficially distributed at positions angularly distributed around the wheel 10 for providing most representative information indicative of operation of the hub 20 and its tire 30.

At a location L1, fasteners are beneficially employed to attach a first sensor module to the hub 20 or even via one or more of the holes 50 to the axle 110. The first sensor module is capable of monitoring the tire pressure P by way of fluid (air or gas) communication to the valve 80, is capable of monitoring a temperature $T_{hub}$ of the hub 20 and is capable of sensing accelerations A in one-, two- or three-orthogonal axes (x, y, z) at the hub 20 depending upon type of accelerometer employed. Beneficially, one or more of a pressure sensor and an accelerometer included in the first sensor module for performing measurements are silicon micromachined integrated electronic components contemporarily known as MEMS ("Micro-Electronic Mechanical Systems"). The temperature $T_{hub}$ of the hub 20 will often be different from the temperature $T_{tire}$ of the tire 30; a temperature $T_{mod}$ measured at the first module is hence not ideally representative of the tire 30 temperature $T_{tire}$ and thus condition of the tire 30; the hub 20 will often be subject to direct cooling air flows, and during braking events will be heated up rapidly by warm air flowing from the associated disc brake 115 which, as elucidated in the foregoing, can be subject to sudden peak dissipations of energy of many kiloWatts, for example during and shortly after performing emergency braking. The first module at the location L1 is not totally screened by conductive components which renders short-distance wireless communication possible between the first module and an electronic control unit (ECU) or electronic management system of the vehicle. The first sensor module at the location L1 is most accessible and susceptible to being retrofitted to vehicles with minimal mechanical changes being required.

Figure 7:
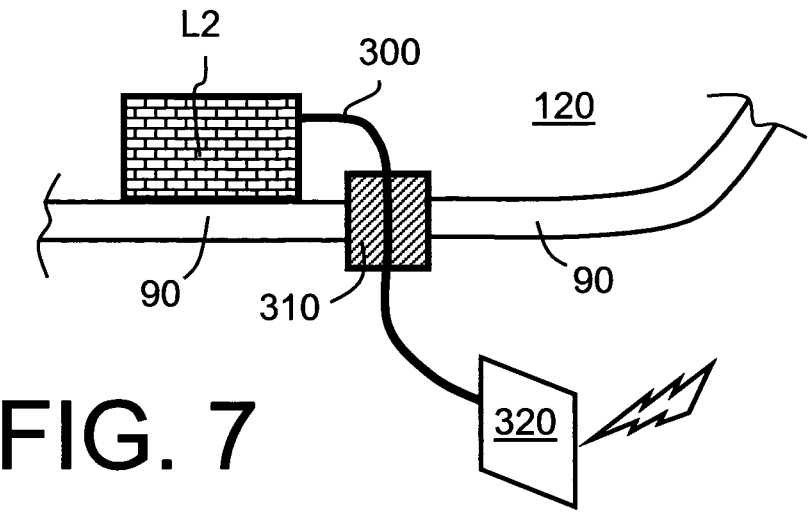
FIG. 7 is a schematic cross-sectional view of a tire of the wheel of FIG. 1 with its monitoring module mounted at a location L2 on a rim of a hub of the wheel with a wire connection from the module to a patch antenna exposed on the hub.

A second sensor module is beneficially mounted to an inside surface of the rim 90 at a location L2 and thereby is subject directly to the pressure P developed within the tire 30 in operation. The second module at this location L2, when measuring the temperature $T_{mod}$ thereat, is capable of providing an accurate measurement of the temperature $T_{tire}$ of the tire 30 as well as the aforesaid pressure P. Moreover, one or more accelerometers included within the second module for measuring the acceleration A at the location L2 are at a greater radial distance from the axis B-B (see FIG. 2) than the first module at the location L1, and are therefore subject to greater radial components of acceleration resulting from rotation of the wheel 10. A disadvantage of mounting the second sensor module at the position L2 is that the mesh 210 in combination with the rim 90 have a tendency to form a Faraday cage which severely attenuates wireless transmissions from the second module, unless the second module has an antenna exit through the rim 90, for example a small air-tight hole through which an antenna wire coupled to the second module at the position L2 is extended out onto the frusto-conical web 60 for enhancing wireless communication efficiency. In FIG. 7, there is shown an example wherein the second module at the location L2 is coupled via an antenna wire 300 through an insulated feed-through 310, installed in the rim 90 and operable to withstand the pressure P, to a film metal patch antenna 320; optionally, the patch antenna 320 is affixed to the frusto-conical web 60 for mechanical protection. Alternatively, or additionally, the second module at the location L2 is electrically coupled to the mesh 210 of the tire 30 and is operable to employ this mesh 210 as an antenna for communicating by wireless to the aforesaid electronic control unit (ECU) or an electronic vehicle management system. As a yet further alternative, the second module at the location L2 can be directly electrically coupled by wire through the feed-through 310 or by conductive film connection to the first module at the location L1 and optionally derive power therefrom as well as communicating measurement data thereto.

Figure 8:
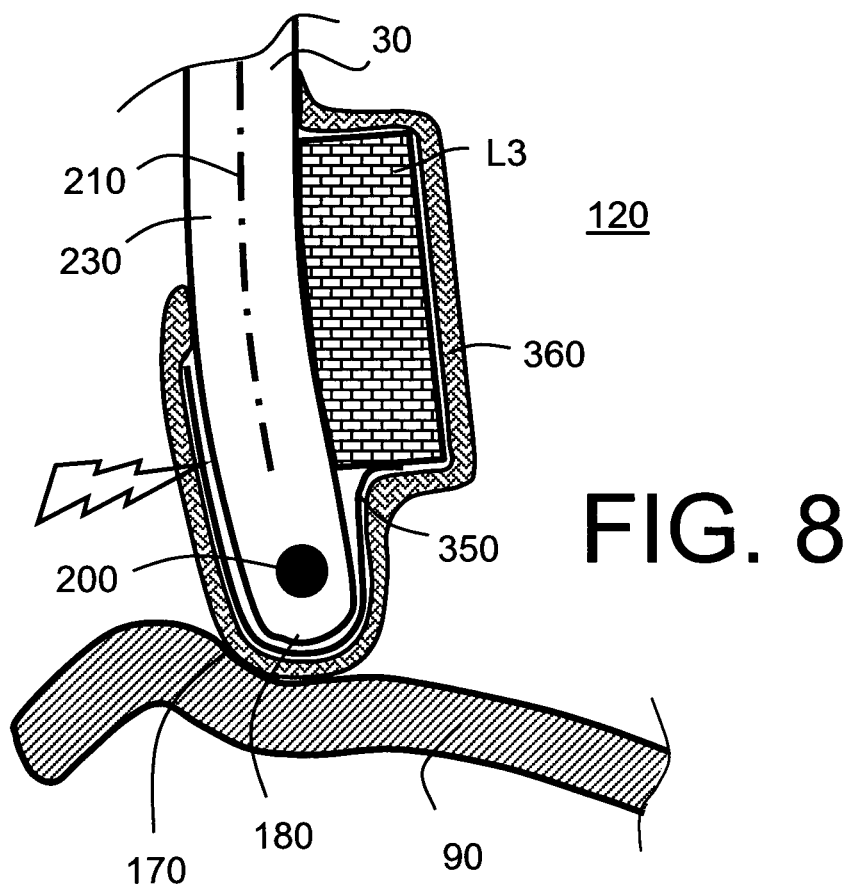
FIG. 8 is a schematic cross-sectional view of a tire of the wheel of FIG. 1 with its monitoring module mounted at a location L3 on the tire, the module being provided with a film antenna wrapped around an edge of the tire and exposed on an exterior surface of the tyre.

A third sensor module is beneficially mounted on an inside surface of the tire 30 at a location L3, for example by bonding the third module onto the tire 30 using rubber or plastics material bonding agents or similar before the tire 30 is mounted to the hub 20; alternatively, use of snap-type press-fit mounting of the third sensor module to the tire 30 is also feasible and faster to employ when manufacturing and servicing the tire 30. The third module at the location L3 is capable of measuring the temperature $T_{mod}$ thereat and thereby providing a direct representative indication of tire temperature $T_{tire}$, a representative direct indication of the pressure P and is also able to provide an representative indication of flexural characteristics of the walls 230 of the tire 30 by way of acceleration A measurements or strain gauge measurements; however, the acceleration signals generated by the third module at the location L3 are a complex modulation of various acceleration components as the wheel 10 rotates in operation and its side walls 230 flex, whereas the accelerometer of the first module mounted at the location L1 is operable to generate acceleration signals which include a relatively greater magnitude of linear acceleration components therein which renders the first module at the location L1 potentially better suited for monitoring such linear acceleration components. Optionally, the third module at the location L3 is also coupled to one or more resistive-film or fibre-optical strain gauge sensors (not shown) coupled onto or even embedded within the rubber material of the tire 30, for example onto the side wall 230 and/or peripheral rim of the tire 30. The third module mounted at the location L3 suffers a similar wireless communication problem to the second module at the location L2 in that the mesh 210 in combination with the rim 90 functions as a Faraday cage to attenuate wireless communication from the volume 120 within the tire 30. In order to improve wireless communication, the third module at the location L3 is optionally provided with a thin-film conductive antenna 350, for example fabricated by metal film sandwiched between layers of flexible insulating material such as Kapton as illustrated in FIG. 8. The antenna 350 is beneficially wrapped around the inner edges 180 and up around an outside wall surface of the tire 30. The second module at the location L2 is also susceptible to being provided with such a thin-film antenna, for example disposed over an edge of the rim 90 and even extending onto the frusto-conical web 60. However, such thin-film antennas are susceptible to being damaged when the tire 30 is installed onto the hub 20 unless adequately protected with a rubber protective film 360 or similar component added to provide mechanical protection. Alternatively, or additionally, the third module is susceptible to having its antenna coupled electrically to the mesh 210 of the tire 30 which is then capable of functioning as an antenna; the third module is beneficially provided with an electrical piercing pin for penetrating during installation through an inside of the side wall 230 for providing an electrical connection to the conductive mesh 210. Yet alternatively; the second module at the location L2 can be operable to function as a wireless relay node for conveying signals from the third module at the location L3 via the second module at the location L2 to an electronic control unit (ECU) of the vehicle; such nodal communication between modules mounted onto the wheel 10 will be elucidated in more detail later and corresponds to the modules cooperating to form a communication network.

A fourth module is optionally mounted at a location L4 adjacent a tread region of the tire 30 and functions in a generally similar manner to the third module mounted at the location L3.

Figure 9:
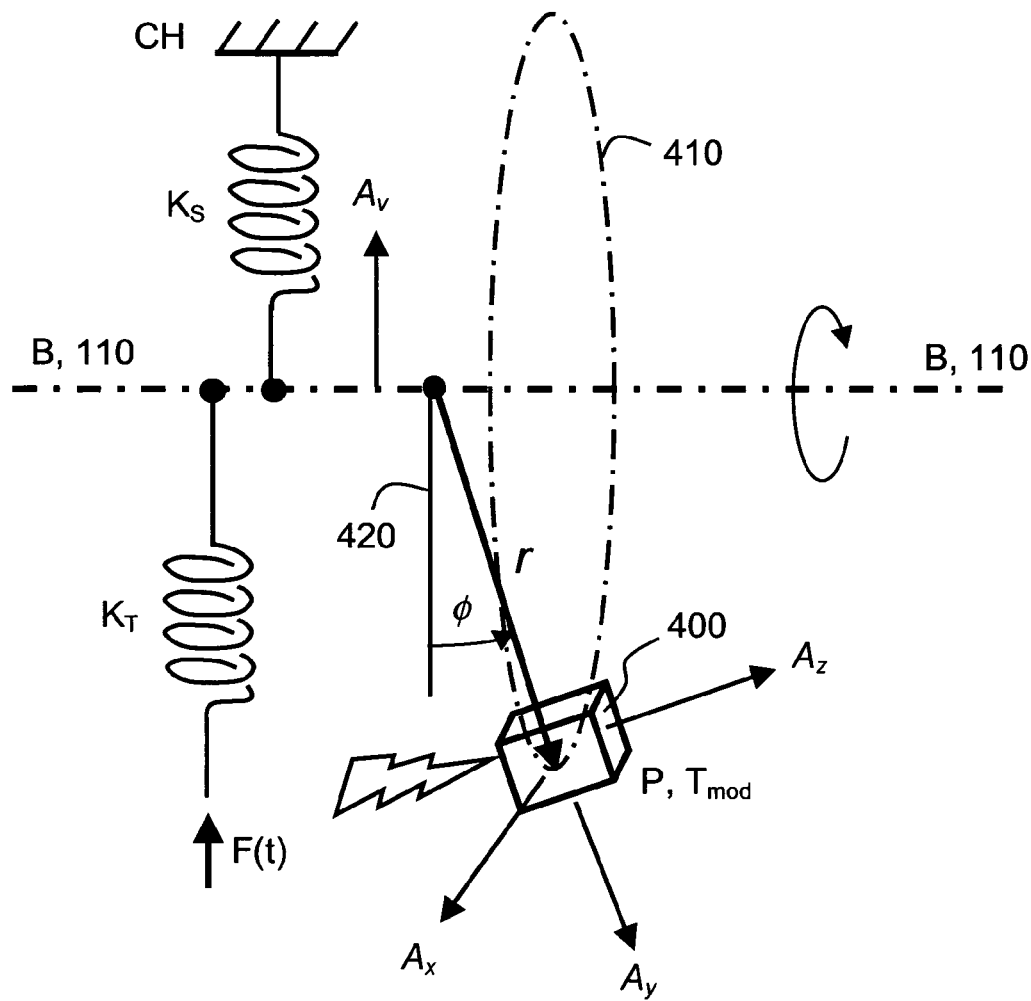
FIG. 9 is a schematic diagram illustrating spatial movement of a monitoring module mounted on the wheel of FIG. 1, together with a representation of a spring suspension together with a representation of forces acting upon the wheel when in operation.

Measurement signals generated by the first, second and third modules at the locations L1, L2 and L3 respectively will now be further elucidated with reference to FIG. 9.

In FIG. 9, there is shown the axis of rotation B-B around which the wheel 10 revolves in operation. The wheel 10 is provided via the axle 110 with a leaf spring and/or air pneumatic suspension coupled to a chassis CR of the vehicle; the suspension is denoted by a spring constant $K_s$. Forces applied to the tire 30 from a road surface in contact with the tire 30 are denoted by a force F(t); the tire 30 has a spring compliance described by a spring constant $K_T$ which is dependent on the pressure P within the tire 30 and also mechanical design of the tire 30. The first, second and third sensor modules at the locations L1, L2 and L3 respectively are each denoted by a module 400 which circumscribes in operation a radial path denoted by 410 when the wheel 10 rotates around the axis B-B corresponding to the axle 110. The radial path 410 has a radius r and the module 400 is inclined at an inclination angle □ relative to a normal radial direction 420. The module 400 is operable to measure at least one of:
 (a) a temperature $T_{mod}$ at the module 400;
 (b) the pressure P at the module 400; and
 (c) linear acceleration in one or more axes x, y, z as, for example, illustrated in FIG. 9, wherein the z-axis is parallel to the axis B-B when the inclination angle □ is 0 degrees, the y-axis corresponds to a radial direction for the wheel 10 when the inclination angle □ is 0 degrees, and the x-axis corresponds to a tangential direction whose associated acceleration is weakly affected by the inclination angle □ when near 0 degrees.

When the module 400 is mounted at the location L1, it measures the pressure P of the tire 30 via its valve 80.

As elucidated in the foregoing, the module 400 is optionally furnished with other types of sensors, for example resistive strain gauges, piezo-electric strain gauges, moisture sensors, and so forth if desired. It is convenient, for identification purposes, that the module 400 is optionally provided with a magnetic sensor, for example implemented using a magnetic reed-relay switch operable to electrically conduct when a permanent magnet having, for example, a near-field magnetic field strength of 100 milliTesla is placed in near proximity to the module 400, for example within a distance of 10 cm therefrom.

With reference to FIG. 9, when the wheel 10 rotates at a constant angular rate □, and the inclination angle □ is substantially 0 degrees, the acceleration $A_x$ measured by the x-axis accelerometer is given by Equation 1 (Eq. 1):

$$A_x = g \sin(\omega t + \lambda) \qquad \text{Eq. 1}$$

wherein
 $A_x$=an x-axis acceleration measurement;
 r=a radius from the axis B-B at which the module 400 is mounted;
 □=an angular rotation rate of the wheel 10;
 g=a gravitational constant (circa 10 m/s/s); and
 □=an angular offset.

When the wheel 10 rotates at the constant angular rate □, and the inclination angle □ is substantially 0 degrees, the acceleration $A_y$ measured by the y-axis accelerometer is given by Equation 2 (Eq. 2):

$$A_y = r\omega^2 + g \sin(\omega t + \lambda) \qquad \text{Eq. 2}$$

wherein
 $A_y$=a y-axis acceleration measurement;
 r=the radius from the axis B-B at which the module 400 is mounted;
 □=the angular rotation rate of the wheel 10;
 g=the gravitational constant (circa 10 m/s/s); and
 □=an angular offset.

Beneficially, the wheel 10 when mounted on its axle 110 is provided with the aforementioned ABS angular sensor encoder 118 for measuring the positional angle □ of the wheel 10 and the angular turning rate □=d□/dt of the wheel 10. Disparity of the measured acceleration $A_x$ from Equation 1 with measurements from such an ABS sensor encoder 118 is susceptible to being used detect one or more of:
 (i) detecting malfunction of the ABS sensor encoder 118; and
 (ii) slip of the tire 30 relative to the hub 20, especially pertinent when sensing at the location L3 (although this slip only exceptionally occurs usually with catastrophic results).

Assuming such an ABS encoder sensor 118 is functioning correctly, checking the acceleration $A_x$ against change in turning angle □ determined by the ABS sensor encoder 118 can be, for example, employed to dynamically confirm correct operation of the module 400.

The module 400 is also capable of measuring accelerations $A_y$ and $A_z$ in substantially y- and z-directions respectively when the inclination angle □ is non-zero which is, for example, pertinent for the third module at the location L3 when the wall 230 of the tire 30 flexes, or at the locations L1 and L2 when the hub 20 is loose on its fasteners or skewed in relation to the axle 110. Measured acceleration signals are provided approximately as defined in Equations 3 and 4 (Eqs. 3 and 4):

$$A_z = (r\omega^2 + g \sin(\omega t + \lambda)) \sin \phi \qquad \text{Eq. 3}$$

$$A_y = (r\omega^2 + g \sin(\omega t + \lambda)) \cos \phi \qquad \text{Eq. 4}$$

For the locations L1 and L2, the inclination angle □ for the module 400 mounted in an orientation as depicted in FIG. 9 is normally substantially zero such that the acceleration $A_z$ is normally of a relatively small magnitude and the acceleration $A_y$ is a summation of forces arising from the force F(t) resulting from road surface characteristics, centrifugal components $r\square^2$ arising from turning of the wheel 10 and the force of gravity g modulated by turning of the wheel 10. However, in an event of imbalance of the wheel 10 arising from the hub 20 becoming skewed, for example:
 (a) due to loosening of the fasteners or bolts used to attach the hub 20 via its holes 50 to the axle 110;
 (b) due to the hub 20 becoming deformed due to impact or accident or fracture, or
 (c) the axle itself 110 being out of alignment due to fault or impact,
the inclination angle □ becomes a function of an angle of rotation □ of the wheel 10 as defined by Equation 4 (Eq. 5):

$$\phi = \phi_{max} \sin(\omega t + \mu) \qquad \text{Eq. 5}$$

wherein
 $\square_{max}$=a misalignment angle; and
 □=angular offset regarding rotation of the wheel 10,
such that Equations 3 to 5 are then susceptible to being used in combination for determining a nature of the measured accelerations $A_y$ and $A_z$ from the module 400 mounted at the locations L1 and L2. The acceleration signal $A_z$ is thus useful, pursuant to the present invention, for identifying angular misalignment or fastener problems by monitoring using modules 400 at one or more of the locations L1 and L2. However, the module 400 mounted at the location L3 is subject to considerable flexure of the wall 230 which tends to dominate in magnitude with regard to angular change over angular misalignment of the axle 110 or lateral wobbling of the wheel 10. Moreover, as elucidated in the foregoing, mounting the module 400 at the location L1 is beneficial for measuring the pressure P of the tire 30 from its valve 80, but the temperature $T_{mod}$ measured by the module 400 at the location L1 is not an accurate representation of temperature $T_{tire}$ of the tire 30 on account of intermittent heating of the brakes 115 in operation. Furthermore, mounting the module 400 at the location L2 is beneficial for measuring the pressure P of the tire 30, as well as measuring a representative operating temperature of the tire 30 (namely $T_{mod}=T_{tire}$ at the location L2).

When the module 400 is mounted at the location L3, it is capable of providing a representative measurement of the pressure P and the temperature of the tire 30 (namely $T_{mod}=T_{tyre}$). However, periodic flexure of the wall 230 of the tire 30 when the module 400 is mounted at the location L3 results in the inclination angle φ being a strong function of the angle of rotation θ of the wheel 30; the inclination angle φ then becomes substantially, to a first approximation, the flexural angle of the wall 230 of the tire 30. For the module 400 mounted at the location L3, the inclination angle φ then becomes a series function as defined in Equation 6 (Eq. 6):

$$\phi = \phi_0 + G(P) + H(P)\sum_{i=1}^{n}(k_i \sin(i(\omega t + \varepsilon_i))) \quad \text{Eq. 6}$$

wherein

φ_a=angular offset;
G(P)=a function describing a change in angle of the wall 230 of the tire 30 as a function of changes in the pressure P therein for a portion of the tire 30 not in contact with a road surface;
H(P)=a function dependent on the pressure P describing an angular deflection of the wall 230 when its portion of tire 30 comes in contact with the road surface;
k=a harmonic coefficient;
i=a harmonic index number;
ω=the angular rate of rotation of the wheel 10; and
ε_i=an angular offset.

Figure 10:
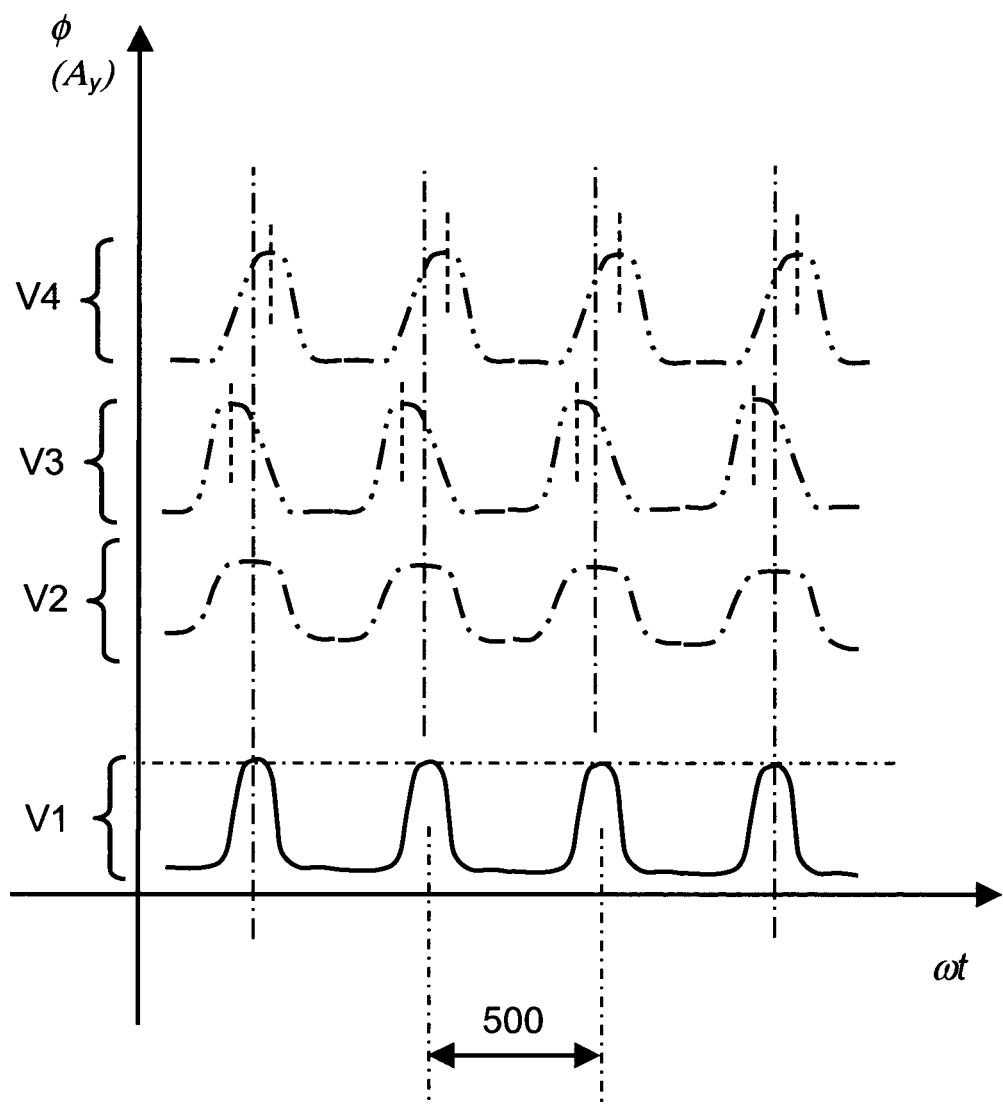
FIG. 10 is an graph illustrating a general form of acceleration signal obtainable in operation from the monitoring module mounted at the location L3 as shown in FIG. 6.

FIG. 10 provides in a signal V1 a qualitative illustration of the angle φ when the module 400 is mounted at the location L3 and the wheel 10 is rotating; the inclination angle φ changes rapidly with flexure of the tire wall 230 when a portion of the tire 30 carrying the module 400 on its inside wall 230 comes into contact with a road surface. An abscissa axis in FIG. 10 represents the rotation angle θ with time t, namely angle θ=ωt; an ordinate axis in FIG. 10 represents substantially the wall inclination angle φ. A period 500 corresponds to one complete revolution of the wheel 10, namely ωθ=2π.

Examples of a wheel monitoring apparatus, generally denoted by 1, is shown in FIGS. 11, 12 13 and 20. The wheel monitoring apparatus 1 may include any one of the data processing apparatuses 600, 680, 690 and 2200 shown in FIGS. 11, 12, 13, and 20.

Apparatus for use with the present invention is, for example, capable of being employed in a first analysis method including steps of computing expected performance characteristics of the tire 30 and then comparing the expected performance characteristics against measured characteristics.

The first method includes steps as follows:
(a) for a given type of tire 30 defining the angle φ₀ and the functions G and H in Equation 5, for a given pressure P measured for the tire 30, for a given temperature $T_{tire}$ measured at the tire 30, and for a given angular rotation rate ω of the tire 30 determined for example from the aforesaid ABS encoder sensor 118, computing a corresponding expected simulated angle φ, and deriving therefrom a simulated magnitude of the acceleration $A_z$ as would be expected to be generated from the accelerometer included in the module 400 mounted at the location L3;
(b) sensing representative samples of the acceleration $A_z$ as measured by the module 400; and
(c) checking to determine whether or not the simulated and measured accelerations $A_z$ mutually differ by more than a predefined threshold amount; if they do not mutually substantially correspond, there is inferred therefrom that the tire 30 is potentially defective and needs to be replaced.

For example, it is potentially possible to identify degradation of the mesh 210 before failure of the tire 30 occurs in operation. Such simulation beneficially requires harmonic synthesis to be executed on computing hardware included within the module 400 and/or in an electronic control unit (ECU) of the vehicle to derive the simulated acceleration $A_z$.

Apparatus for use with the present invention is, for example, capable of being employed in a second analysis method including steps of sampling data representative of the acceleration $A_z$ occurring in operation at the tire 30, subjecting the sampled data to harmonic analysis, for example by applying Fast Fourier Transform (FFT) or similar type of transform, then deriving parameters from the harmonic analysis, and then comparing the computed parameters with those that are expected for the tire 30; if there is a mutual difference between the computed and expected parameters for the tire 30 by more than a predefined threshold amount, potential failure of the tire 30 can be detected and the tire 30 replaced if necessary. The second method includes steps as follows are executed:
(a) sampling signals generated by the accelerometer in the module 400 representative of the acceleration A, to provide corresponding sampled data, and then subjecting the sampled data to harmonic analysis, for example by way of an efficient Fast Fourier Transform (FFT) algorithm, to derive its harmonic content and hence a series of harmonic coefficients; optionally phase relationships between the harmonics, as denoted by ε, in Equation 6 (Eq. 6), are also computed for use when making a comparison;
(b) from the harmonic analysis, in combination with a knowledge of temperature $T_{tire}$ and pressure P of the tire 30, determining a type of tire 30 present on the wheel 10, based upon a look-up reference list of tire characteristics such as suppleness and elasticity as well as tire wall shape and profile; and
(c) comparing the determined type of tire 30 with the actual identification of type for the tire 30; if there is mutual variance therebetween by more than a predefine threshold amount, the tire 30 is determined to be potentially faulty and potentially in need of being replaced.

When utilizing the aforesaid second method, in an event of the predicted tire and the actual tire 30 on the wheel 10 being mutually at variance, degradation or fault in the tire 30 can thereby be inferred therefrom. As will be elucidated later, it is beneficial that the module 400 when mounted on the wall 230 of the tire 30 as depicted in FIG. 8 be provided with a distinguishing identification code (ID). The code is beneficially indicative of the characteristics of the tire 30 to which the module 400 is attached at the position L3. The module 400 is operable to communicate the identification code (ID) by wireless to an electronic control unit (ECU) which is operable to execute the variance comparison. Beneficially, harmonic analysis is also applied to one of more of the acceleration signals $A_x$ and $A_y$ for further confirming reliability of the harmonic analysis executed pursuant to this second method.

Whereas the module 400 mounted at the location L3 is especially effective for detecting potential problems or defects arising in respect of flexure and dissipation within the tire 30, the module 400 mounted at the location L1 is especially effective for measuring variations in asymmetry in the wheel 10, and also for determining a type of asymmetry in the wheel 10 and its associated tire 30. Even more preferably for detecting imbalance and also type of imbalance in the wheel 10, the module 400 is mounted in a non-rotating manner onto the shaft 110 substantially corresponding to the axis B-B. However, more wheel diagnostic information regarding imbalance in the wheel 10 is susceptible to being derived when the module 400 is mounted onto the wheel 10 and operable to rotated with the wheel 10, preferably near its axis B-B of rotation, for example substantially at the location L1. As will be elucidated in more detail later, monitoring the pressure P as the wheel 10 rotates provides unexpectedly considerable additional information regarding performance of the tire 30, for example multi-lobed distortions of the tire 30.

Figure 11:
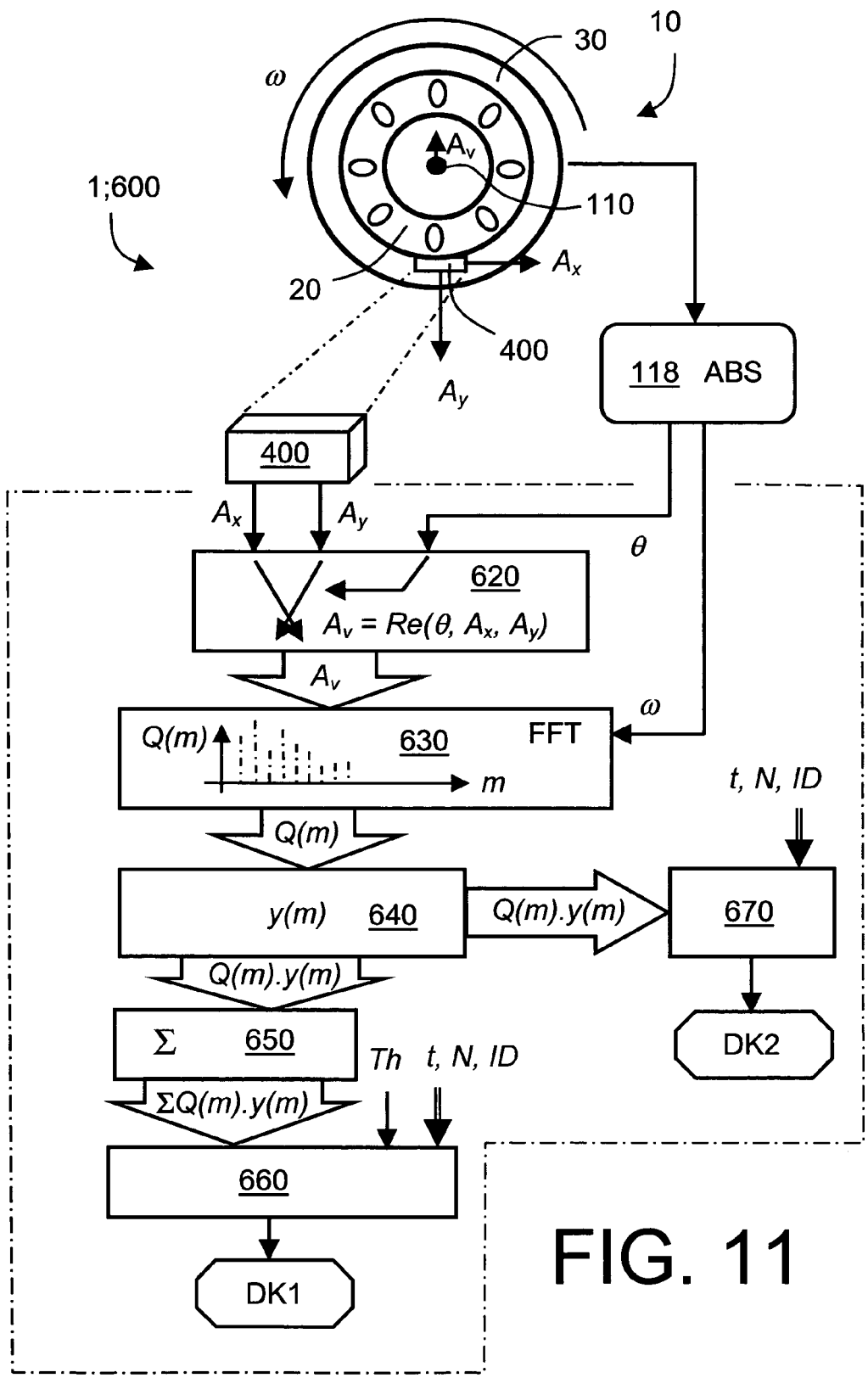
FIG. 11 is a first implementation of a wheel- and tyre-monitoring apparatus for use pursuant to the present invention with the wheel of FIG. 1, the monitoring apparatus being operable to process acceleration signals.

Referring to FIG. 11, there is shown a data processing apparatus pursuant to the present invention indicated generally by 600; the data processing arrangement is operable to provide wheel- and tyre-monitoring. The data processing apparatus 600 is capable of being implemented in at least one of the module 400 and the aforesaid electronic control unit (ECU), depending upon where the processing is susceptible to being most conveniently and efficiently executed. Moreover, the processing arrangement 600 is susceptible to being implemented in at least one of hardware, and software executable in operation on computing hardware. The software is beneficially provided as a software product executable on the computing hardware. The software product is beneficially conveyed to the apparatus 600 on a data carrier; the data carrier is beneficially at least one of: a solid-state electronic data carrier, a wireless signal, an electrical signal, an optical-fibre signal, an optically and/or magnetically readable data carrier.

Under steady-state rotation of the wheel 10, namely with constant angular velocity $\square$, temporal variations in the radial acceleration $A_y$, namely $dAy/dt$, are of substantially zero magnitude for the inclination angle $\square$ being substantially zero, other than effects due to gravity g which are correlated with the rotation angle $\square$ of the wheel 10. Momentary acceleration generated from a road surface onto which the tire 30 contacts in operation results in the force F(t) as shown in FIG. 9 varying with time t and giving rise to varying components in a linear vertically-directed acceleration $A_v$ experienced at the axle 110 which are not correlated with periodic rotation of the wheel 10. However, components in the linear vertically-directed acceleration $A_v$ which correlate with rotation of the wheel 10, for example as referenced by way of the aforesaid ABS encoder sensor 118 providing an indication of the rotation angle $\square$ of the wheel 10 and its angular frequency of rotation $\square$, are of benefit for determining imbalance in the wheel 10, and also potentially elucidating a type of imbalance present in the wheel 10. The ABS encoder sensor and its associated signal processing circuits are denoted by 118 in FIG. 11. When one or more of the modules 400 are mounted onto the wheel 10 at one or more of the locations L1 to L4, they rotate in operation together with the wheel 10. In consequence, the one or more accelerometers in the one or more modules 400 measuring the accelerations $A_x$ and $A_y$ as depicted in FIG. 9 are all sensitive to linear vertically-directed acceleration in response to rotation of the wheel 10. In order to suitably condition the accelerations $A_x$ and $A_y$, it is necessary for the one or more modules 400 and/or an electronic control unit (ECU) in wireless communication therewith to perform angular resolving, for example as described in Equation 7 (Eq. 7):

$$A_v = d_1 \sin(\omega t) A_x + d_2 \cos(\omega t) A_y \qquad \text{Eq. 7}$$

wherein
$d_1, d_2$ = scaling constants.

Such angular resolution is executed in operation in a resolver denoted by 620 in FIG. 11. The resolver 620 beneficially receives its angular reference for the rotation angle $\square$ from the ABS encoder sensor and its associated circuits 118. The resolver 620 also beneficial in being operable to remove an angular dependent component in the acceleration $A_v$ due to gravity g which becomes constant in the resolved acceleration $A_v$. Removal of the acceleration component due to gravity g in the resolved acceleration $A_v$ is beneficial for auto-scaling the constants $d_1$ and $d_2$ in Equation 7 (Eq. 7) for a condition that the wheel 10 is known to be correctly in balance, for example during a calibration routine performed after the wheel 10 is newly installed on the vehicle.

By performing harmonic analysis on the signal representing the acceleration $A_v$ in respect of the angular frequency of rotation $\square$ of the wheel 10, for example in a harmonic analyzer denoted by 630 in FIG. 11, the severity of the imbalance can be determined; for example, the amplitude of harmonics Q(m) wherein m is a harmonic number in the acceleration $A_v$ signal are beneficially individually scaled by a harmonic scaling function y(m) in a scaler 640 and then summed in a summing unit 650 to compute an aggregate $S_{tot}$ summed value. The aggregate value $S_{tot}$ is then compared in a threshold detector denoted by 660 against a predefined threshold value Th to determine whether or not the wheel 10 needs attention to correct the imbalance, for example by adding balancing weights or exchanging the tire 30. Equations 8 and 9 describe associated computing required:

$$S_{tot} = \sum_{m=1}^{t} Q(m) \cdot y(m) \qquad \text{Eq. 8}$$

If $S_{tot} > Th$, then the wheel 10 needs attention  Eq. 9

Equation 9 corresponds to a decision point DK1 illustrated in FIG. 11.

Optionally, the harmonic scaling function y(m) implemented in the scaler 640 is made dependent upon a type of tire 30 installed on the wheel 10; for example, a robust knobbly tire installed on the wheel 10 is potentially able to exhibit a greater degree of imbalance before representing any form of potential risk than a lean high-performance high-speed tire optimized for reduced energy consumption during driving. Moreover, the harmonic scaling function y(m) implemented in the scaler 640 is beneficially also made a function of time t, namely y(m,t) in Equation 8, from an initial time $t_0$ at which the tire 30 was installed onto the hub 20. Furthermore, the harmonic scaling function y(m) is also beneficially made a function of the number of revolutions as determined from the ABS sensor encoder 118 that the wheel 10 has experienced since the tire 30 was installed thereon, namely y(m, N) where N is the number of revolutions of the tire 30. A reason for rendering the harmonic scaling function y(m, t) or y(m, N) variable is that imbalance in a well-worn tire 30 is more likely to potentially result in tire 30 failure in comparison to a newly-installed substantially unworn tire 30 whose internal mesh 210 has not been subjected to substantial work-hardening due to repetitive flexure.

The type of imbalance for the wheel 10 as determined from the amplitude of the harmonics Q(m) is determined from the relative amplitude of given harmonics; such determination is performed by harmonic analysis in an analyzer denoted by 670 in FIG. 11. Moreover, such harmonic analysis is beneficially implemented using a set of software rules, by applying a harmonic stencil to the harmonics to identify a signature of a specific type of imbalance present, or by feeding data indicative of the amplitude of the harmonic Q(m) into a neural network trained to recognize occurrence of certain types of defects. One or more of the software rules, the harmonic stencil and the neural network are beneficially optionally rendered dependent upon a type of tire 30 installed onto the hub 20. Moreover, one or more of the rules, the harmonic stencil and the neural network are also beneficially optionally dependent upon an age and/or a degree of wear of the tire 30. When computing relative amplitude of harmonics Q(m) present in the acceleration $A_v$, normalization of the amplitude of the harmonics Q(m) is beneficially implemented as a part of signal processing employed as depicted in FIG. 11.

For example, when fasteners in the aforementioned holes 50 attaching the hub 20 to the axle 110 have been inadequately tightened or work loose such that the hub 20 rattles around on its axle 110, the suspension of the vehicle, for example as denoted by the spring $K_s$ in FIG. 9, is often so effective that the driver of the vehicle is unaware of there being any problem. The hub 20 slopping around on its bolts or fasteners gives rise to sudden small jolts of the wheel 10 as the wheel 10 rotates; it has even been known for the frusto-conical web 60 to generate a bell-like ringing tone as it is pulse excited into resonance corresponding to a "cos2☐ mode" of flexure, namely hoop-like deformation of the rim 90 and the frusto-conical web 60. These small sudden jolts give rise to signal energy in relatively high harmonics, for example in a range of $10^{th}$ to $20^{th}$ harmonic in the harmonics Q(m), which the scaling function y(m) can be arranged to isolate for specifically detecting that the wheel 10 is loose on its fasteners for warning the driver of the vehicle.

Beneficially, several different scaling functions y(m) are applied concurrently to the harmonics Q(m) so that occurrences of several different types of imbalance are monitored simultaneously by the data processing apparatus 600.

Figure 12:
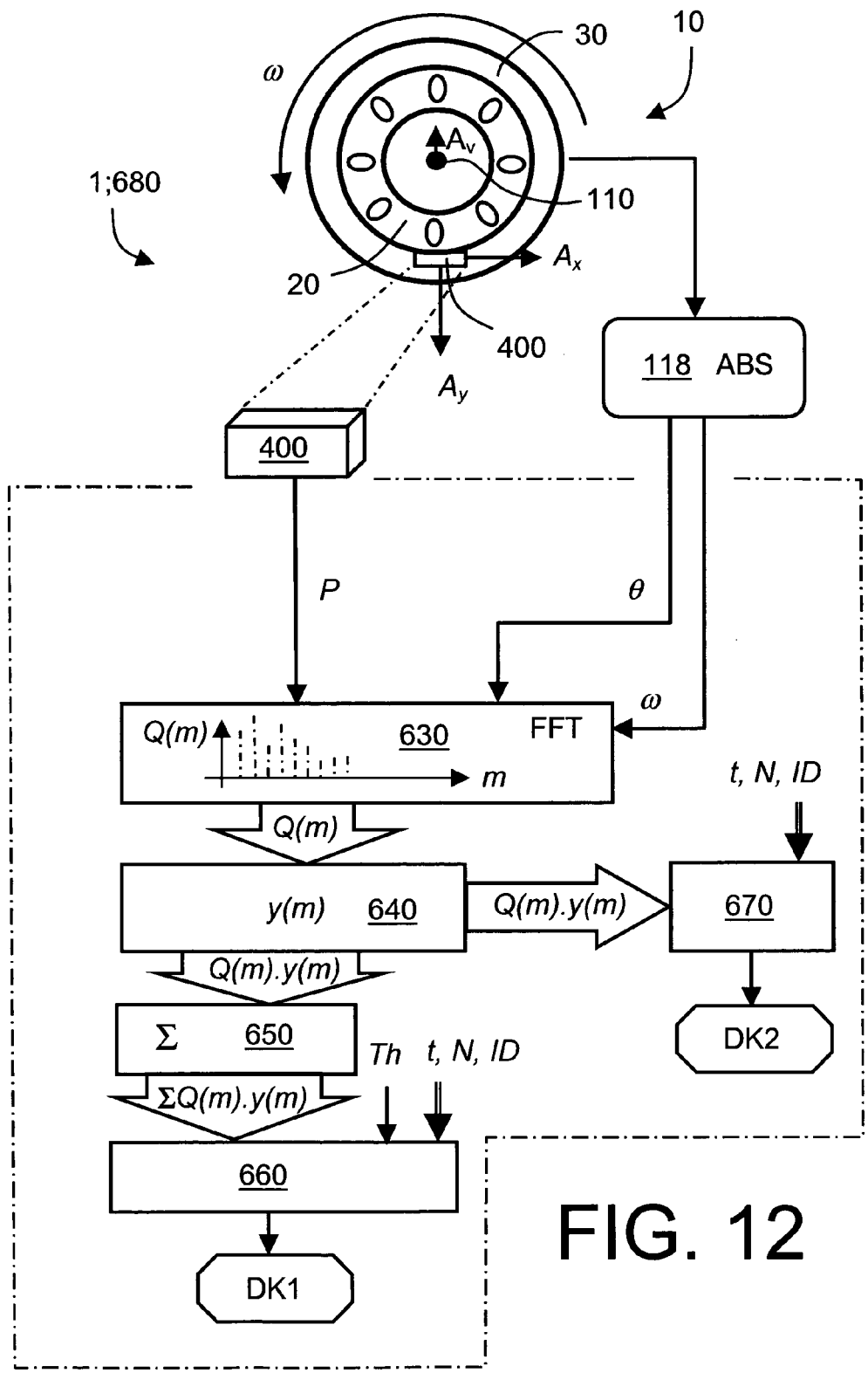
FIG. 12 is a second implementation of a wheel- and tyre-monitoring apparatus for use pursuant to the present invention with the wheel of FIG. 1; the monitoring apparatus being operable to process pressure signals.
Figure 13:
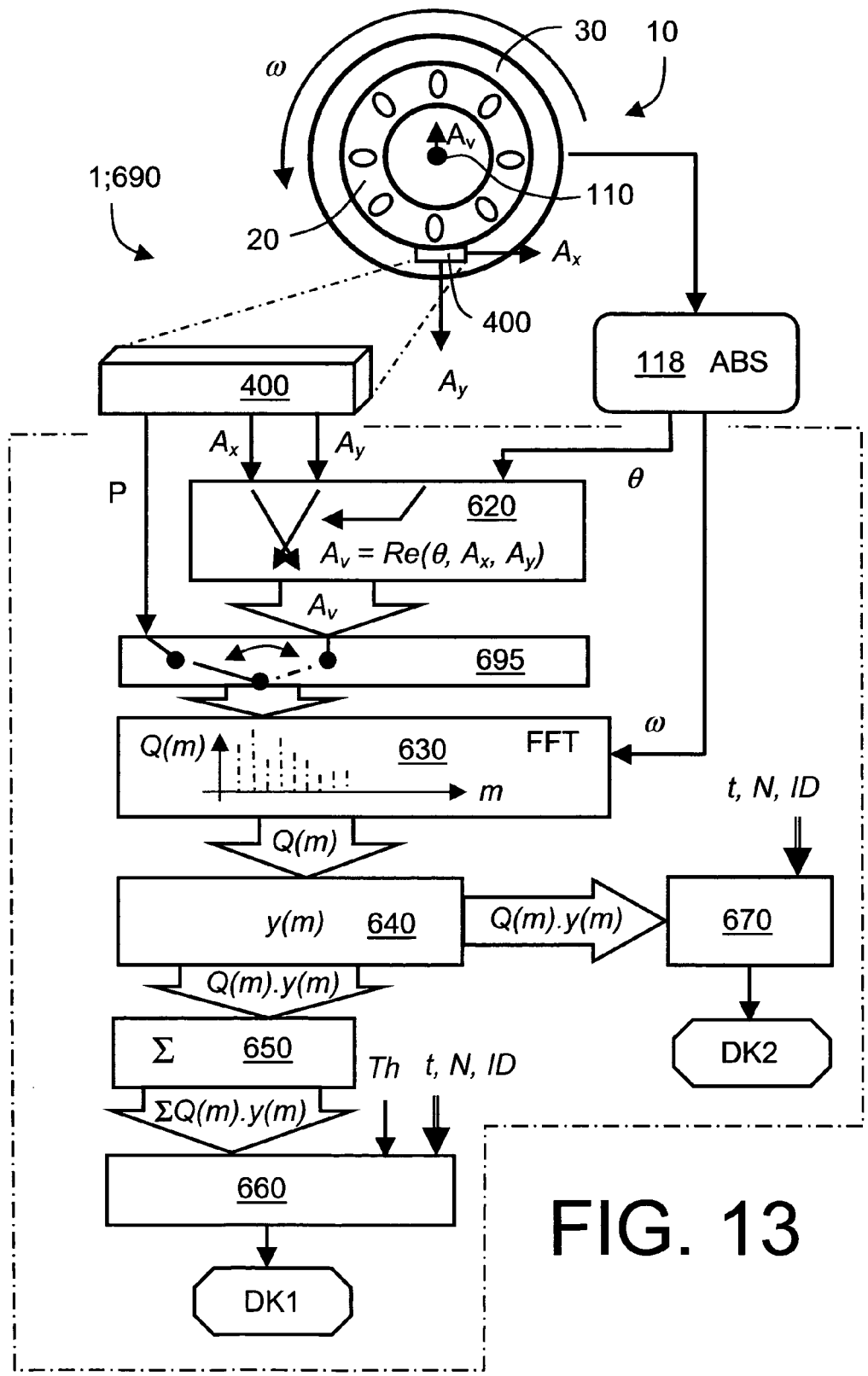
FIG. 13 is a third implementation of a wheel- and tyre-monitoring apparatus for use pursuant to the present invention for use with the wheel of FIG. 1, the monitoring apparatus being operable to process both acceleration and pressure signals.

In an alternative, or additional, implementation of the data processing apparatus 600, the pressure P measured by the module 400 is provided to the harmonic analyzer 630 instead of the resolved acceleration $A_v$ in a manner as depicted in FIG. 12; in FIG. 12, the data processing apparatus 600 adapted to harmonically analyze the pressure P is indicated generally by 680. Irregularities in the tire 30, for example local bulges or weaknesses causing blisters in the tire 30, are manifest as pressure pulses at certain angular ☐ positions as the wheel 10 rotates in operation. By analyzing variations in the pressure P as a function of rotation angle ☐ of the wheel 10, namely components of the pressure P correlated with turning rate ☐ it is feasible to provide additional monitoring of the tire 30 for improving detection of defects, or potential defects, in the tire 30. The data processing apparatus 680 functions in a generally similar manner to the data processing apparatus 600 except that the pressure P is analyzed instead of the acceleration $A_v$. Optionally, a data processing apparatus pursuant to the present invention is provided by combining together the data processing apparatus 600, 680 so as to provide for concurrent or periodically alternating harmonic analysis and monitoring of the acceleration $A_v$ and the pressure P as depicted in FIG. 13 and as indicated by 690 therein; there is provided a switching arrangement 695 in the data processing apparatus 690, either implemented in software or hardware, for selecting between the pressure P and the acceleration $A_v$. An advantage of the data processing apparatus 690 illustrated schematically in FIG. 13 is that more comprehensive monitoring to the wheel 10 is susceptible to being achieved in operation.

Aforementioned analysis of flexure of the wall 230 of the tire 30 as sensed by the module 400 mounted at the location L3 is beneficially compared in the electronic control unit (ECU) and/or within the module 400 with results from harmonic signal analysis performed in respect of one or more modules 400 positioned at one or more of the locations L1 and L2. In an event that the comparison is such that the modules 400 located at mutually different locations L1 to L3 give rise to mutually conflicting analysis results, there is a high likelihood of potential problems with the wheel 10 and/or its tire 30; a warning message is beneficially then transmitted from the data processing apparatus 600, 680 or 690 as appropriate to a driver of the vehicle and/or to a control centre of the enterprise operating a fleet of such vehicles that there is a need to perform maintenance on the vehicle, for example for devising logistics for a future maintenance schedule for the vehicle. Such logistics can include, for example, prearranging a replacement wheel to be available and informing a service facility regarding a time of arrival of the vehicle for maintenance purposes so that appropriate task scheduling at the service facility can be implemented.

One or more of the modules 400 mounted at one or more of the locations L1 to L3 are susceptible to being used, optionally in communication with an electronic control unit (ECU), to detect more gradual temporal changes in the tire 30, for example a gradual reduction in pressure P due to a slow leak therefrom, for example over a period of several weeks or months. Moreover, the one or more modules 400, optionally in cooperation with the aforesaid electronic control unit (ECU) in wireless communication with the one or more modules 400, can be used to monitor sudden depressurization of the tire 30, for example sudden depressurization and subsequent re-pressurization associated with installing a new replacement tire 30 onto the hub 20. Monitoring of such sudden depressurization is important when an earlier tire 30 equipped with a module 400 mounted therein is exchanged for a replacement tire 30 devoid of any such module 400, so that parameters for various signal processing functions as depicted, for example, in FIG. 11 can be appropriately selected by the apparatus 600, 680 or 690. When the identity and condition of the tire 30 is not reliably known, there are beneficially adopted in the data processing apparatus 600, 680 or 690 default values for parameters indicative of a tire 30 with a substantially medium degree of tread wear. Beneficially, there is issued a message "not reliable information" or similar in an event of such sudden depressurization having been detected to alert the driver that the electronic control unit (ECU) is being supplied with potentially non-representative information. Such a situation can arise when unauthorised swapping of the tire 30 has occurred or tampering with the tire 30 has occurred for example.

Figure 14:
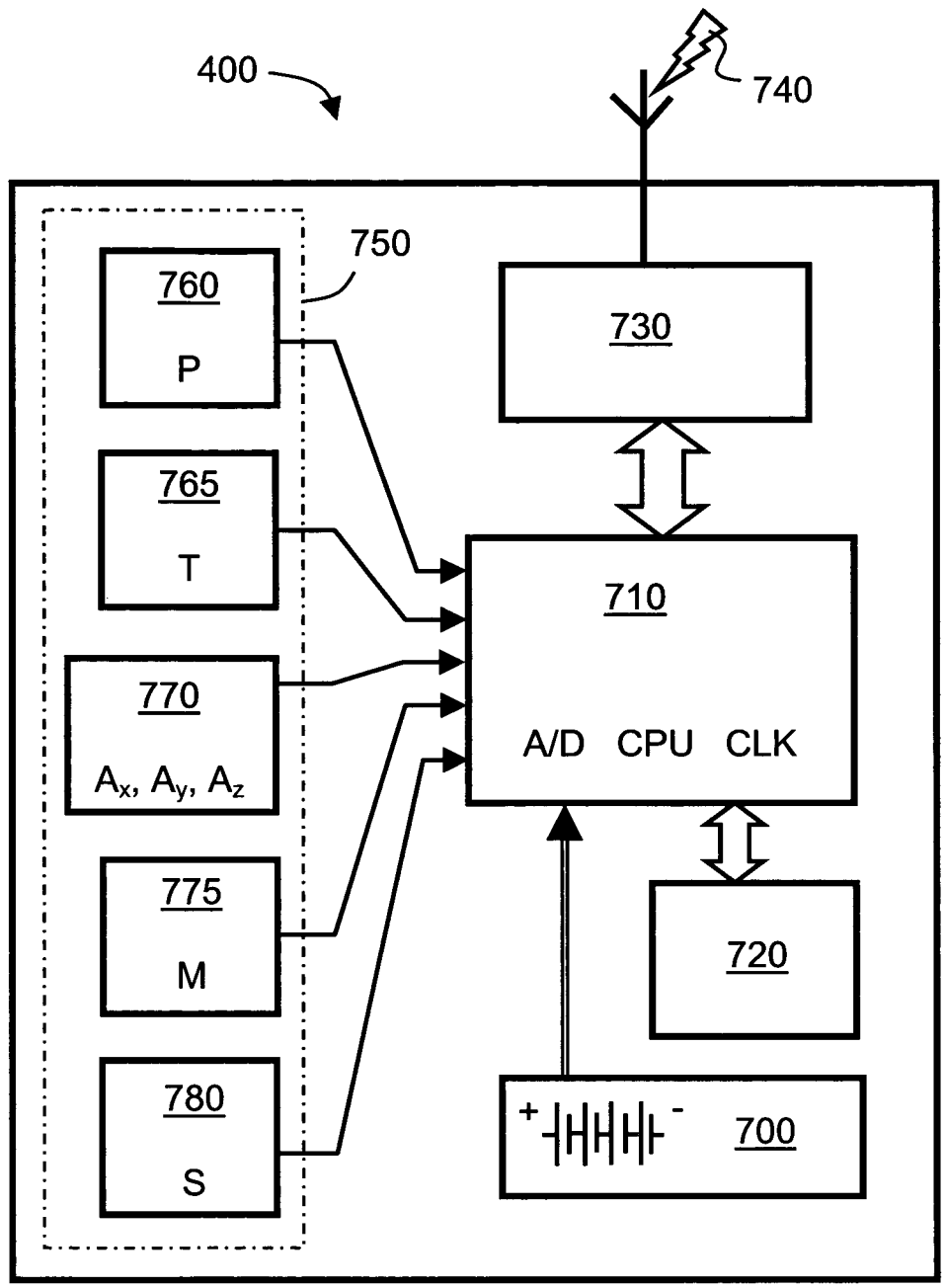
FIG. 14 is a schematic diagram of a monitoring module operable to be mounted onto the wheel of FIG. 1 and to sense operation characteristics of the wheel.

The module 400 will now be described in overview with reference to FIG. 14. In operation, the module 400 is required to be robust and also inexpensive in manufacture. Moreover, for example when mounted in the aforesaid location L3, the module 400 is relatively inaccessible and needs to function reliably without user intervention. Beneficially, the module 400 utilizes aforesaid microeletronic mechanical systems (MEMS) technology, for example based upon silicon micromachining fabrication processes. The module 400 includes a battery 700 comprising one or more electro-chemical cells operable to provide electrical power, amongst other components, to a computer processor 710. A data memory 720 including a software product is coupled in communication with the processor 710; the software product comprises software code which is executable upon the processor 710 and which is operable to coordinate functioning of the module 400. The processor 710 has associated therewith a clock (CLK) and an analogue-to-digital (A/D) converter for converting analogue sensor signals to corresponding sampled sensor data; beneficially, the analogue-to-digital (A/D) is based upon a high-speed multi-channel sigma-delta type converter which exhibits modest power consumption. Sigma-delta converters are contemporarily employed in power-critical devices such as miniature hearing aids which are battery powered and need to function for long periods without attention, for example for battery change. The module 400 further comprises a short-distance wireless interface 730 for providing bidirectional communication to and from the module 400; the wireless interface 730 is beneficially implemented using contemporary Blue Tooth, Weebre or similar wireless interface technology operating pursuant to associated standardized communication protocol. The module 400 can alternatively be implemented as a dedicated application specific integrated circuit (ASIC) including logic circuits.

The module 400 also includes an array of one or more sensors denoted by 750 whose corresponding one or more outputs are coupled to the aforesaid A/D converter. Depending upon intended location, namely locations L1, L2, L3 and L4, and a degree of wheel monitoring functionality desired, the array of sensor 750 includes one or more of:

(a) a pressure sensor 760 beneficially based upon a MEMS structure including a silicon micromachined membrane with strain-gauge or oscillatory resonant signal readout;

(b) a temperature sensor 765 for measuring an air or surface temperature in proximity of the module 400, wherein the temperature sensor 765 beneficially has a measuring range of −40° C. to +100° C.;

(c) an accelerometer 770 beneficially implemented in as MEMS structure including one or more silicon micromachined proof masses on a spring suspension with corresponding position readout for the one or more proof masses indicative of acceleration; optionally, for enhanced accuracy and response, the accelerometer is a force-feedback type accelerometer; the accelerometer 770 is beneficially sensitive to acceleration in one-, two- or three orthogonal axes. For best monitoring of wheel 10 and associated tire 30 operation, the accelerometer 770 is implemented as a three-axis accelerometer;

(d) a magnetic sensor 775, preferably implemented as a vacuum-encapsulated reed relay switch but also susceptible to being implemented as an Hall-effect device; the magnetic sensor 775 is optionally included for activating the module 400 using a strong magnetic brought into proximity of the module 400; however, as will be elucidated in more detail later, other approaches to activating the module 400 are also possible and are pursuant to the present invention; and (e) a strain-gauge sensor 780 which is most potentially pertinent to the module 400 when mounted at the location L3 onto the wheel 10. The sensor 780 can be affixed to the tire 30 prior to the tire 30 being installed onto the hub 20.

Optionally, the module 400 is susceptible to including other types of sensor not described in detail above.

Optionally, the battery 700 is, at least in part, a rechargeable battery and provided with its own electro-magnetic recharging device actuated in response to rotation of the wheel 10 in operation, for example in a manner akin to an automatic wind-up mechanical wrist watch wherein wrist movement is operable to move an imbalance mass to provide watch-spring wind-up energy.

Alternatively, or additionally, piezo-electric recharging of the battery 700 in response to rotation of the wheel 10 can be employed.

In operation, the computer processor 710 is operable to perform self-diagnostics and send a warning message via its wireless interface 730 in event of partial or total malfunction occurring within the module 400, and a confirmatory message sent when the module 400 is fully functional; in an event that the module 400 malfunctions, its associated vehicle is not immobilized, but merely results in reduced functionality in respect of wheel and associated tire monitoring. Beneficially, the driver of the vehicle can be informed via the electronic control unit (ECU) regarding reduced functionality and provided with a choice whether or not to continue driving despite malfunctioning of the module 400.

In operation, when the computer processor 710 detects that the signals from the accelerometer 770 are substantially constant for more than a predefined time period, for example for a time period in a range from a few seconds up to 10 minutes, after cessation of a period of rotation of the wheel 10, the computer processor 710 is beneficially operable to cause the module 400 to assume a hibernating mode to conserve power during which the wireless interface 730 is substantially de-energized. During the hibernating mode, the computer processor 710 is beneficially operable to periodically and momentarily activate the wireless interface 730 for short periods to detect "wake-up" commands from the electronic control unit (ECU) of the vehicle. As soon as the computer processor 710 detects that signals from the accelerometer 770 and/or the pressure sensor 760 are temporally varying, for example during a pre-defined time period, the processor 710 is operable to switch the module 400 to its active state, namely non-hibernating, with all its functional parts as shown in FIG. 14 brought into operation. Alternatively, or additionally, the module 400 can be explicitly set in a hibernating mode on receipt of a specific hibernate instruction from the electronic control unit (ECU) 950; beneficially, the specific instructions include the identification code (ID) of the module 400 which is to assume such a hibernating state; similarly, the module 400 can be explicitly instructed to assume a functional active state, namely non-hibernating state, by receiving a specific wake-up instruction from the electronic control unit (ECU) 950. Yet alternatively, or additionally, all the modules 400 included on the wheels 10 of the vehicle can be set to a hibernate state, or set to a functional active state, by a general explicit instruction wirelessly transmitted from the electronic control unit (ECU) 950; the general explicit instruction is beneficially sent by the electronic control unit (ECU) 950 in response to the driver of the vehicle starting and stopping a combustion engine or an electric traction motor of the vehicle. Such an electric traction motor is relevant when the vehicle has a hybrid powertrain or an electric power train provided with electric power from fuel cells.

When considerable data processing is performed within the module 400 so as to distribute computing load around the vehicle, for example signal processing involving application of a Fast Fourier Transform (FFT) or similar signal processing algorithm, the module 400 is operable to receive a synchronization signal for its given associated wheel 10 derived from the aforementioned ABS sensor encoder 118 and its associated circuits associated with the given wheel 10. Such a synchronization signal is beneficially provided from the aforementioned electronic control unit (ECU) 950 of the vehicle operating to provide a data communication hub for the vehicle. On account of the wheels 10 of the vehicle potentially revolving at mutually different rates, for example when the vehicle is turning or due to slight difference in outside diameters of the tires 30, each wheel 10 and its associated modules need to be individually synchronized in respect of their associated ABS sensor encoder 118.

Data processing performed by the computer processor 710 is beneficially capable of reducing a volume of data to be communicated via the wireless interface 730 to the electronic control unit (ECU). Such local data processing is of benefit in that it is primarily the wireless interface 730 which consumes a majority of power from the battery 700 when the module 400 is in operation. Data flow can be further reduced in the module 400 by the processor 710 transmitting periodically at a beginning of time frames actual data values of sensor signals followed by data representing changes in the data values during each time frame. Other approaches for obtaining data compression can also optionally be employed to reduce power consumption at the wireless interface 730. Beneficially, the module 400 is operable to transmit accelerometer signal data and pressure P data at a maximum sample rate in a range of 50 samples/second to 200 samples/second for each accelerometer axis and/or the pressure sensor 760 taking into consideration Nyquist sampling criteria. A lower rate of up to 1 sample per second for temperature T is optionally employed on account of the temperature T changing less rapidly in comparison to the acceleration A and pressure P.

The module 400 is also beneficially operable to permit software updates to be downloaded from the electronic control module (ECU) to the module 400, for example via its wireless interface 730, for upgrading or modifying its operation, for example in response to amended safety standards or policy adopted by an operator of the vehicle. Such software updates also enable new and improved data processing algorithms to be later employed, namely software upgrades.

As elucidated in the foregoing, the module 400 is programmed to have an identification code (ID) which is useable by the aforesaid electronic control unit (ECU) for distinguishing the module 400 from other similar modules 400 on the vehicle, and also from similar types of modules 400 on other vehicles which sporadically pass in near proximity, for example on an adjacent lane during motorway driving. The electronic control unit (ECU) is operable to use the identification code (ID) to identify from which portion of the vehicle data conveyed via the module 400 is derived. Such identification will be described in more detail later.

Figure 15A:
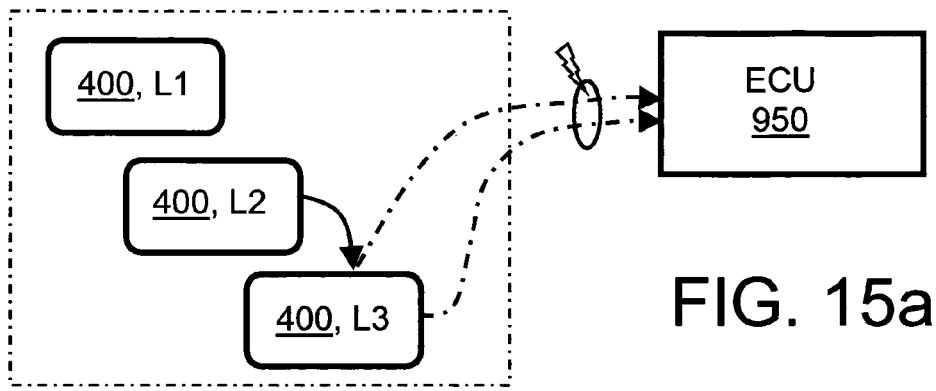
FIGS. 15a to 15e illustrate various alternative network communication topographies for monitoring modules mounted at various location on the wheel of FIGS. 1 and 6.

The computer processor 710 in combination with its wireless interface 730 is also operable to optionally provide a communication networking function. Beneficially, the computer processor 710 has a directly wired interface so that a first module 400 mounted at the location L1 on the wheel 10 is capable of being directly coupled via a wire or optical fibre communication link through the feed-through 310 as depicted in FIG. 7 to a second module 400 mounted at the position L2 on the rim 90 within the volume 120 as depicted in FIG. 15a. The processor 730 of the first module 400 located at the location L1 is thereby operable to:

(a) process signals generated by its array of sensors 750 and convey the processed signals as processed data to its wireless interface 730 of the first module 400 for communicating to the electronic control unit (ECU), as well as (b) receiving processed signals output from the second module at the position L2 for conveying via the first module 400 and its wireless interface 730 to the electronic control unit (ECU).

Alternatively, data signals from the second module 400 at the location L2 can be:

(a) communicated via the wireless interface 730 of the second module at the location L2 to the wireless interface 730 of the first module at the location L1, and then (b) the data signals can be relayed via the wireless interface 730 its associated computer processor 710 of the first module 400 to the electronic control unit (ECU).

Figure 15B:
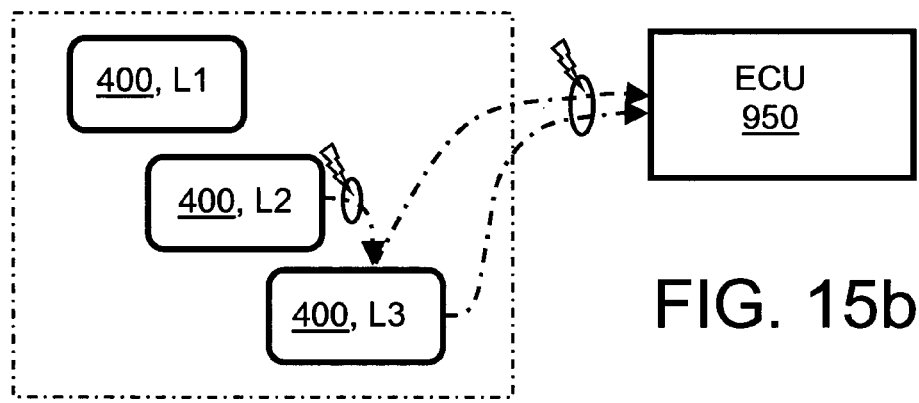

Such a communication link is also susceptible to being used in reverse for conveying aforementioned ABS synchronization signals via the first module 400 at the location L1 to the second module 400 at the location L2 as depicted in FIG. 15b.

Figure 15C:
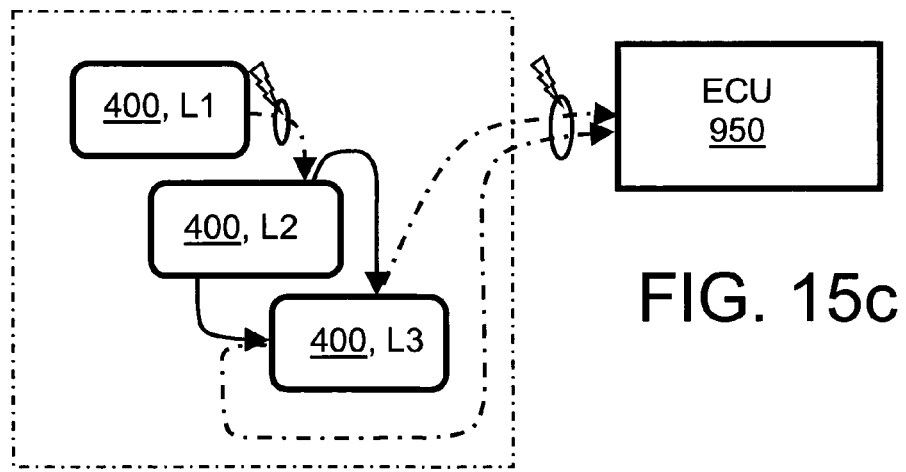

In a similar manner, the second module 400 at the location L2 is able to function as a network relay for a third module 400 mounted at the location L3. Beneficially, the second module 400 at the location L2 is coupled by wire or optical fibre via the feed-through 310 to the first module 400 at the location L1, and the third module 400 at the location L3 is coupled by wireless to the second module 400 at the location L2 as depicted in FIG. 15c. By such a configuration of FIG. 15c, problems with the mesh 210 and rim 90 functioning as a Faraday screen are avoided. Wireless communication between the third module 400 at the location L3 to the second module 400 at the location L2 is beneficial in view of a potentially large number of times the third module 400 at the location L3 moves in respect of the second module 400 at the location L2 in response to flexure of the wall 230 of the tire 30 as the wheel 10 rotates in operation; wires or similar direct connections linking the modules at the locations L2 and L3 would not only be prone to breakage due to work-hardening effects, but would also be impractical to attach once the tire 30 has been installed onto the hub 20 on account of the volume 120 then being user-inaccessible.

Figure 15D:
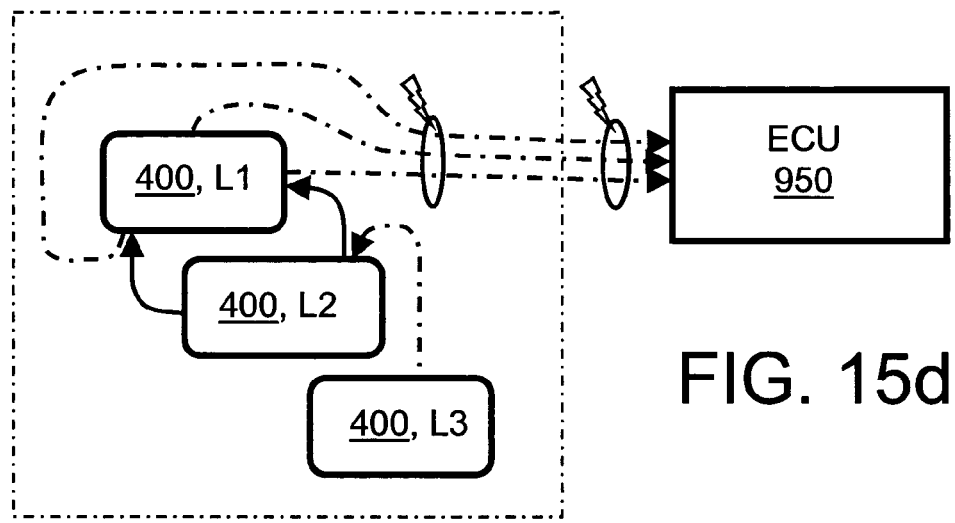

In an alternative configuration, the third module 400 at the location L3, mutatis mutandis for the module 400 at the location L4, is electrically coupled to the mesh 210 of the tire 30 which is used as a highly effective patch radio antenna for communicating by wireless to the electronic control unit (ECU). In such a configuration, the third module 400 at the location L3 is capable of function as a wireless relay node for communicating data from the second module 400 mounted at the location L2 on the rim 90. Such a configuration is illustrated in FIG. 15d.

Figure 15E:
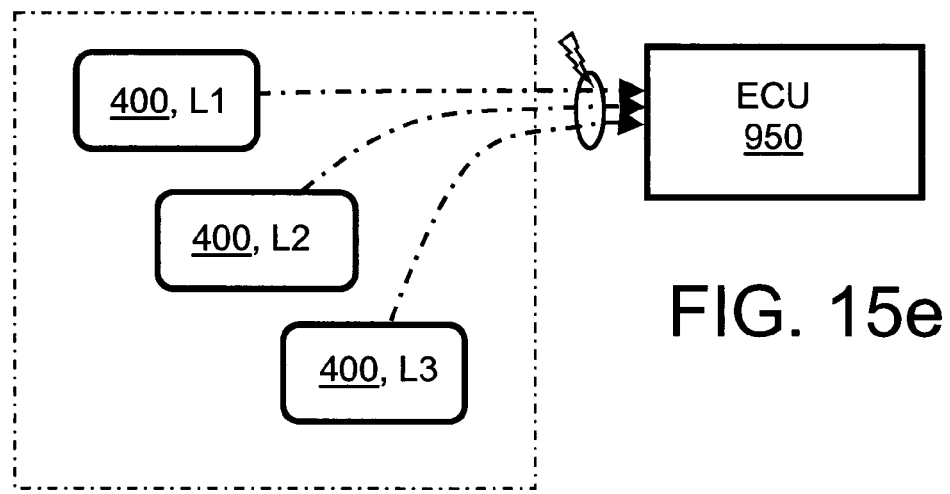

Other network configurations for the modules 400 at the locations L1, L2; L3 and L4 are also feasible. For example, the modules 400 are optionally operable to all communicate directly by wireless via their wireless interfaces 730 directly with the electronic control unit (ECU) as depicted in FIG. 15e. Yet alternatively, the modules 400 are dynamically reconfigurable depending upon received wireless signal strength at the electronic control unit (ECU), for example between various network modes as elucidated in the foregoing with reference to FIGS. 15a to 15e. Such flexibility to reconfigure a communication network provided by the modules 400 is beneficial when wheels 10 are swapped around or changed on the vehicle. Such adaptability will be described in more detail later.

Beneficially, the first, second, third and fourth modules 400 mounted at the locations L1, L2, L3 and L4 respectively each are provided with their uniquely-defining identification codes (ID) which the modules 400 are operable to employ when communicating with the electronic control unit (ECU) for distinguishing their data from that of other modules 400. Moreover, such identification codes (ID) are beneficial when the electronic control unit (ECU) sends synchronization signals derived from the ABS sensor encoders 118, for example in a situation where considerable data processing is performed locally at the modules 400 to reduce a quantity of data to be communicated via their wireless interfaces 730 to the electronic control unit (ECU) in operation.

In the foregoing, components such as the wheel 10 and its associated one or more modules 400 and its electronic control unit (ECU) mounted on the vehicle have been described. These components form a part of a wheel- and tyre-monitoring system which will now be elucidated in greater detail with reference to FIG. 16.

Figure 16:
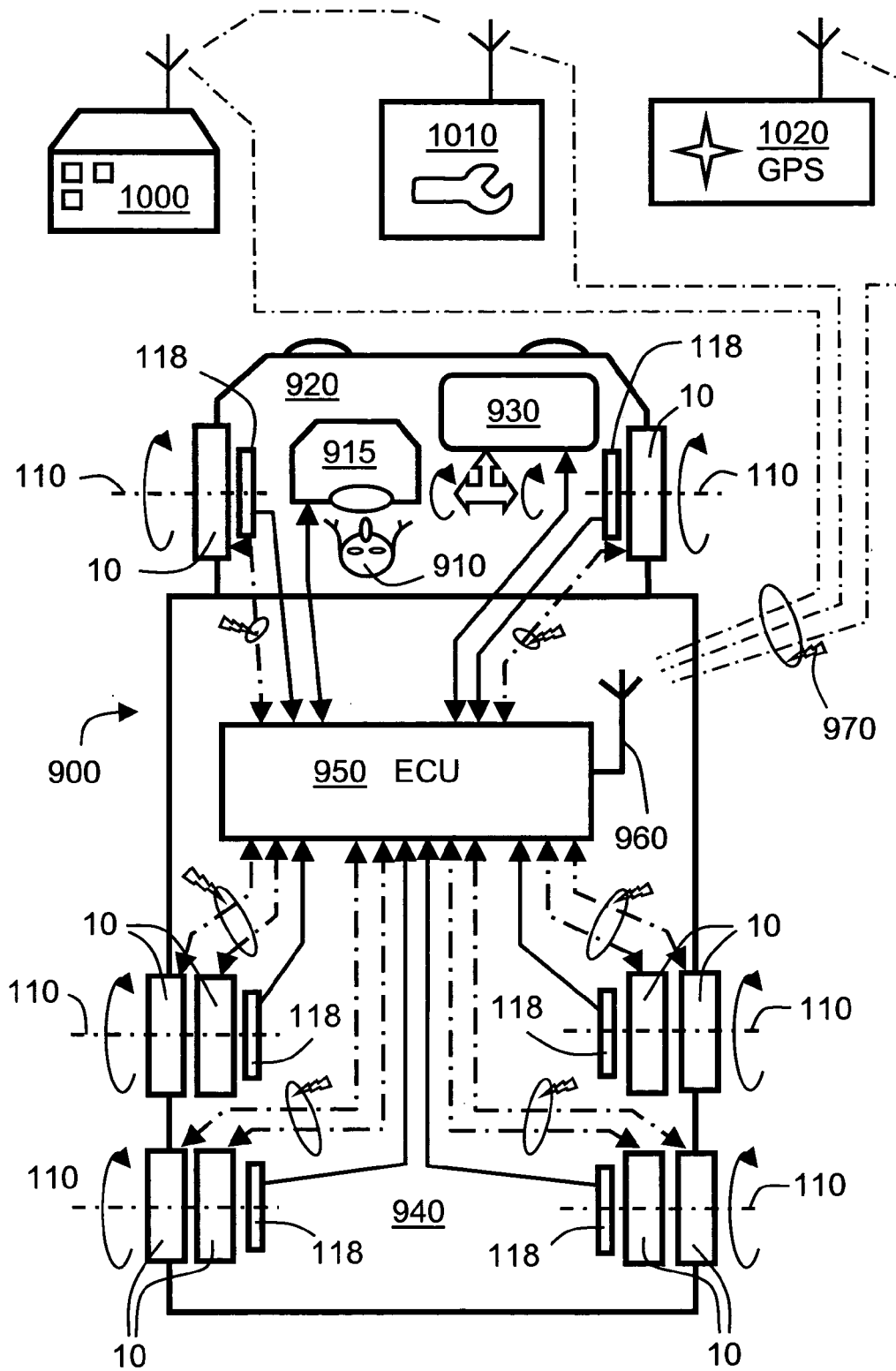
FIG. 16 is a schematic illustration of a wheel monitoring system for use pursuant to the present invention for a heavy commercial vehicle in conjunction with a remote control facility and service facility.

In FIG. 16, there is shown in plan view the aforementioned vehicle indicated generally by 900. The vehicle 900 is driven in operation by the aforesaid driver denoted by 910 in FIG. 16. Moreover, the vehicle 900 comprises a front tractor unit 920 including a combustion engine 930 operable to provide motive force to a pair of steerable front wheels 10 beneficially implemented in a manner substantially as depicted in FIG. 4. The combustion engine 930 is at least one of: a contemporary cylinder combustion engine, a combustion engine with turbocharger, an electric series or parallel hybrid engine, a gas turbine engine, a fuel cell system providing electrical power to associated electric motor traction. The vehicle 900 also comprises a trailer unit 940 having two sets of double rear wheels 10 as shown; the double rear wheels 10 are beneficially implemented in a manner as depicted in FIG. 5 and are optionally also steerable in a manner similar to the front wheels 10 of the front tractor unit 920. Other configurations of wheels 10 for the vehicle 900 are possible and FIG. 16 is merely one example for describing the present invention. The vehicle 900 is further provided with the aforementioned electronic control unit (ECU) denoted by 950; the electronic control unit (ECU) 950 includes a computer processor together with data memory and one or more wireless interfaces and electrical interfaces, the computer processor being operable to execute one or more software products including executable software code. The electronic control unit (ECU) 950 is coupled in communication with a console 915 operated by the driver 910. Optionally, the electronic control unit (ECU) 950 is also coupled in communication with the combustion engine 930 for performing engine management and monitoring functions, for example deliberately limiting a speed, or recommending to the driver a suitable speed, at which the driver 910 is able to drive the vehicle 900 in an event of the electronic control unit (ECU) 950 detecting a problem, or potential problem, with one or more wheels 10 of the vehicle 900. Moreover, the electronic control unit (ECU) 950 is also wirelessly coupled to one or more modules 400 mounted on one or more of the wheels 10 of the vehicle 900 as elucidated in the foregoing.

The electronic control unit (ECU) 950 includes an antenna 960 for transmitting and receiving wireless signals as denoted by 970 for enabling the vehicle 900 to communicate with other facilities, for example a control centre 1000 of an enterprise organising logistics for a fleet of such vehicles 900, or to a service facility 1010 whereat wheels 10 and their tires 30 of the vehicle 900 can be serviced or replaced as depicted in FIG. 16. Beneficially, the electronic control unit (ECU) 950 is operable to monitor operation of the wheels 10 of the vehicle 900 and automatically inform the control centre 1000 of a need to inform the driver 910 to drive the vehicle 900 into the service facility 1010 for servicing its wheels 10 and associated tires 30, for example as part of a delivery schedule planned for the vehicle 900, thereby causing less disruption to a service provided by the enterprise to its customers. A visit to the service facility 1010 is optionally invoked in response to weather conditions or time, for example in connection with exchanging summer tires 30 to winter tires 30 in Northern Europe and North America.

Optionally, the electronic control unit (ECU) 950 is also wirelessly coupled to a global positioning system (GPS) 1020 for determining in operation a spatial position of the vehicle 900 upon the surface of the Earth. The GPS system 1020 is, for example, that managed by US Authorities or an equivalent European Galileo positioning system. Yet alternatively, or additionally, the GPS system 1020 is based on a mobile telephone, namely cell net, system known as GPRS or similar. In operation, the electronic control unit (ECU) 950 is operable to determine whereat the vehicle 900 is located and convey this positional information to the control centre 1000 so that the control centre 1000 is aware of the position of the vehicle 900. Moreover, as elucidated in the foregoing, in an event that electronic control unit (ECU) 950 detects by way of one or more of the modules 400 that one or more of its wheels 10 are defective or needing maintenance, or are potentially likely to become defective or needing maintenance, the control centre 1000 can direct the vehicle 900 to a suitable geographically convenient service centre 1010. Optionally, the control centre 1000 is also operable to arrange, based upon knowledge of the position of the vehicle 900, for the tractor 920 to be decoupled from its trailer 940 at a suitable geographical location so that an alternative tractor can be rapidly coupled to the trailer 940 to haul the trailer 940 and its contents further promptly to its destination, for example to a customer; the tractor 920 can then be serviced without disrupting time-critical deliveries in the trailer 940 to the customer. Moreover, the service centre 1010 can also be warned in advance, either directly from the vehicle 900 or indirectly via the control centre 1010 or both, regarding arrival of the vehicle 900 together with an indication of a likely problem with one or more wheels 10 of the vehicle 900. Such notification of problems regarding the vehicle 900 to the control centre 1000 and optionally to the service centre 1010 is susceptible to occurring automatically without the driver 910 needing to interpret messages and actively inform one or more of the control centre 1000, the service centre 1010 or the customer. An improvement of service to the customer is thereby susceptible to being achieved.

In order that the vehicle 900 should not be immobilized in an event of its electronic control unit 950 detecting a problem with one or more of the wheels 10 of the vehicle 900, or malfunction of one or more of its modules 400, the electronic control unit (ECU) 950 is operable to generate various warning messages. In an event of malfunction of one or more of the modules 400, the electronic control unit (ECU) 950 is operable to send a warning to at least one of the control centre 1000 and the driver 910 of such malfunction, but continue to monitor other wheels 10 whose modules 400 are continuing to function correctly. Such graceful decline in monitoring functionality of the modules 400 mounted on one or more of the wheels 10 is susceptible to improving operational robustness of the vehicle 900, namely failure of one or more of the modules 400 does not immobilize the vehicle 900. It is a decision then of the driver 900 and/or the control centre 1000 whether or not to continue driving the vehicle 900 in view of one or more of its module 400 becoming non-operational. A potential cause of one or more of the modules 400 failing is exhaustion of batteries 700 therein, or replacement of a tire 30 for example.

2. Methods of Identifying Locations of Modules Pursuant to the Present Invention With regard to the present invention, the foregoing description describes various apparatus and modules with which the present invention is susceptible to being implemented. However, the present invention is concerned with methods of identifying locations of wheel modules included in wheels and/or their associated tires; for example, to a method of identifying locations of wheel modules operable to monitor characteristics of wheels and/or their associated tires and conveying information indicative of these aforementioned characteristics via a communication link to an electronic control unit (ECU) and/or control system, for example for user-display. Moreover, the present invention also concerns wheel modules for use in implementing aforementioned methods; various implementations of these wheel modules have been described in the foregoing and are also described in following paragraphs.

It will be appreciated from FIG. 16 that the vehicle 900 has many wheels 10, namely ten for the example described in the foregoing. When each wheel 10 is provided with three modules 400 in its locations L1, L2 and L3, the vehicle 900 is potentially equipped with thirty such modules 400; if more than one module 400 is included at each of the locations L1, L2, L3 or L4, for example one module 400 at □=0° and another at □=180° for the location L2 in a rad disposition, there are potentially even more than thirty such modules 400 present. In practice, certain of the wheels 10 are beneficially provided with fewer than three modules 400 so that a total of around five to twenty modules 400, for example ten modules 400, are conveniently employed altogether for the vehicle 900 for example. A problem arises in programming the electronic control unit (ECU) 950 to recognize at which wheel the respective modules 400 are positioned in the vehicle 900.

It is potentially extremely laborious, and potentially susceptible to data-entry error, for the driver 910, or person otherwise responsible for the vehicle 900, to have a list of the identification codes (ID) of the modules 400 together with their positions in the vehicle 900 and manually input, for example by typing on a computer keyboard, such information into the electronic control unit (ECU) 950. There thus arises a need to automatically locate, namely to "calibrate", the vehicle 900 in respect of spatial disposition of its modules 400, namely inform the electronic control unit (ECU) 950 regarding spatial disposition of its modules 400. Such "calibration" is important for providing the driver 910, the control centre 1000 and/or the service centre 1010 with correct information about which wheel 10 of the vehicle 900 is potentially defective, potentially defective or needing attention, for example charging with compressed air to increase its pressure P or needing a tire 30 change. Certain types of unbalance defects or tire wall 230 defects cannot be ascertained by mere casual visual inspection of a wheel 10 and its tire 30.

Figure 17A:
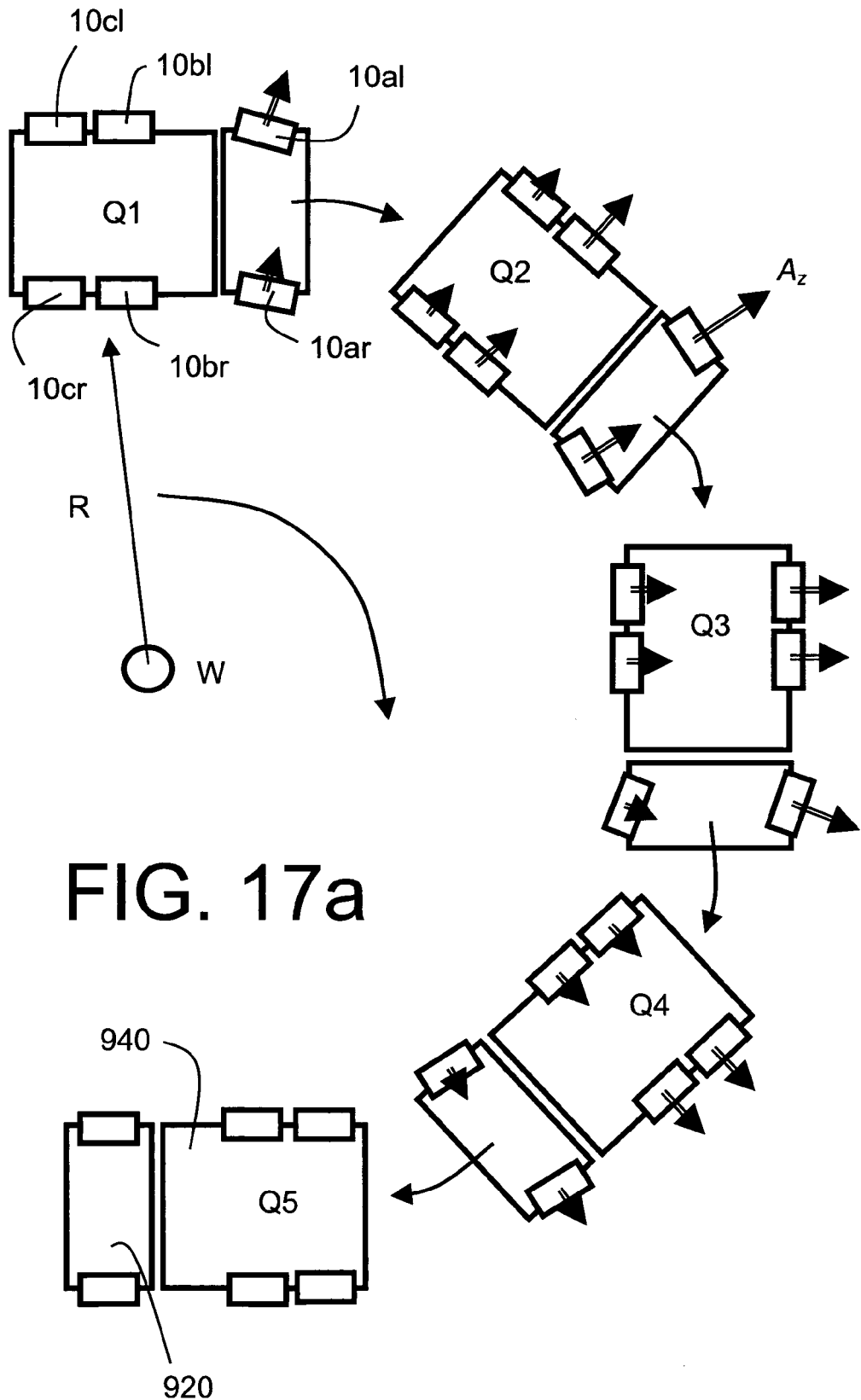
FIG. 17a is an illustration of a further alternative method pursuant to the present invention for locating positions of one or more modules of the system of FIG. 16.

Referring to FIG. 9, tangential acceleration is denoted by $A_x$, radial acceleration is denoted by $A_y$, and lateral acceleration is denoted by $A_z$. Referring next to FIG. 17a, there is depicted a first embodiment of a method of "calibrating" the vehicle 900 by causing the vehicle 900 to perform a right-hand turn of radius R about a centre of rotation W. The first embodiment is concerned with the lateral acceleration $A_z$; see FIG. 9 for an appropriate spatial definition of the acceleration $A_z$. The method of "calibration" relies upon a characteristics that left-side wheels 10al, 10bl, 10cl on an outside of the right-turn experience a greater centrifugal force manifest as the acceleration $A_z$ as sensed by the modules 400 mounted associated with these left-side wheels 10al, 10bl, 10cl in comparison to right-side wheels 10ar, 10br, 10cr on an inside of the turn. Moreover, the front wheels 10al, 10ar experience an increase in acceleration temporally before the middle wheels 10bl, 10br and especially the rear wheels 10cl, 10rl.

Figure 17B:
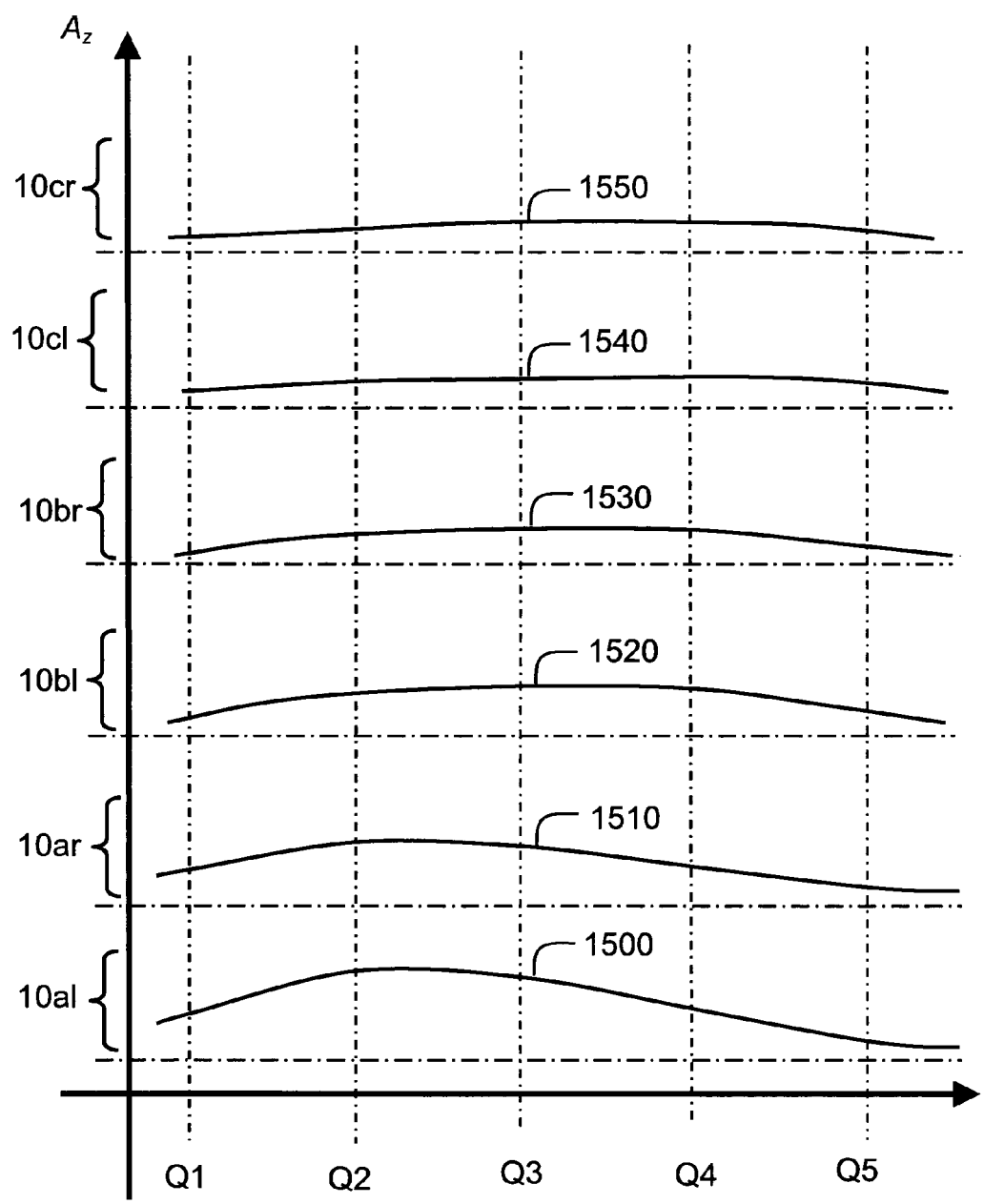

In this embodiment, the driver 910 inputs to the electronic control unit (ECU) 950, for example by depressing a suitable switch, key or button on the console 915, that the driver 910 is desirous to invoke the method according to the first embodiment of the invention of identifying locations of the modules 400 on the vehicle 900, namely "calibrating" the vehicle 900. The driver 910 then drives the vehicle 900 for a short distance in a straight direction so that the lateral acceleration $A_z$ of the wheels 10 is substantially zero. The driver 910 then turns a steering wheel of the vehicle 900 at the console 915 to pivot the front wheels 10al, 10ar to cause the vehicle 900 to execute the aforementioned right-turn from the positions Q1 to Q5 and then turns the steering wheel straighten the front wheels 10al, 10ar to cause the vehicle 900 to continue further in a straight trajectory after the position Q5. During the right-turn, the modules 400 are operable to measure the lateral accelerations $A_z$ from its wheels 10 and communicate by wireless corresponding sampled data to the electronic control module (ECU) 950 which stores the sample data in its memory; the sample data is communicated together with the identification codes (ID) of the modules 400 providing the sampled data. When the turn has been completed, for example after a defined time period after the driver 910 initially pressed the switch on the console 915 or in response to the driver 910 repressing the switch on the console 915, the electronic control unit (ECU) 950 terminates its collation of sample data and then progresses to analyze the sample data stored in its memory. By comparing relative magnitudes of the accelerations $A_z$ and also positions where they each have a maximum magnitude, the electronic control unit (ECU) 950 is able to identify where the modules 400 providing the sample data are located in the vehicle 900. FIG. 17b is a graphical illustration of acceleration signals $A_z$ for the wheels 10al, 10ar, 10bl, 10br, 10cl, 10cr as denoted by curves 1500, 1510, 1520, 1530, 1540, 1550 respectively. Beneficially, the driver 910 enters information into the electronic control unit (ECU) 950 indicative of whether the driver 910 is intending to implement the method according to the first embodiment of the invention in respect of a right-hand turn or a left-hand turn. Alternatively, information regarding a direction is turned during calibration can be automatically derived from a steering angle sensor associated with a steering wheel of the vehicle 900; such steering direction information is provided to the electronic control unit (ECU) 950.

On account of modules 400 mounted at the third location L3 providing an acceleration pulse each turn as depicted in FIG. 10, this method of "calibration" is not optimal for establishing locations of modules 400 in the location L3 on wheels 10, but is satisfactory for identifying locations of modules 400 mounted at locations L1 and L2.

Alternatively, a second embodiment of the invention relates to a method of "calibrating" the vehicle 900 which involves monitoring instantaneous pressure P as sensed by the modules 400 for each of their respective wheels 10. When the vehicle 900 is driven so as to execute a right-turn, alternatively left-turn, wheels 10 on an outside of a curved trajectory followed by the vehicle 900 when executing the turn will momentary have a high degree of elevation of their pressure in comparison to wheels 10 on an inside of the curved trajectory. Such pressure change is especially pertinent for the front wheels 10*al*, 10*ar*. Following wheel pairs will also be characterised by that wheels 10 on an outside of a curved trajectory followed by the vehicle 900 when executing the turn will momentary have a higher degree of elevation of their pressure in comparison to wheels 10 on an inside of the curved trajectory, however with less difference than what appears at the front wheels. Furthermore, especially for non steerable rear axles, the change in pressure will be delayed and occur at a lower rate in comparison to the change in pressure occurring ad the front axle.

Figure 10A:
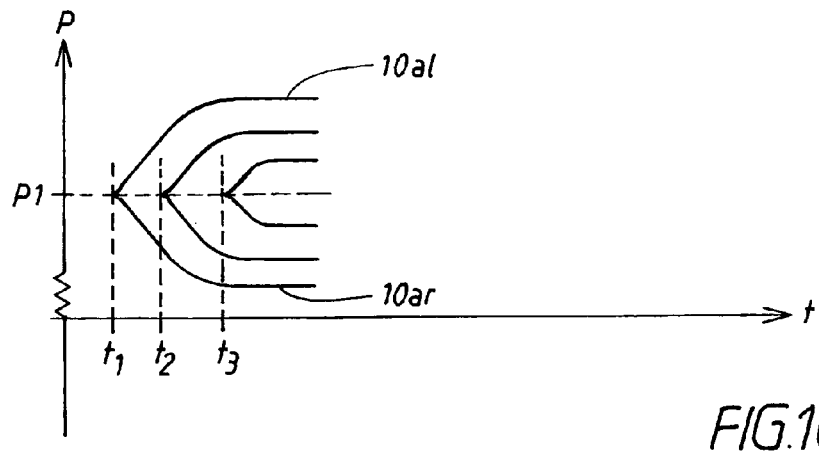
FIG. 10a shows examples of how the pressure is changed when a vehicle makes a turn.

FIG. 10*a* show examples of how the pressure is changed when a vehicle makes a turn. At first when the vehicle is caused to drive straight ahead, generally an identical pressure level P1, is generated from each of the sensors in the modules respectively. Since according to the invention, the identification of each modules location will be dependent on analyses of the change of pressure for each module, it is not necessary that the pressure level for each sensor when driving straight ahead is equal. In this example, this is assumed for simplifying an illustration of how the method according to the invention operates. In the event the pressures detected by respective sensor module 400 are different, the pressure levels may be normed, or alternatively, the level or pressure change for each sensor can be monitored.

At time t1, the vehicle starts to turn, which is first noticed by a pressure increase at the outer front wheel, and a corresponding pressure decrease at the inner front wheel. Here it is assumed that a right turn is made generating a decrease of pressure at the right front wheel 10*ar* and an increase of pressure at the left front wheel. In the event the vehicle has fixed rear axles, there is a delay in time to t2 until the vehicle starts turning around the first rear axle having a middle set of wheels 10*bl*, 10*br*. The change in pressure will also take place at a lower rate, dP/dt, in comparison to the change of pressure of the front wheels. Finally at time t3, the vehicle starts turning around the second rear axle having a rear set of wheels 10*cl*, 10*cr*. The change in pressure will also take place at a lower rate, dP/dt, in comparison to the change of pressure of the front wheels. The rate of the change in pressure at the second axle may be of the same magnitude as for the first rear axle.

By identification of the order in which the pressures are changed and by noticing which pressure signals becomes lower and which becomes higher when entering a curve, the positions of respective sensor module can be determined.

Figure 10B:
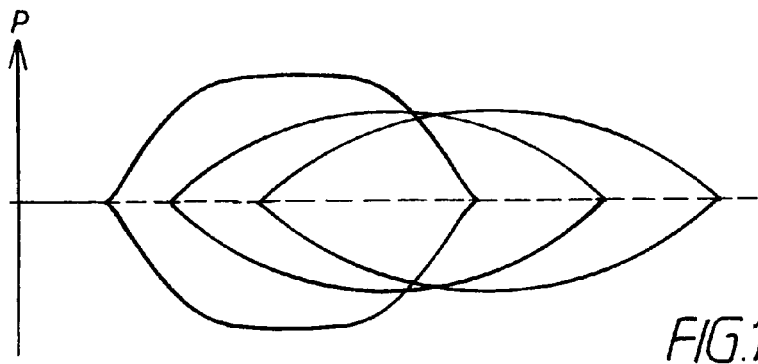
FIG. 10b shows the pressure signals from the sensor modules 400 are shown during an entry and exit of a curve.

In FIG. 10*b*, the pressure signals from the sensor modules 400 are shown during an entry and exit of a curve, that is from a phase where the vehicle starts turning after having propagated straight ahead until a phase where the vehicle starts driving straight ahead after exiting a curve. It should be noticed that the front wheels 10*ar*, 10*al* first enters the curve with a corresponding steep change of pressure, and that the first and second rear axles with the wheels 10*br*, 10*bl*, 10*cl*, 10*cr* respectively, follow in sequence at a lower rate of change. When exiting the curve, the pressure level at the front wheels 10*ar*, 10*l* will change first and at a high rate. Again, the first and second rear axles with the wheels 10*br*, 10*bl*, 10*cl*, 10*cr* respectively will follow in sequence at a lower rate of change. Hence irrespectively if the change in pressure at the entry or exit of the curve is studied, the timing of when the change in pressure occur indicates at which axle the wheel, and thus the sensor is located.

In the event a steered rear wheel axle is used in combination with a steered front axle, the timing the change in pressure at the front axle and the steered rear axle may be simultaneous. The rate at which the pressure changes will be lower at the rear axle for normal vehicles having front and rear steered axles.

When operating the vehicle and a method according to the second embodiment is performed, the following procedure may be used:

The driver 910 inputs to the electronic control unit (ECU) 950, for example by depressing a suitable switch, key or button on the console 915, that the driver 910 is desirous to invoke the "calibrating" according to the second embodiment of identifying locations of the modules 400 on the vehicle 900, namely "calibrating" the vehicle 900. The driver 910 then drives the vehicle 900 for a short distance in a straight direction so that the pressure level in each tire $P_1, \ldots P_N$ may be recorded. The driver 910 then turns a steering wheel of the vehicle 900 at the console 915 to pivot the front wheels 10*al*, 10*ar* to cause the vehicle 900 to execute the aforementioned right-turn from the positions Q1 to Q5 and then turns the steering wheel straighten the front wheels 10*al*, 10*ar* to cause the vehicle 900 to continue further in a straight trajectory after the position Q5. During the right-turn, the modules 400 are operable to measure the pressure at its wheels 10 and communicate by wireless corresponding sampled data to the electronic control module (ECU) 950 which stores the sample data in its memory; the sample data is communicated together with the identification codes (ID) of the modules 400 providing the sampled data. When the turn has been completed, for example after a defined time period after the driver 910 initially pressed the switch on the console 915 or in response to the driver 910 repressing the switch on the console 915, the electronic control unit (ECU) 950 terminates its collation of sample data and then progresses to analyze the sample data stored in its memory. By comparing relative pressure differences from the initial pressure levels and also positions where they each start to deviate from the initial values by more than a set value, the electronic control unit (ECU) 950 is able to identify where the modules 400 providing the sample data are located in the vehicle 900. Beneficially, the driver 910 enters information into the electronic control unit (ECU) 950 indicative of whether the driver 910 is intending to implement the method according to the first embodiment of the invention in respect of a right-hand turn or a left-hand turn. Alternatively, information regarding a direction is turned during calibration can be automatically derived from a steering angle sensor associated with a steering wheel of the vehicle 900; such steering direction information is provided to the electronic control unit (ECU) 950.

In a third embodiment of the invention the physical parameter is an angular velocity derived from a signal generated by said one or more modules (400). In this embodiment the method includes the steps of:

(b) driving said vehicle (900) around a curved trajectory as sensed by a steering sensing arrangement and recording direction of steering of said vehicle (900) together with a temporal record of said angular velocity determined from a signal generated by said one or more modules (400) together with their corresponding identification codes (ID); and (c) applying an analysis to said direction of steering and said temporal record in respect of time (t) to identify locations whereat said one or more modules (400) are located on said at least one wheel (10) of said vehicle (900), said analysis utilizing a characteristic that the angular velocity of a wheel located on an outside of said curved trajectory will experience greater magnitude during the curved trajectory in comparison to a the magnitude of the angular velocity of a wheel located on an inside of said curved trajectory, and that the angular velocity of a wheel located towards a front region of said vehicle (900) experience an increase in magnitude temporally before and/or at a higher rate than a wheel located towards a rear region of said vehicle (900) for a forward direction of travel of vehicle (900) during execution of said curved trajectory.

Preferably the sensor may be an accelerometer which generates acceleration signal components in the tangential and/or radial direction ($A_x$, $A_y$) derived from said one or more modules (400).

In the third embodiment a measure of the angular velocity of each wheel is derived from a sensor signal from the modules. Preferably the sensor signal may be acceleration signal component from a accelerometer capable of producing a signal representing the acceleration in the tangential direction. Due to the influence of gravity, the sensor signal component will be represented by a signal having the following characteristic:

$A_x = A_0 + A_1 \sin(\omega t + \Phi)$, where $A_0$, $A_1$, and $\Phi$ are constants and $\omega$ is the angular velocity of the wheel.

Once the vehicle starts to turn, the wheels on the outside in the curve will follow a longer route than wheels on the inside in a curve, which enables a computer to separate the signals from modules located on the left and right side of the vehicle when the direction of the curve is known. Furthermore, as have been explained before in relation to the first embodiment of the invention, when entering a curve, the front axle will be start turning first followed by the wheels on the middle axle (if one is present) and the rear axle.

Figure 10C:
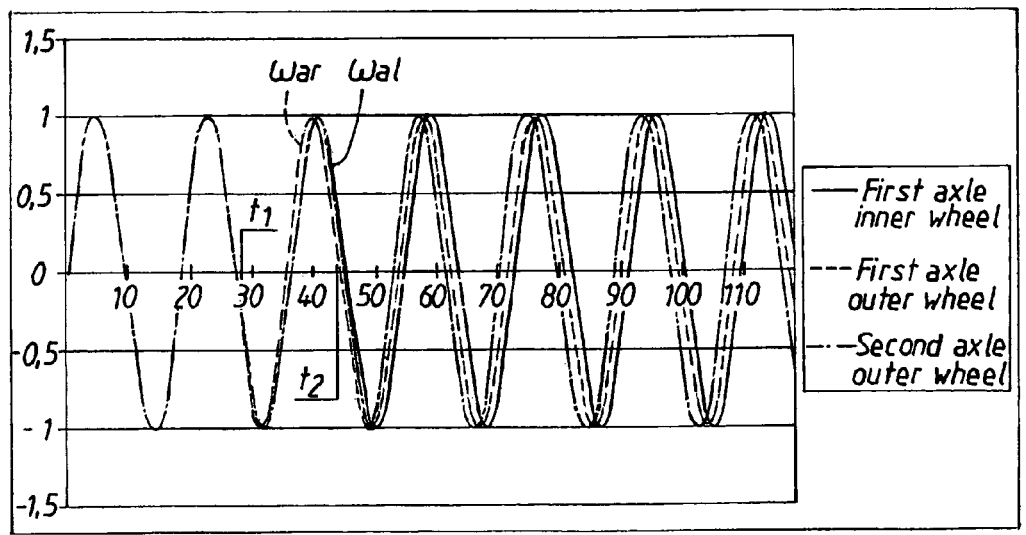
FIG. 10c shows the angular position of the wheels as a function of time.

In FIG. 10*c* the angular position of the wheels as a function of time is shown. At first all wheels travels at equal velocities. At the time t1 a first separation is made by the first axle outer wheel, which travels at an angular velocity which is higher than the all the other wheels due to the fact it follows a longer route. The signal generated by a module located at the front outer wheel will thus be characterised by a angular velocity $\omega_{ar}$, which is greater in magnitude than the signals from the other modules. Some moments later, at the time t2, the first axle inner wheel will be starting to rotate al a lower angular velocity $\omega_{al}$ than the other wheels. As soon as the second axle starts to turn separation between the angular velocities of the left and right wheels mounted on the middle axle (if one is present) will be followed in time by separation of the angular velocities of the left and right wheels of the rear axle in a similar manner. It should be noted than upon exit of the curve, it is the front axle that first assumes a common angular velocity for the right and left wheels followed by that the middle axle (if one is present) and the rear axle. Finally all the wheels will assume a common angular velocity characterised by the speed of the vehicle.

The angular velocity characterising each signal provided from the modules 400, may be determined in any conventional manner, for instance by estimating the time between passage of the average level determined by the constant $A_0$.

When operating the vehicle and a method according to the third embodiment is performed, the following procedure may be used:

The driver 910 inputs to the electronic control unit (ECU) 950, for example by depressing a suitable switch, key or button on the console 915, that the driver 910 is desirous to invoke the "calibrating" according to the second embodiment of identifying locations of the modules 400 on the vehicle 900, namely "calibrating" the vehicle 900. The driver 910 then drives the vehicle 900 for a short distance in a straight direction so that the angular velocity for each tire $\omega_1, \ldots \omega_N$ may be recorded. The driver 910 then turns a steering wheel of the vehicle 900 at the console 915 to pivot the front wheels 10*al*, 10*ar* to cause the vehicle 900 to execute the aforementioned right-turn from the positions Q1 to Q5 and then turns the steering wheel straighten the front wheels 10*al*, 10*ar* to cause the vehicle 900 to continue further in a straight trajectory after the position Q5. During the right-turn, the modules 400 are operable to measure the tangential acceleration at its wheels 10 and communicate by wireless corresponding sampled data to the electronic control module (ECU) 950 which stores the sample data in its memory; the sample data is communicated together with the identification codes (ID) of the modules 400 providing the sampled data. When the turn has been completed, for example after a defined time period after the driver 910 initially pressed the switch on the console 915 or in response to the driver 910 repressing the switch on the console 915, the electronic control unit (ECU) 950 terminates its collation of sample data and then progresses to analyze the sample data stored in its memory. By comparing relative differences in an angular velocity for each wheel from the initial angular velocities and also positions where they each start to deviate from the initial values, the electronic control unit (ECU) 950 is able to identify where the modules 400 providing the sample data are located in the vehicle 900. Beneficially, the driver 910 enters information into the electronic control unit (ECU) 950 indicative of whether the driver 910 is intending to implement the method according to the first embodiment of the invention in respect of a right-hand turn or a left-hand turn. Alternatively, information regarding a direction is turned during calibration can be automatically derived from a steering angle sensor associated with a steering wheel of the vehicle 900; such steering direction information is provided to the electronic control unit (ECU) 950.

The methods of "calibrating" the vehicle 900 according to the first second and third embodiments of the invention are susceptible to being further improved by adopting a following general "calibration" method:

(a) the driver 910 activates the electronic control unit (ECU) 950 to send out a message by wireless to all its wheels 10 and their associated modules 400 to identify themselves; such a message is beneficially, for example, sent out by the electronic control unit (ECU) 950 each time the vehicle 900 is activated in case wheels 10 of the vehicle 900 have been modified whilst the vehicle 900 has been stationary in a deactivated state. The modules 400 respond by declaring their existence and their corresponding identification codes (ID). The electronic control unit (ECU) 950 proceeds to store a list or similar record of the identification codes (ID) in its data memory;

(b) the driver 910 then drives the vehicle 900 across a smooth road surface substantially devoid of topographical features; the modules 400 mounted at the location L3, similar at the location L4, on the wheels 10 will give rise to pulsating acceleration signals $A_z$ in a manner as depicted in FIG. 10 whereas the modules 400 at locations L1 and L2 provide essentially non-pulsating signals, disregarding gravitational g effects. The electronic control unit (ECU) 950 thereby identifies in the list or record of the identification codes (ID) which modules 400 are mounted at the location L3 or L4 on their respective wheels 10;

(c) the driver 910 then executes one or more of the methods according to the first, second and third embodiments of the invention which clearly identify where the modules 400 mounted at locations L1 and L2 on their respective wheels 10 are disposed in the vehicle 900; and (d) the electronic control unit (ECU) 950 then monitors the pulse signals, in a manner as depicted in FIG. 10, from the modules 400 mounted at the location L3 or L4 on the wheels 10 and correlates the number of pulses as depicted in FIG. 10 for a given time period of travelling of the vehicle 900 with a number of revolutions of the wheels 10 as determined by the ABS sensor encoders 118. On account of slight mutual difference between the wheels 10, for example effective external diameter, certain of the wheels 10 will have executed more turns than others, allowing the correlation to determine which modules 400 mounted at the location L3 correspond to which of the wheels 10.

Steps of the aforementioned general method of "calibrating" and the methods of "calibrating" the vehicle according to the invention can be combined in various different combinations to more reliably detect where the modules 400 are located on wheels of the vehicle 10. Such methods are susceptible to simplifying operation of the vehicle 900 and avoiding error in comparison to the first method of "calibrating" the vehicle 900 by magnetic activation.

Figure 18:
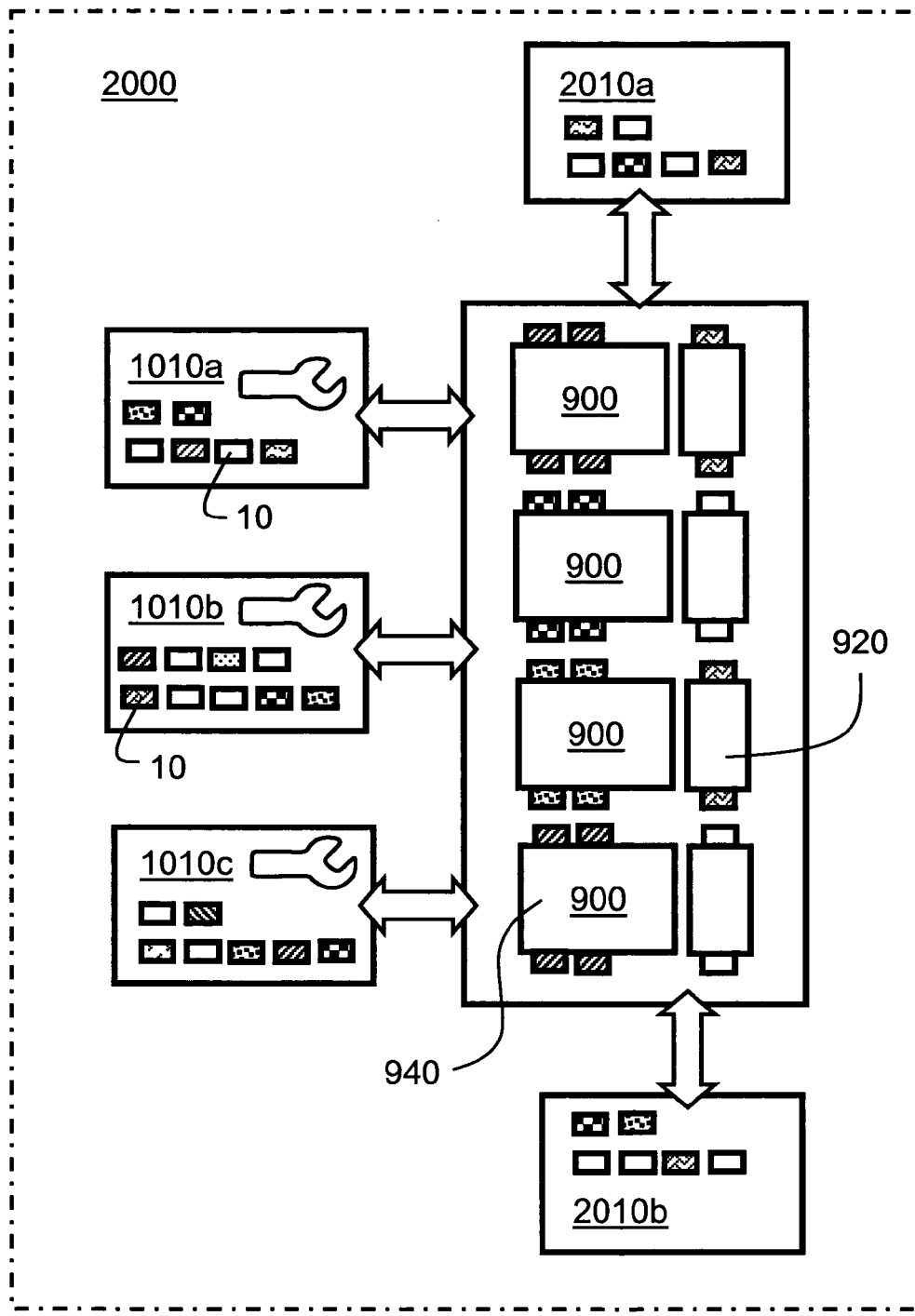
FIG. 18 is an illustration of a business system associated with an enterprise operating a fleet of heavy commercial vehicles in relation to service centres and depots.

3. Application of Wheel and Tire Monitoring Pursuant to the Present Invention for Vehicle Maintenance Purposes Referring to FIG. 18, a potential operational situation encountered by an enterprise denoted by 2000 operating a fleet of the vehicles 900 from its control centre 1000 with several service centres 1010a, 1010b, 1010c and collections of wheels 10 in reserve at the centres 1010a, 1010b, 1010c and/or depots 2010a, 2010b is that wheels 10 mounted on the vehicles 900 and wheels 10 in storage at the service centres 1010 and/or the depots 2010 potentially have mutually different configurations of modules 400 mounted thereonto as depicted by various cross-hatching patterns employed in FIG. 18. Moreover, certain of the modules 400 may also be configured with different combinations of sensors; for example, some modules 400 will include pressure sensors 760 and temperature sensors 765, whereas other modules will include accelerometers 770 and temperature sensors 765, and yet others will include a full complement of pressure sensors 760, temperature sensors 765 and accelerometers 770. The accelerometers 770 are potentially one-, two- or three-axis accelerometers. Moreover, as an aspect of policy, the enterprise 2000 may be desirous to have certain defined configurations of modules 400 on front wheels 10a of its vehicles 900 and other defined configuration of modules 400 on rear wheels 10b, 10c of its vehicles 900. Moreover, a configuration of modules 400 on any given vehicle 900 is potentially dynamically altering as wheels 10 are removed from and installed onto the vehicles 900 as part of a maintenance schedule adopted by the enterprise. Furthermore, certain modules 400 may potentially occasionally fail due to their batteries 700 becoming exhausted. In view of such potential diversity as represented by different shaping for the wheels 10 in FIG. 18, none of the aforesaid sixth methods of "calibrating" the vehicles 900 will be optimal in all circumstances. In order to address such a complex situation, the aforementioned apparatus 600, 680, 690 is beneficially implemented in a dynamically alterable manner in response to different configurations of modules 400 being available as determined by one or more of the aforementioned methods of "calibrating" the vehicles 900, or in response to declared functionality as communicated from the modules 400 to the electronic control unit 950.

Beneficially, when the modules 400 respond to the aforementioned message sent out from the electronic control unit (ECU) 950 for the modules in a given vehicle 900 to identify themselves, for example in step (a) of the general method of "calibration", the modules 400 respond by not only declaring their identification code (ID) but also a description of their functionality, namely an indication of their individual configurations of sensors included therein, and optionally their capacity to execute local data processing thereat. For example, certain modules 400 are operable to respond with their identification codes (ID) together with information that they each have only a pressure sensor 760 and a temperature sensor 765, whereas other modules 400 are operable to respond with their identification codes (ID) together with information that they each have only a x- and y-axis accelerometer 770 together with a temperature sensor 765, and so forth for inclusion in the aforementioned list or record kept at the electronic control unit (ECU) 950. The electronic control unit (ECU) 950 is thereby able to dynamically select a most suitable method of "calibrating" the vehicle 900 and inform the driver 910 on the console 915 accordingly. By the electronic control unit (ECU) 950 being aware of the functionality of its wheels 10, it is able to convey such information to the control centre 1000 for use in directing maintenance schedules for the vehicle 900, for example sending the vehicle 900 to a service centre 1010 which has a suitable equivalent replacement wheel 10.

The enterprise 2000 therefore beneficially implements in its vehicles 900 a general wheel monitoring method including steps as follows:

(a) establishing communication with one or more of its vehicles 900;

(b) receiving information in response from electronic control modules (ECU) 950 of the one or more vehicles 900 regarding configurations of the module 400 on their wheels 10 and operating status of the one or more wheels 10, for example whether the wheels 10 have developed imbalances or are loose;

(c) determining for one or more of the vehicles 900 whether one or more of their wheels 10 are in need of maintenance or replacement;

(d) identifying one or more service centres 1010 having one or more suitable replacement wheels for the one or more vehicles 900 in step (c) having been found to require replacement, or having facilities for performing maintenance on the one or more vehicles 900 in step (c) having been found to require maintenance; and (e) directing the one or more vehicles 900 found to require maintenance or replacement of its one or more wheels 10 to one on the one or more service centres 1010 for performing wheel maintenance or replacement on the one or more vehicles 900.

The general wheel monitoring method described above is susceptible to being implemented automatically by way of computer-based supervision from the control centre 1000 and/or from one or more of the service centres 1010. When implementing the method, the service centres 1010 and/or the depots 2020 are operable to communicate their inventory of wheels 10 in a dynamic manner. Moreover, the control centre 1000 is also operable to maintain dynamically a record of operational status of its vehicles 900 at least in respect of their wheels 10 furnished with on or more modules 400 pursuant to the present invention.

Adoption of the general wheel monitoring method is beneficial in that safety and reliability is improved which potentially may bring insurance premium benefits for the enterprise 2000, as well as potentially enhancing the quality of their service to their customers.

4. Auto-Alignment of Modules Employable for Implementing the Present Invention

As will be appreciated from the foregoing, the module 400 is employed when implementing the present invention in various configurations. When the module 400 includes the accelerometer 770 as depicted in FIG. 14, the module 400 can be regarded as being a form of inertial navigation unit (INU). Moreover, it is elucidated in the foregoing that processing signals corresponding to radial, tangential and transverse accelerations, namely $A_y$, $A_x$ and $A_z$ as depicted in FIG. 9, and resolving them to yield the vertical acceleration $A_V$ as depicted in FIGS. 11 and 13 is found to be highly beneficial for deriving an indication of imbalance of the wheel 10, a type of imbalance of the wheel 10, whether or not the wheel 10 is skewed out of plane, whether or not the wheel 10 is loose on its fasteners, as well as monitoring flexural characteristics of the walls 230 of the tire 30. However, in a manner similar to inertial navigation units (INU) for steering vehicles such as rockets, helicopters, aircraft and so forth, it is conventionally found important that the inertial navigation units (INU) are mounted in accurate angular alignment with various reference axes of these vehicles. However, achieving such accurate angular alignment requires accuracy and precision which is potentially time consuming and costly to achieve. In a similar manner, pursuant to the present invention, it is highly desirable that the one or more modules 400 be mountable to the wheel 10, for example at one or more of the locations L1 to L4, without a high degree of mounting precision and accuracy being necessary. By implementing the present invention such that the module 400 can be mounted in manner which does require its orientation to be precisely ensured, time and costs associated with furnishing the wheel with one or more of the modules 400 can be reduced. Such implementation of the present invention will now be elucidated with reference to example embodiments of the invention.

For a given wheel 10 correctly mounted to its axle 110, it is beneficial to refer to:
  (a) a lateral direction as being the z-axis parallel to the axis B-B;
  (b) a radial direction from the axis B-B, and thus from the axle 110, as being the y-axis; and
  (c) a tangential axis at a given position on the wheel 10 as being the x-axis, as illustrated in FIG. 19.

The z-axis and the y-axis are pertinent at the locations L1 to L4. The x-axis is dependent upon a radius r at which the point is from the axis B-B. FIG. 19 corresponds to FIG. 9 for the inclination angle □ being substantially zero. As elucidated earlier, the acceleration $A_z$ is especially useful, as depicted in FIG. 10, for monitoring flexural characteristics of the tire 30 as well as detecting whether or not the wheel 10 is at a skewed angle relative to its axle 110. Moreover, the vertical acceleration $A_V$ resolved from $A_x$ and $A_y$ acceleration components measured at a given module 400 is beneficial for monitoring imbalance in the wheel 10 and also a type of imbalance involved. However, as shown in FIG. 19, the module 400 is potentially mounted in an angularly misaligned position on the wheel 10 such that its local orthogonal axes denoted by x', y', z' do not align with true axes x, y, z required for generating highly useful $A_x$, $A_y$, $A_z$ acceleration signals.

Accelerations $A_x'$, $A_y'$, $A_z'$ correspond to measurements of accelerations along the local orthogonal axes x', y', z' respectively. It is feasible to resolve the accelerations $A_x'$, $A_y'$, $A_z'$ in respect of the true axes x, y, z as provided by a matrix mapping as defined by Equation 10 (Eq. 10):

$$\begin{pmatrix} 1 & 0 & 0 \\ 0 & \cos\beta & \sin\beta \\ 0 & -\sin\beta & \cos\beta \end{pmatrix} \begin{pmatrix} \cos\alpha & \sin\alpha & 0 \\ -\sin\alpha & \cos\alpha & 0 \\ 0 & 0 & 1 \end{pmatrix} \begin{pmatrix} A_x' \\ A_y' \\ A_z' \end{pmatrix} = \begin{pmatrix} A_x \\ A_y \\ A_z \end{pmatrix} \quad \text{Eq. 10}$$

wherein angles □ and □ are resolving angles mapping the axes x', y', z' onto the true axes x, y, z.

A special condition arises when the wheel 10 rotates at a constant angular velocity □, for example as determinable by the electronic control unit (ECU) 950 from signal generated from ABS sensor encoders 118, the vehicle 900 is driving straight ahead and not turning, for example as determined from an angular sensor coupled to the steering wheel at the console 915, and a plane of the wheel 10 is orthogonal to the axis B-B and hence to the axle 110 in that:
  (a) the lateral acceleration $A_z$ is substantially zero as define by Equation 11 (Eq. 11);
  (b) the tangential acceleration $A_x$ is substantially zero when integrated over a complete 2□ change in the rotation angle □ of the wheel 10.

$$\int_{\theta_1}^{\theta_2} A_z = 0 \quad \text{Eq. 11}$$

wherein $\square_1$ and $\square_2$ are lower and upper integration limits corresponding to first and second angular rotation angles □ of the wheel 10.

$$\int_{\gamma}^{\gamma+2n\pi} A_x = 0 \quad \text{Eq. 12}$$

wherein □ is an offset angle and n is an integer such that n=1, 2, 3, . . . .

Suitable values for the angles □ and □ are susceptible to being computed in an iterative manner so that Equations 11 and 12 can be substantially achieved, or at least a minimized condition in respect of the angles □ and □ is susceptible to being achieved. For example, spurious road surface noise present in the accelerations $A_x'$, $A_y'$, $A_z'$ potentially requires a minimum condition to be searched for as a best approximation for satisfying Equations 11 and 12.

Optimal values for the angles □ and □ can either be found from an explicit solution for Equations 10, 11 and 12, or iteratively by recomputing for various combinations of the angles □ and □ for a sample of signals representative of the accelerations $A_x'$, $A_y'$, $A_z'$ until a nearest approximation to Equations 11 and 12 is achieved.

Computation of the angles □ and □ is beneficially performed at the electronic control unit (ECU) 950. Alternatively, distributed computing performed at the module 400 can also be employed for computing the angles □ and □. Once the angles □ and □ have been computed for a minimized condition or a zero condition as given in Equations 11 and 12, application of these angles □ and □ pursuant to Equation 10 to obtain the accelerations $A_x$, $A_y$, $A_z$ for monitoring operation of the wheel 10, for example as depicted in FIGS. 11 and 13, is susceptible to being implemented at the electronic control unit (ECU) 950 or at the module 400, or distributed between both the electronic control unit (ECU) 950 and the computer processor 710 of the module 400 to spread computational load.

Equations 10 to 12 are an example of auto-resolving accelerations sensed by the accelerometer 770 of the module 400 to generate corresponding acceleration signals suitable for processing as depicted in FIGS. 11 and 13 with associated description in the foregoing. Although auto-resolving for a three-axis accelerometer 770 is described, such approximate auto-resolving can be also be employed when the accelerometer 770 is a two-axis accelerometer for example in simplified form. Auto-resolving is also susceptible to being referred to as auto-alignment.

Auto-resolving, for example as described in Equations 10 to 12, is of benefit in that the one or more modules 400 mounted one or more of the locations L1 to L4 do not need to be mounted onto the wheel 10 pursuant to highly precise angular alignment, thereby simplifying mounting of the one or more modules 400 to the wheel 10 and potentially reducing assembly and mounting costs.

When auto-resolving pursuant to Equations 10 to 12 is employed in the apparatus 600, a corresponding apparatus as indicated generally by 2200 in FIG. 20 wherein an auto-resolver is denoted by 2210. The apparatus 2200 includes at least one module 400 whose accelerometer 770 is operable to generate the acceleration signals $A_x'$, $A_y'$, $A_z'$ which are firstly auto-resolved in the auto-resolver 2210 to generate corresponding resolved acceleration data for the accelerations $A_x$, $A_y$, $A_z$. The resolved accelerations $A_x$, $A_y$, $A_z$ are then further resolved in the resolver 620 in respect of the rotation angle $\square$ of the wheel 10 as sensed by the ABS sensor encoder 118 to generate corresponding vertical acceleration $A_v$ signal data and also acceleration $A_z$ signal data. The acceleration $A_v$, $A_z$ signal data are then subject to harmonic analysis in the harmonic analyzer 630 to generate corresponding series of harmonic coefficients $Q_v(m)$ and $Q_z(m)$ respectively in relation the angular frequency $\square$ of rotation of the wheel 10. The harmonic coefficients $Q_v(m)$ and $Q_z(m)$ are then optionally subject to harmonic scaling in the scaler 640 to generate corresponding scaled harmonic coefficients $y_v(m).Q_v(m)$ and $y_z(m).Q_z(m)$ which are then subject to analysis in terms of absolute magnitude and relative magnitude to determine whether or not:

(a) the wheel 10 is imbalanced;
(b) a type of imbalance present in the wheel 10;
(c) the wheel 10 is skewed in relation to the axle 110;
(d) the wheel 10 is loose and wobbling about on its fasteners;
(e) the tire 30 has defects in its flexural characteristics, for example its mesh 210 has become damaged;
(f) the tire 30 is insufficiently inflated;
(g) the tire 30 is over-inflated;
(h) the tire 30 is oval or has a higher-order lobed distortion;
(i) there is a mass imbalance in the wheel 10;
(j) wheel bearings associated with the axle 110 are vibrating or rattling in an unexpected manner indicative of a fault, or potentially developing fault, to mention a few alternative types of analysis which are executable using the apparatus 2200.

When harmonic scaling in the scaler 640 is optionally not required, its scaling values are beneficially set to a uniform value, for example $y_v(m)=1$, $y_z(m)=1$ unity value, or the scaler 640 simply bypassed. Moreover, for the apparatus 2200, one or more modules 400 can be optionally mounted at one or more of the locations L1, L2 and L3. The apparatus 2200 is susceptible to being implemented in hardware, in software executable on computing hardware, or a combination of such hardware and software. Moreover, the apparatus 2200 is susceptible to being implemented substantially in the electronic control unit (ECU) 950, on the module 400, or on both the module 400 and electronic control unit (ECU) 950 in combination. The software is optionally supplied as one or more software products on one or more data carriers. Moreover, the software is optionally dynamically reconfigurable depending on potentially changing configurations of one or more modules 400 included on the wheel 10.

The apparatus 2200 illustrated in FIG. 20 is susceptible to being modified in a manner akin to the apparatus 690 illustrated in FIG. 13, namely concurrently or alternately being operable to harmonically analyze a sampled signal representative of the pressure P in the volume 120 of the tire 30.

The auto-resolver 2210 requires calibrating in order to determine its correction angles $\square$ and $\square$ as elucidated in the foregoing. Such calibration is beneficially implemented as part of the aforesaid methods of "calibrating" the modules 400, namely enabling the electronic control unit (ECU) 950 to identify which modules 400 with which it is required to communicate on the vehicle 900, wherein the modules 400 are mounted at various locations on wheels 10 of the vehicle 900, with potentially mutually different operating characteristics of the modules 400; as elucidated earlier, a situation potentially arises in operation where certain wheels 10 of the vehicle 900 are provided with a more comprehensive set of modules 400 in comparison to other wheels of the vehicle 900, in a potentially temporally dynamically changing manner. Auto-resolving in the auto-resolver 2210 has an effect with regard to the module 400 mounted at the location L3 to effectively set the offset angle $\square_0$ in Equation 6 (Eq. 6) to substantially a null value, namely $\square_0=0$, and thereby potentially simplifies associated signal processing in operation for monitoring flexural characteristics of the tire 30.

5. Applications of the Invention

Although use of the present invention in relation to heavy commercial vehicles is described in the foregoing, it will be appreciated that the invention is also applicable to other types of vehicle, for example on wheels of aircraft, on wheels of automobiles, wheels of motorcycles and bicycles, on heavy construction equipment, on the wings of electricity wind turbines to identify potential structural problems, and so forth.

Expressions such as "has", "is", "include", "comprise", "consist of", "incorporates" are to be construed to include additional components or items which are not specifically defined; namely, such terms are to be construed in a non-exclusive manner. Moreover, reference to the singular is also to be construed to also include the plural. Furthermore, numerals and other symbols included within parentheses in the accompanying claims are not to be construed to influence interpreted claim scope but merely assist in understanding the present invention when studying the claims.

6. Optional Modifications to the Invention

Modifications to embodiments of the invention described in the foregoing are susceptible to being implemented without departing from the scope of the invention as defined by the appended claims.

For example, use of the ABS sensor encoder 118 for sensing rotation of the wheel 10 has been described in the foregoing. However, additionally or alternatively, a measure of the angular orientation $\square$ of the wheel 10 can also be computed, as elucidated in the foregoing, on a basis of the gravitational force g acting upon the accelerometer 770 of the module 400. The gravitation force g is manifested in operation in the acceleration components $A_x$, $A_y$ and is superimposed on any acceleration experienced at the wheel 10 due to general acceleration or deceleration of the vehicle 900. On account of a typical time scale in which cyclical fluctuations of the gravitational force g as observed in the acceleration components $A_x$, $A_y$ being generally more rapid than effects due to such general acceleration or deceleration, it is feasible to filter out or compensate for such components in the acceleration components $A_x$, $A_y$ as a weight of the vehicle 900 and a motive power output from the engine or motor 930 of the vehicle 900 can be estimated or measured. When the angular orientation □ of the wheel 10 is derived from the acceleration components $A_x$, $A_y$, in addition to or as an alternative to the ABS encoder sensor 118, such derivation does not preclude the use of aforementioned auto-alignment of the axes x', y', z' of the module 400 to the true x, y, z axes of the wheel 10 representative of orthogonal tangential and lateral axes respectively, see FIG. 9. Such derivation of the angular orientation □ enables the present invention to be, for example, applied to vehicles which are not equipped with ABS braking or partially equipped with ABS braking on only certain of their wheels. Moreover, such derivation enables the present invention to be retrofitted in certain situations to older vehicles which are not provided with ABS braking.

Flexure of the side-wall 230 of the tire 30 is also susceptible to being sensed by a first module 400 mounted at the location L3 moving in respect of a second module 400 mounted at the location L2 in close spatial proximity to the first module 400. In operation, flexure of the side-wall 230 causes a relative spatial distance between the first and second modules 400 to vary correspondingly.

In a first configuration, the first module 400 is provided with a source of radiation, and the second module 400 is operable to monitor a magnitude of a portion of the radiation received thereat and convey a corresponding signal by wireless to the electronic control unit (ECU) 950. The signal is representative of a change of spatial separation between the first and second modules 400 as a function of their wheel 10 rotating.

In a second configuration, the second module 400 is provided with a source of radiation, and the first module 400 is operable to monitor a magnitude of a portion of the radiation received thereat and convey a corresponding signal by wireless, for example using the mesh 210 of the tire 30 as a wireless patch antenna, to the electronic control unit (ECU) 950. The signal is representative of a change of spatial separation between the first and second modules 400 as a function of their wheel 10 rotating.

The radiation can be at least one of: a substantially constant magnetic field generated by a permanent magnet, an alternating magnetic field, ultrasonic radiation, wireless radiation, pulsed optical radiation, capacitive electrostatically-coupled radiation to mention a few examples. Ultrasonic radiation is beneficially generated and received using piezo-electric transducers.

The invention claimed is:

1. A method of identifying locations of one or more sensor modules of an apparatus implemented in a vehicle for monitoring operation of at least one wheel of the vehicle, the apparatus including one or more modules operatively mounted to revolve with the at least one wheel, the one or more modules being operatively coupled in communication with a processing arrangement of the vehicle, the one or more modules being arranged to determine at least one physical parameter of the wheel and to generate at least one corresponding sensor signal for the processing arrangement, the processing arrangement being arranged to process the at least one sensor signal to compute information indicative of operation of the at least one wheel, the method comprising (a) communicating, with one or more modules of the apparatus for receiving their identification codes at a processing arrangement of the apparatus, the one or more modules being mounted on at least one wheel of the vehicle;

(b) driving the vehicle around a curved trajectory as sensed by a steering sensing arrangement and recording a direction of steering of the vehicle together with a temporal record of the physical parameter determined by the one or more modules together with their corresponding identification codes, the physical parameter pertaining to one or more tires of the at least one wheel; and (c) applying an analysis to the steering direction and the temporal record in respect of time to identify where the one or more modules are located on the at least one wheel of the vehicle, the analysis utilizing, a characteristic that tires on an outside of the curved trajectory will experience different values in the temporal record of the physical parameter than tires on an inside of the curved trajectory, and that tires towards a front region of the vehicle experience a change in the temporal record of the physical parameter at least one of before and at a higher rate than tires towards a rear region of the vehicle for a forward direction of travel of vehicle, wherein the physical parameter comprises lateral accelerations measured by the one or more modules, wherein the method steps (b) and (c) are as follows:

(b) driving the vehicle around a curved trajectory as sensed by the steering sensing arrangement and recording direction of steering of the vehicle together with a temporal record of lateral accelerations measured by the one or more modules together with their corresponding identification codes; and (c) applying an analysis to the direction of steering and the temporal record in respect of time to identify locations whereat the one or more modules are located on the at least one wheel of the vehicle, the analysis utilizing a characteristic that accelerometers located on an outside of the curved trajectory will experience greater lateral accelerations during the curved trajectory in comparison to a straight trajectory than accelerometers located on an inside of the curved trajectory, and that accelerometers located towards a front region of the vehicle experience an increase in lateral acceleration temporally before accelerometers located towards a rear region of the vehicle for a forward direction of travel of vehicle during execution of the curved trajectory.

2. A method as claimed in claim 1, wherein the physical parameter comprises a pressure measured inside each wheel, wherein the method steps (b) and (c), are as follows:

(b) driving the vehicle around a curved trajectory as sensed by the steering sensing arrangement and recording direction of steering of the vehicle together with a temporal record of pressures measured by the one or more modules together with their corresponding identification codes, the pressure pertaining to one or more tires of the at least one wheel; and (c) applying an analysis to the direction of steering and the temporal record in respect of time to identify locations whereat the one or more modules are located on the at least one wheel of the vehicle, the analysis utilizing a characteristic that tires on an outside of the curved trajectory will experience greater pressure increases than tires on an inside of the curved trajectory, and that tires towards a front region of the vehicle experience an increase in pressure before tires towards a rear region of the vehicle for a forward direction of travel of vehicle.

3. A method as claimed in claim 1, wherein the physical parameter comprises an angular velocity derived from a signal generated by the one or more modules, wherein the method steps (b) and (c) are as follows:

(b) driving the vehicle around a curved trajectory as sensed by the steering sensing arrangement and recording direction of steering of the vehicle together with a temporal record of the angular velocity determined from a signal generated by the one or more modules together with their corresponding identification codes; and (c) applying an analysis to the direction of steering and the temporal record in respect of time to identify locations whereat the one or more modules are located on the at least one wheel of the vehicle, the analysis utilizing, a characteristic that the angular velocity of a wheel located on an outside of the curved trajectory will experience greater magnitude during the curved trajectory in comparison to a the magnitude of the angular velocity of a wheel located on an inside of the curved trajectory, and that the angular velocity of a wheel located towards a front region of the vehicle experience an increase in magnitude temporally at least one of before and at a higher rate than a wheel located towards a rear region of the vehicle for a forward direction of travel of vehicle during execution of the curved trajectory.

4. A method as in claim 3, wherein the signal generated by the module are acceleration signal components in at least one of the tangential and the radial direction derived from the one or more modules.

5. Method as claimed in claim 1, wherein the one or more modules include a temperature sensor for sensing a temperature (T mod) thereat, the one or more modules being arranged to communicate a signal indicative of the temperature (T mod) to the processing arrangement for use in computing the information indicative of operation of the at least one wheel.

6. A method as claimed in claim 1, wherein the one or more modules include at least one of:
   (a) a pressure sensor arranged to sense a pressure existing within a tire of the at least one wheel, the one or more modules being arranged to communicate a signal indicative of the pressure to the processing, arrangement for use in computing the information indicative of operation of the at least one wheel;
   (b) a strain gauge sensor for measuring flexure of the tire of the at least one wheel, the module being arranged to communicate a signal indicative of the flexure to the processing arrangement for use in computing the information indicative of operation of the at least one wheel;
   (c) an accelerometer for measuring acceleration (Ax, Ay, A) in at least one axis at a mounting, location of the one or more modules on the at least one wheel, the one or more modules being arranged to communicate a signal indicative of the acceleration to the processing arrangement for use in computing the information Indicative of operation of the at least one wheel; and
   (d) a magnetic sensor for measuring a magnetic field applied to the one or more modules the one or more modules being arranged to communicate a signal indicative of the applied magnetic field to the processing arrangement for use in controlling operation of the apparatus.

7. A method as claimed in claim 6, wherein the accelerometer is a multi-axis accelerometer arranged to measure components of acceleration in at least one of radial, tangential and transverse axes in respect of rotations of the at least one wheel.

8. A method as claimed in claim 1, wherein the one or more modules are mounted at one or more locations on the at least one wheel, the one or more locations including:
   (a) on a hub of the at least one wheel at an axis of rotation of the at least one wheel;
   (b) on a hub of the at least one wheel at a radial distance from the axis of rotation of the at least one wheel;
   (c) within a tire of the at least one wheel for sensing a pressure within the tire, the at least one module being mounted to a peripheral surface of a hub of the at least one wheel;
   (d) within a tire of the wheel for sensing a pressure within the tire, the one or more modules being mounted to an inside side-wall surface of the tire for measuring flexural characteristics of the side-wall; and
   (e) on an inside surface of a peripheral rim of the at least one wheel for measuring acceleration thereat.

9. A method as claimed in claim 1, wherein the one or more modules include at least one wireless interface for communicating between the one or more modules and the processing arrangement, the one or more nodules forming a wireless network wherein certain of the one or more modules are arranged to function as one or more relay nodes for conveying signal exchange between the processing arrangement and other of the one or more modules.

10. A method as claimed in claim 1, wherein the one or more modules are each provided with a corresponding identification code for communicating to the processing arrangement so that the processing arrangement is able to recognize from which module corresponding signal data has been sent.

11. A method as claimed in claim 1, wherein the one or more modules are radially distributed around the at least one wheel for sensing operation of the at least one wheel at a plurality of angular locations therearound.

12. A method as claimed in claim 1 including, a step of presenting information to a driver of the vehicle on a display coupled in communication with the processing arrangement, the information indicating at
least one of:
   (a) an operating status of the one or more modules;
   (b) a condition of the at least one wheel;
   (c) one or more faults or potential faults associated with the at least one wheel;
   (d) information regarding one or more actions to be taken by a driver of the vehicle in an event of one or more faults or potential faults associated with the
at least one wheel being identified; and
   (e) an indication of whether or not at the at least one wheel of the vehicle has been modified.

13. A method as claimed in claim 1, including a step of providing the processing arrangement with a wireless interface for communicating with a service facility remote from the vehicle, the processing arrangement being arranged to communicate information indicative of functionality of the at least one wheel, the information being indicative of one or more faults or potential faults associated with the at least one wheel as computed from signals provided from the one or more modules, and for receiving instructions from the service facility regarding actions for addressing the one or more faults or potential faults.

14. A method as claimed in claim 1, wherein the at least one physical parameter includes:
   a pressure within a tire of the at least one wheel as measured at the one or more modules
   and wherein the processing arrangement is arranged to apply an harmonic analysis to signals corresponding to at least one of the pressure and the acceleration, the harmonic analysis being arranged to identify harmonic components in respect of angular frequency corresponding to a temporal rate of change of the angular orientation of the at least one wheel.

15. A method as claimed in claim 14, wherein the harmonic analysis applying computation to at least one of:
   (a) magnitudes of the harmonic components; and
   (b) relative phase relationships between the harmonic components.

16. A method as claimed in claim 14, wherein the processing arrangement is arranged to perform the analysis of the harmonic components by applying at least one of:
(a) a rule-based algorithm for identifying one or more faults or potential faults from the harmonic components;
(b) a neural network pre-programmed to identify one or more faults or potential faults when presented with data describing the harmonic components; and
(c) an harmonic filter for highlighting a specific combination of one or more harmonic components which are indicative of one or more faults or potential faults with the at least one wheel.

17. A method as claimed in claim 1, wherein the processing, arrangement is arranged to send a message requesting the one or modules to respond back to the processing arrangement for declaring their identification codes to the processing arrangement for enabling the processing arrangement to identify its configuration of one or more modules, and for identifying any changes in the configuration of one or more modules occurring.

18. A wheel-monitoring apparatus implemented in a vehicle for monitoring operation of at least one wheel, of the vehicle, the apparatus including
one or more sensor modules operatively mounted to revolve with the at least one wheel the one or more modules being, operatively coupled in communication with a processing arrangement of the vehicle, the one or more modules being arranged to determine at least one physical parameter of the wheel and to generate at least one corresponding sensor signal for the processing arrangement,
the processing arrangement being arranged to process the at least one sensor signal to compute information indicative of operation of the at least one wheel, and
a steering sensing, arrangement,
wherein the apparatus is arranged to
enable communication between the one or more modules of the apparatus for receiving their identification codes and the processing arrangement of the apparatus, the one or more modules being mounted on at least one wheel of the vehicle;
sense, by the steering sensing arrangement, driving of the vehicle around a curved trajectory and recording a direction of steering of the vehicle together with a temporal record of the physical parameter determined by the one or more modules together with their corresponding identification codes, the physical parameter pertaining to one or more tires of the at least one wheel; and
apply an analysis to the steering direction and the temporal record in respect of time to identify where the one or more modules are located on the at least one wheel of the vehicle, the analysis utilizing a characteristic that tires on an outside of the curved trajectory will experience different values in the temporal record of the physical parameter than tires on an inside, of the curved trajectory, and that tires towards a front region of the vehicle experience as change in the temporal record of the physical parameter at least one of before and at a higher rate than tires towards a rear region of the vehicle for a forward direction of travel of vehicle
wherein the physical parameter comprises lateral accelerations measured by the one or more modules, the apparatus being arranged to record the direction of steering of the vehicle together with a temporal record of lateral accelerations measured by the one or more modules together with their corresponding identification codes, and the apparatus being arranged to apply the analysis to the direction of steering and the temporal record in respect of time to identify locations whereat the one or more modules are located on the at least one wheel of the vehicle, the analysis utilizing a characteristic that accelerometers located on an outside of the curved trajectory will experience greater lateral accelerations during the curved trajectory in comparison to a straight trajectory than accelerometers located on an inside of the curved trajectory, and that accelerometers located towards a front region of the vehicle experience an increase in lateral acceleration temporally before accelerometers located towards a rear region of the vehicle for a forward direction of travel of vehicle during execution of the curved trajectory.

19. A wheel-monitoring apparatus according to claim 18, wherein the wheel monitoring apparatus is arranged to perform a method of identifying locations of one or more modules of an apparatus implemented in a vehicle for monitoring operation of at least one wheel of the vehicle the apparatus including one or more sensor modules operatively mounted to revolve with the at least one wheel the one or more modules being operatively coupled in communication with a processing arrangement of the vehicle, the one of more modules being arranged to determine at least one physical parameter of the wheel and to generate at least one corresponding sensor signal for the processing arrangement, the processing arrangement being arranged to process the at least one sensor signal to compute information indicative of operation of the at least one wheel, method comprising
(a) communicating with one or more modules of the apparatus for receiving their identification codes at a processing arrangement of the apparatus the one or more modules being mounted on at least one wheel of the vehicle;
(b) driving the vehicle around a curved trajectory as sensed by a steering sensing arrangement and recording a direction of steering of the vehicle together with a temporal record of the physical ammeter determined by the one or more modules together with their corresponding identification codes, the physical parameter pertaining to one or more tires of the at least one wheel; and
(c) applying an analysis to the steering direction and the temporal record in respect of time to identify where the one or more modules are located on the at least one wheel of the vehicle, the analysis utilizing a characteristic that tires on an outside of the curved trajectory will experience different values in the temporal record of the physical parameter than tires on an inside of the curved trajectory, and that tires towards a front region of the vehicle experience a change in the temporal record Of the physical parameter before and/or at a higher rate than tires towards a rear region of the vehicle for a forward direction of travel of vehicle, wherein the physical parameter is of lateral accelerations measured by the one or more modules, wherein the method steps (b) and (c) are as follows:
(b) driving the vehicle around a curved trajectory as sensed by the steering sensing arrangement and recording direction of steering of the vehicle together with a temporal record of lateral accelerations measured by the one or more modules together with their corresponding identification codes; and
(c) applying an analysis to the direction of steering and the temporal record in respect of time to identify locations whereat the one or more modules are located on the at least one wheel of the vehicle, the analysis utilizing a characteristic that accelerometers located on an outside of the curved trajectory will experience greater lateral accelerations during the curved trajectory in comparison to a straight trajectory than accelerometers located on an inside of the curved trajectory, and that accelerometers located towards a front region of the vehicle experience an increase in lateral acceleration temporally before accelerometers located towards a rear region of the vehicle for a forward direction of travel of vehicle during execution of the curved trajectory.

20. A vehicle including a wheel-monitoring apparatus as claimed in claim 18.

21. A system comprising:
one or more vehicles, wherein each vehicle includes a wheel-monitoring apparatus, the wheel-monitoring apparatus including one or more modules operatively mounted to revolve with the at least one wheel,
a processing arrangement, the one or more modules being operatively coupled in communication with the processing arrangement,
the one or more modules being arranged to determine at least one physical parameter of the wheel and to generate at least one corresponding sensor signal for the processing arrangement,
the processing arrangement being arranged to process the at least one sensor signal to compute information indicative of operation of the at least one wheel,
wherein the processing arrangement is arranged to (a) communicate with the one or more modules and receive identification codes of the one or more modules, the one or more modules being mounted on at least one wheel of the vehicle;
(b) receive information from a steering sensing arrangement that senses driving the vehicle around a curved trajectory and record a direction of steering of the vehicle together with a temporal record of the physical parameter determined by the one or more modules together with their corresponding identification codes, the physical parameter pertaining to one or more tires of the at least one wheel; and
(c) apply an analysis to the steering direction and the temporal record in respect of time to identify where the one or more modules are located on the at least one wheel of the vehicle, the analysis utilizing a characteristic that tires on an outside of the curved trajectory will experience different values in the temporal record of the physical parameter than tires on an inside of the curved trajectory, and that tires towards a front region of the vehicle experience a change in the temporal record of the physical parameter at least one of before and at a higher rate than tires towards a rear region of the vehicle for a forward direction of travel of vehicle,
wherein the physical parameter comprises lateral accelerations measured by the one or more modules,
wherein the processing arrangement is arranged, with regard to items (b) and (c), to (b) receive information from the steering sensing arrangement that senses driving the vehicle around the curved trajectory and record the direction of steering of the vehicle together with a temporal record of lateral accelerations measured by the one or more modules together with their corresponding identification codes; and
(c) apply an analysis to the direction of steering and the temporal record in respect of time to identify locations whereat the one or more modules are located on the at least one wheel of the vehicle, the analysis utilizing a characteristic that accelerometers located on an outside of the curved trajectory will experience greater lateral accelerations during the curved trajectory in comparison to a straight trajectory than accelerometers located on an inside of the curved trajectory, and that accelerometers located towards a front region of the vehicle experience an increase in lateral acceleration temporally before accelerometers located towards a rear region of the vehicle for a forward direction of travel of vehicle during execution of the curved trajectory, and
wherein the processing arrangement is arranged to send a message requesting the one or modules to respond back to the processing arrangement for declaring their identification codes to the processing arrangement for enabling the processing arrangement to identify its configuration of one or more modules, and for identifying any changes in the configuration of one or more modules occurring,
a control center for coordinating repair or maintenance of the one or more vehicles;
one or more service facilities arranged to perform repair or replacement on the one or more vehicles;
wherein
each wheel-monitoring apparatus is arranged to monitor operation of its one or more associated wheels and detect when a problem or potential problem arises therewith,
each wheel-monitoring apparatus is arranged to communicate the problem or potential problem to the control center, the control center being arranged to identify one or more service facilities capable of addressing the problem or potential problem, and
the control center is arranged to communicate instructions to any of the one or more vehicles whose wheel-monitoring apparatus has detected a problem or potential problem to proceed to one of the identified one or more service facilities for the problem or potential problem to be addressed.

22. A system as claimed in claim 21, wherein the system in (e) is arranged to inform the identified one or more service facilities in advance of arrival of the one or more vehicles for maintenance or repair, so that the identified one or more service facilities are provided with an opportunity to make preparation for arrival of the one or more vehicle for maintenance or repair.

23. A system as claimed in claim 21, wherein the control center is arranged to organise the maintenance or repair at the identified one or more service facilities automatically without one or more drivers (910) of the one or more vehicles needing to intervene.

24. A system as claimed in claim 21, wherein the one or more vehicles include global position sensing apparatus thereon coupled in communication with the wheel-monitoring apparatus for enabling the one or more vehicles to communicate their position to the control center, so that the control center is arranged to identify one or more service facilities most suitably geographically disposed to service the one or more vehicles.

25. A method of operating a system including one or more vehicles, wherein each vehicle includes a wheel-monitoring apparatus arranged to implement a method of identifying locations of one or more sensor modules of an apparatus implemented in a vehicle for monitoring operation of at least one wheel of the vehicle, the apparatus including one or more modules operatively mounted to revolve with the at least one wheel, the one or more modules being operatively coupled in communication with a processing arrangement of the vehicle, the one or more modules being arranged to determine at least one physical parameter of the wheel and to generate at least one corresponding sensor signal for the processing arrangement, the processing arrangement being arranged to process the at least one sensor signal to compute information indicative of operation of the at least one wheel, the method comprising (a) communicating with one or more modules of the apparatus for receiving their identification codes at a processing arrangement of the apparatus, the one or more modules being mounted on at least one wheel of the vehicle;

(b) driving the vehicle around a curved trajectory as sensed by a steering sensing arrangement and recording a direction of steering of the vehicle together with a temporal record of the physical parameter determined by the one or more modules together with their corresponding identification codes, the physical parameter pertaining to one or more tires of the at least one wheel; and (c) applying an analysis to the steering direction and the temporal record in respect of time to identify where the one or more modules are located on the at least one wheel of the vehicle, the analysis utilizing a characteristic that tires on an outside of the curved trajectory will experience different values in the temporal record of the physical parameter than tires on an inside of the curved trajectory, and that tires towards a front region of the vehicle experience a change in the temporal record of the physical parameter at least one of before and at a higher rate than tires towards a rear region of the vehicle for a forward direction of travel of vehicle, wherein the physical parameter comprises lateral accelerations measured by the one or more modules, wherein the method steps (b) and (c) are as follows:

(b) driving the vehicle around a curved trajectory as sensed by the steering sensing arrangement and recording direction of steering of the vehicle together with a temporal record of lateral accelerations measured by the one or more modules together with their corresponding identification codes; and (c) applying an analysis to the direction of steering and the temporal record in respect of time to identify locations whereat the one or more modules are located on the at least one wheel of the vehicle, the analysis utilizing a characteristic that accelerometers located on an outside of the curved trajectory will experience greater lateral accelerations during the curved trajectory in comparison to a straight trajectory than accelerometers located on an inside of the curved trajectory, and that accelerometers located towards a front region of the vehicle experience an increase in lateral acceleration temporally before accelerometers located towards a rear region of the vehicle for a forward direction of travel of vehicle during execution of the curved trajectory, the system comprising:

(a) a control center for coordinating repair or maintenance of the one or more vehicles;

(b) one or more service facilities arranged to perform repair or replacement on the one or more vehicles;

wherein the method includes steps of:

(c) enabling each wheel-monitoring apparatus to monitor operation of its one or more associated wheels and to detect when a problem or potential problem arises therewith;

(d) enabling each wheel-monitoring apparatus to communicate the problem or potential problem to the control center, for the control center to identify one or more service facilities capable of addressing the problem or potential problem; and (e) enabling the control center to communicate instructions to the one or more vehicles whose wheel-monitoring apparatus has detected a problem or potential problem to the identified one or more service facilities for the problem or potential problem to be addressed.

26. A non-transitory data carrier comprising a software product recorded thereon, the product being executable on computing hardware for executing a method of identifying locations of one or more sensor modules of an apparatus implemented in a vehicle for monitoring operation of at least one wheel of the vehicle, the apparatus including one or more modules operatively mounted to revolve with the at least one wheel, the one or more modules being operatively coupled in communication with a processing arrangement of the vehicle, the one or more modules being arranged to determine at least one physical parameter of the wheel and to generate at least one corresponding sensor signal for the processing arrangement, the processing arrangement being arranged to process the at least one sensor signal to compute information indicative of operation of the at least one wheel, the method comprising (a) communicating with one or more modules of the apparatus for receiving their identification codes at a processing arrangement of the apparatus, the one or more modules being mounted on at least one wheel of the vehicle;

(b) driving the vehicle around a curved trajectory as sensed by a steering sensing arrangement and recording a direction of steering of the vehicle together with a temporal record of the physical parameter determined by the one or more modules together with their corresponding identification codes, the physical parameter pertaining to one or more tires of the at least one wheel; and (c) applying an analysis to the steering direction and the temporal record in respect of time to identify where the one or more modules are located on the at least one wheel of the vehicle, the analysis utilizing a characteristic that tires on an outside of the curved trajectory will experience different values in the temporal record of the physical parameter than tires on an inside of the curved trajectory, and that tires towards a front region of the vehicle experience a change in the temporal record of the physical parameter at least one of before and at a higher rate than tires towards a rear region of the vehicle for a forward direction of travel of vehicle, wherein the physical parameter comprises lateral accelerations measured by the one or more modules, wherein the method steps (b) and (c) are as follows:

(b) driving the vehicle around a curved trajectory as sensed by the steering sensing arrangement and recording direction of steering of the vehicle together with a temporal record of lateral accelerations measured by the one or more modules together with their corresponding identification codes; and (c) applying an analysis to the direction of steering and the temporal record in respect of time to identify locations whereat the one or more modules are located on the at least one wheel of the vehicle, the analysis utilizing a characteristic that accelerometers located on an outside of the curved trajectory will experience greater lateral accelerations during the curved trajectory in comparison to a straight trajectory than accelerometers located on an inside of the curved trajectory, and that accelerometers located towards a front region of the vehicle experience an increase in lateral acceleration temporally before accelerometers located towards a rear region of the vehicle for a forward direction of travel of vehicle during execution of the curved trajectory.

* * * * *